US012623581B2

(12) United States Patent
Inose et al.

(10) Patent No.: US 12,623,581 B2
(45) Date of Patent: May 12, 2026

(54) CONVEYANCE SEAT

(71) Applicant: TS TECH CO., LTD., Asaka (JP)

(72) Inventors: Yasuo Inose, Tochigi (JP); Yuta Yaguchi, Tochigi (JP); Katsuhiro Kiya, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 223 days.

(21) Appl. No.: 18/569,675

(22) PCT Filed: Jun. 8, 2022

(86) PCT No.: PCT/JP2022/023066
§ 371 (c)(1),
(2) Date: Dec. 13, 2023

(87) PCT Pub. No.: WO2022/264889
PCT Pub. Date: Dec. 22, 2022

(65) Prior Publication Data
US 2024/0270140 A1     Aug. 15, 2024

Related U.S. Application Data

(60) Provisional application No. 63/292,034, filed on Dec. 21, 2021, provisional application No. 63/272,712, (Continued)

(30) Foreign Application Priority Data

Mar. 8, 2022     (JP) ................................. 2022-035634
Apr. 27, 2022     (JP) ................................. 2022-073659

(51) Int. Cl.
B60N 2/90     (2018.01)
B60N 2/68     (2006.01)

(52) U.S. Cl.
CPC ..................................... B60N 2/90 (2018.02);
B60N 2/68 (2013.01)

(58) Field of Classification Search
CPC ................................... B60N 2/90; B60N 2/68
See application file for complete search history.

(56) References Cited

U.S. PATENT DOCUMENTS

2015/0210188 A1 *   7/2015   Hoshi ...................... B60N 2/68
                                                                                  297/344.12
2020/0269731 A1     8/2020   Inose et al.

FOREIGN PATENT DOCUMENTS

JP          S6124632 A          2/1986
JP          S63139052 U          9/1988
(Continued)

OTHER PUBLICATIONS

PCT International Search Report (w/ English translation) for corresponding PCT Application No. PCT/JP2022/023066, mailed Aug. 9, 2022, 6 pages.
(Continued)

*Primary Examiner* — Anthony D Barfield
(74) *Attorney, Agent, or Firm* — Dority & Manning, P.A.

(57)     ABSTRACT

Provided is a conveyance seat having a seat frame that suppresses a resonance by a simple means in a seat frame with an actuator. A conveyance seat is a conveyance seat having a seat frame with an actuator and includes a resonance suppressing portion which is formed in at least a part of the seat frame by a first uneven region formed by continuously forming a plurality of non-penetrating recesses and/or protrusions. Since the natural frequency of the seat frame changes, the resonance of the seat frame due to the operational vibration of the actuator can be suppressed.

9 Claims, 37 Drawing Sheets

Related U.S. Application Data filed on Oct. 28, 2021, provisional application No. 63/210,680, filed on Jun. 15, 2021.

(56) References Cited

FOREIGN PATENT DOCUMENTS

| | | | | |
|---|---|---|---|---|
| JP | 2012153248 | A | * | 8/2012 |
| JP | 2014084053 | A | | 5/2014 |
| JP | 2019077232 | A | | 5/2019 |

OTHER PUBLICATIONS

PCT Written Opinion for corresponding PCT Application No. PCT/JP2022/023066, mailed Aug. 9, 2022, 3 pages.

* cited by examiner

(SECOND DIRECTION)
UP

LEFT ←——→ RIGHT
(FIRST DIRECTION)

DOWN (FIRST DIRECTION)
LEFT   FRONT (THIRD DIRECTION)
BACK   RIGHT

UP

DOWN
(SECOND DIRECTION)

1010a
(1010)

1047    1067 1047    1046    1064c
(1064)    1064c
(1064)    1064a
(1064)

1060

1065c
1065 }
1065a 1042a
(1042)

1020

1047      1047      1064c    1064b
(1064)   (1064)

(SECOND DIRECTION)
UP

LEFT ← → RIGHT
(FIRST DIRECTION)

DOWN (SECOND DIRECTION)
UP

RIGHT ←——→ LEFT
(FIRST DIRECTION)

DOWN (FIRST DIRECTION)
LEFT

UP

FRONT (THIRD DIRECTION)
BACK

RIGHT

DOWN
(SECOND DIRECTION)

1030

1040′

1044′

1030a

1040′

1044′

1040′

1040′

(SECOND DIRECTION)
FRONT

RIGHT ⟷ LEFT
(FIRST DIRECTION)

BACK

CONVEYANCE SEAT

CROSS REFERENCE TO RELATED APPLICATIONS

This application is the U.S. National Stage entry of International Application No. PCT/JP2022/023066, filed on Jun. 8, 2022, which, in turn, claims priority to U.S. Provisional Patent Application No. 63/210,680, filed on Jun. 15, 2021; U.S. Provisional Patent Application No. 63/272,712, filed on Oct. 28, 2021; U.S. Provisional Patent Application No. 63/292,034, filed on Dec. 21, 2021; Japanese Patent Application No. 2022-035634, filed on Mar. 8, 2022; and Japanese Patent Application No. 2022-073659, filed Apr. 27, 2022, all of which are hereby incorporated herein by reference in their entireties for all purposes.

TECHNICAL FIELD

The present invention relates to a conveyance seat and particularly to a conveyance seat with an actuator.

BACKGROUND ART

Among vehicle seats, there is known one having an electric reclining device. The electric reclining device is operated by driving an actuator (electric motor) integrally attached to a seat back frame. Therefore, an operation sound according to the driving of the electric motor is likely to be transmitted to the seat back frame and the transmitted operation sound is transmitted to the ears of a seated occupant via an upper frame of the seat back frame.

In addition to the reclining device, there is also an operation sound of an actuator for operating an electric height adjustment device or a vibration sound or an engine sound associated with a traveling vehicle.

In order to suppress the resonance between the actuator and the seat frame, PATENT LITERATURE 1 discloses a vehicle seat including a plurality of through holes which open to an upper frame and a recess which is formed on a seat pad to communicate with the through hole.

CITATION LIST

Patent Literature

PATENT LITERATURE 1: JP 2014-084053 A

SUMMARY OF INVENTION

Technical Problem

However, the seat frame described in PATENT LITERATURE 1 requires a large number of man-hours for manufacturing since the through hole is formed in the seat frame and the recess communicating with the through hole is formed in the pad.

The present invention has been made in view of the above-described problems and an object thereof is to provide a conveyance seat having a seat frame in which a resonance is suppressed by a simple means in a seat frame with an actuator.

Solution to Problem

According to a conveyance seat of the present invention, the above-described problems are solved by a conveyance seat having a seat frame with an actuator including: a resonance suppressing portion which is formed in at least a part of the seat frame by a first uneven region formed by continuously forming a plurality of non-penetrating recesses and/or protrusions.

Since the resonance suppressing portion is formed in a part of the seat frame by the first uneven region formed by continuously forming the plurality of non-penetrating recesses and/or protrusions, the natural frequency of the seat frame changes and the resonance of the seat frame due to the operational vibration of the actuator can be suppressed.

Since the resonance is suppressed by forming the first uneven region formed by continuously forming the plurality of non-penetrating recesses and/or protrusions, it is possible to provide the conveyance seat having the seat frame in which the resonance is suppressed by a simple means.

Further, since the plurality of non-penetrating recesses and/or protrusions are continuously formed, the resonance can be suppressed without decreasing the rigidity of the seat frame.

Further, in the conveyance seat, a plurality of the resonance suppressing portions may be provided in the seat frame, and the plurality of resonance suppressing portions may be arranged at a position symmetrical with respect to a center in a seat width direction.

Since the resonance suppressing portion is provided at a position symmetrical with respect to the center in the seat width direction, the resonance can be suppressed even when the resonance of the seat frame occurs biased to either the right or left side.

Further, in the conveyance seat, the resonance suppressing portion may be disposed above the actuator.

Since the resonance suppressing portion is disposed above the actuator, the resonance of the seat frame due to the operational vibration of the actuator can be suppressed from being transmitted to the ears of the seated occupant.

Further, in the conveyance seat, the resonance suppressing portion may include the first uneven region and a second uneven region which has a narrower range than the first uneven region and is formed by continuously forming the plurality of the non-penetrating recesses and/or protrusions.

Since the resonance suppressing portion includes the first uneven region and the second uneven region narrower than the first uneven region, the resonance of the seat frame due to the operational vibration of the actuator can be further suppressed.

Further, in the conveyance seat, the seat frame may be provided with a recessed portion which is recessed inward in the seat width direction and the first uneven region of the resonance suppressing portion may be disposed at a position avoiding the recessed portion.

Since the first uneven region is disposed at a position avoiding the recessed portion, the resonance of the seat frame due to the operational vibration of the actuator can be further suppressed.

Further, in the conveyance seat, the seat frame may be provided with a recessed portion which is recessed inward in the seat width direction, and the second uneven region of the resonance suppressing portion may be disposed in the recessed portion.

Since the second uneven region is disposed in the recessed portion, the resonance of the seat frame due to the operational vibration of the actuator can be further suppressed.

Further, in the conveyance seat, the seat frame may include a seat back frame, the seat back frame may include a pair of back side frames which are arranged on both sides in the seat width direction and an upper frame which connects upper ends of the pair of back side frames, the upper frame may include inclined portions at both right and left end portions, and the resonance suppressing portion may be disposed on the inclined portion.

Since the resonance suppressing portion is disposed on the inclined portion of the upper frame, the resonance of the seat frame due to the operational vibration of the actuator can be further suppressed.

Further, in the conveyance seat, a through hole may be formed on the inclined portion of the upper frame, and the resonance suppressing portion may be disposed at a position not overlapping an edge of the through hole.

Since the resonance suppressing portion is disposed at a position not overlapping the edge of the through hole provided in the inclined portion of the upper frame, the resonance of the seat frame due to the operational vibration of the actuator can be further suppressed.

Further, in the conveyance seat, the seat back frame may include a wire member supported by the inclined portion, and the resonance suppressing portion may be disposed to avoid a portion in which the upper frame supports the wire member in the inclined portion.

Since it is possible to confirm that the resonance suppressing portion is formed correctly by disposing the resonance suppressing portion to avoid a portion in which the upper frame supports the wire member in the inclined portion, the ease of inspection is improved. Further, the resonance suppressing portion is easily formed and the workability of attaching the wire member is improved.

Further, in the conveyance seat, the seat back frame may include a reinforcement member that connects both side portions of the upper frame, and the resonance suppressing portion may be disposed on the reinforcement member.

Since the resonance suppressing portion is disposed on the reinforcement member that connects both side portions of the upper frame, the resonance of the seat frame due to the operational vibration of the actuator can be further suppressed.

Advantageous Effects of Invention

According to the conveyance seat of the present invention, since the resonance suppressing portion is formed in a part of the seat frame by the region formed by continuously forming the plurality of non-penetrating recesses and/or protrusions, the natural frequency of the seat frame is changed and the resonance of the seat frame due to the operational vibration of the actuator can be suppressed.

Since the resonance is suppressed by the region formed by continuously forming the plurality of non-penetrating recesses and/or protrusions, it is possible to provide the conveyance seat having the seat frame in which the resonance is suppressed by a simple means.

Since the plurality of non-penetrating recesses and/or protrusions are continuously formed, the rigidity of the seat frame does not decrease.

Since the resonance suppressing portion is disposed at a position symmetrical with respect to the center in the seat width direction, the resonance can be suppressed even when the resonance of the seat frame occurs disproportionately to either the right or left side.

Since the resonance suppressing portion is disposed above the actuator, the resonance of the seat frame due to the operational vibration of the actuator can be suppressed from being transmitted to the ears of the seated occupant.

Since the resonance suppressing portion includes the first uneven region and the second uneven region narrower than the first uneven region, the resonance of the seat frame due to the operational vibration of the actuator can be further suppressed.

Further, since the first uneven region is disposed at a position avoiding the recessed portion, the resonance of the seat frame due to the operational vibration of the actuator can be further suppressed.

Since the second uneven region is disposed in the recessed portion, the resonance of the seat frame due to the operational vibration of the actuator n be further suppressed.

Since the resonance suppressing portion is disposed on the inclined portion of the upper frame, the resonance of the seat frame due to the operational vibration of the actuator can be further suppressed.

Since the resonance suppressing portion is disposed at a position not overlapping the edge of the through hole provided in the inclined portion of the upper frame, the resonance of the seat frame due to the operational vibration of the actuator can be further suppressed.

Since it is possible to confirm that the resonance suppressing portion is formed correctly by disposing the resonance suppressing portion to avoid a portion in which the upper frame supports the wire member in the inclined portion, the ease of inspection is improved. Further, the resonance suppressing portion is easily formed and the workability of attaching the wire member is improved.

Since the resonance suppressing portion is disposed on the reinforcement member that connects both ends of the upper frame, the resonance of the seat frame due to the operational vibration of the actuator can be further suppressed.

BRIEF DESCRIPTION OF DRAWINGS

FIG. 13 is a side view showing a seat frame in which a resonance suppressing portion is disposed on a cushion side frame.

DESCRIPTION OF EMBODIMENTS

First Embodiment

Hereinafter, a configuration of a conveyance seat according to a first embodiment of the present invention will be described with reference to the drawings. However, the embodiments described below are intended to facilitate understanding of the present invention and are not intended to limit the present invention. That is, the present invention can be modified and improved without departing from the spirit thereof and the present invention, of course, includes equivalents thereof.

Further, in the following description, the content regarding the material, shape, and size of the seat component is merely one specific example, and does not limit the present invention.

Additionally, hereinafter, a configuration example will be described by exemplifying a vehicle seat mounted on a vehicle as an example of the conveyance seat. However, the present invention is not limited to the vehicle seats mounted on ground vehicles with wheels such as automobiles and trains, but can also be applied to, for example, seats mounted on aircraft, ships, and the like that move in a place other than on a ground.

Further, in the following description, the "front to back direction" is the front to back direction of the vehicle seat and is the direction that matches the traveling direction when the vehicle travels. Further, the "seat width direction" is the width direction of the vehicle seat (in other words, the width direction of the seat body) and is the direction that matches the right to left direction when viewed from the occupant sitting on the vehicle seat. Further, the "up to down direction" is the up to down direction of the vehicle seat and is the direction that matches the vertical direction when the vehicle travels on a horizontal plane.

Further, the "vehicle exterior side" of the seat width direction means the side closer to the outside of the vehicle body (for easier understanding, the side close to the near door) and the "vehicle interior side" means the side closer to the inside of the vehicle body (for easier understanding, the side away from the near door).

Further, in the following description, the "rotation" means a rotation movement about an axis along the seat width direction unless otherwise specified.

Additionally, the shape, position, posture, and the like of each part of the vehicle seat described below will be described assuming that the vehicle seat is in the seated state unless otherwise specified.

Basic Configuration of Vehicle Seat

Figure 1:
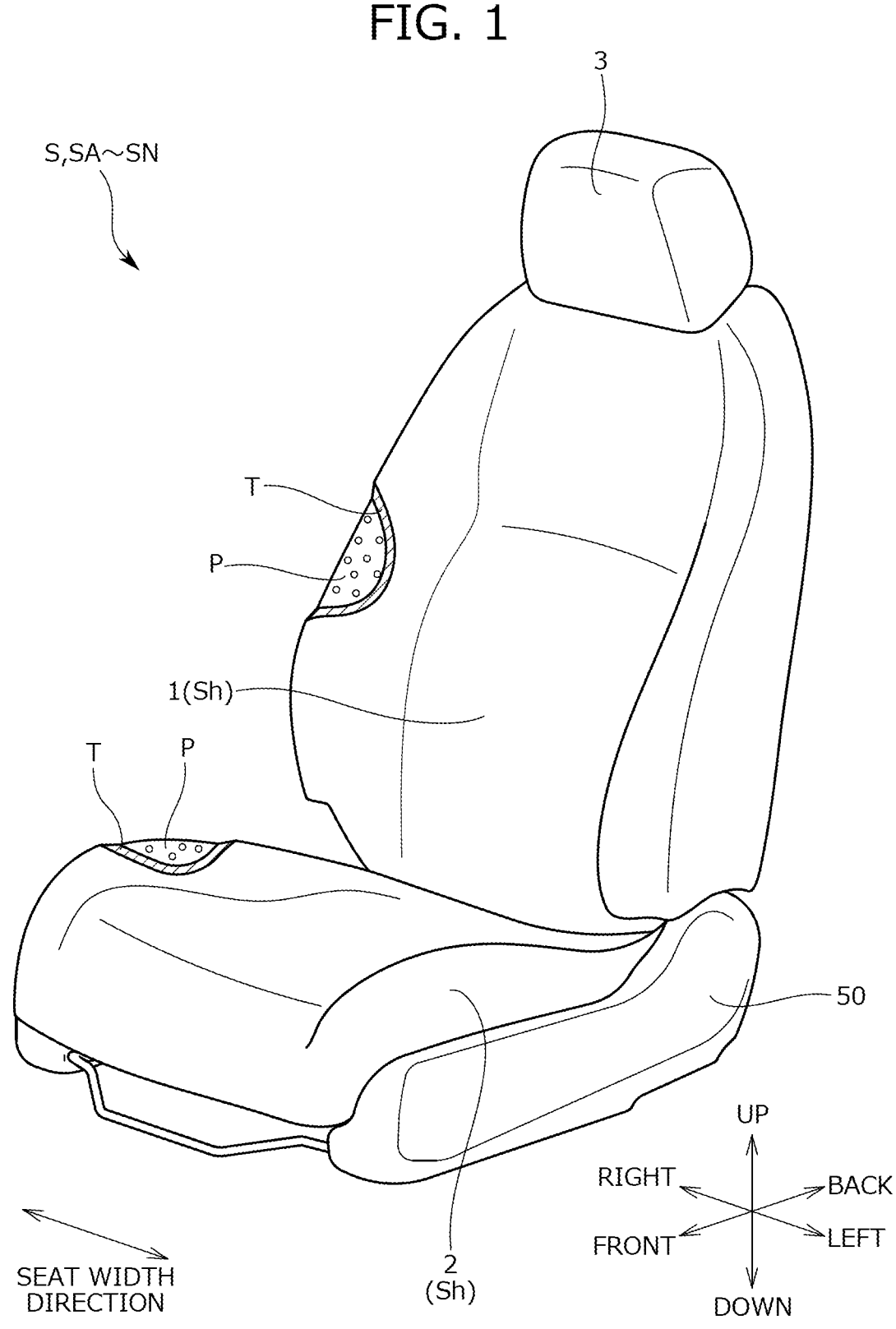
FIG. 1 is a perspective view showing an appearance of a vehicle seat according to an embodiment of the present invention.

A basic configuration of a vehicle seat (hereinafter, a vehicle seat S) according to a first example of this embodiment will be described with reference to FIG. 1. FIG. 1 is a perspective view of the vehicle seat S and a part of the vehicle seat S in FIG. 1 is shown with a cushion trim cover T or a pad P removed for convenience of illustration.

The vehicle seat S is a seat which is placed on a floor of a vehicle body and on which an occupant of the vehicle sits. In this embodiment, the vehicle seat S is used as a front seat corresponding to a front seat of the vehicle. However, the present invention is not limited thereto and the vehicle seat S can also be used as a rear seat and a second-row middle seat or a third-row rear seat in a vehicle with three rows of seats in the front to back direction.

As shown in FIG. 1, the vehicle seat S mainly includes a seat back 1 which serves as a backrest portion supporting the back of a seated person, a seat cushion 2 which serves as a seating portion supporting the buttocks of the seated person, and a headrest 3 which is placed on an upper portion of the seat back 1 and supports the head of the seated person. The seat back 1 and the seat cushion 2 are connected to sandwich a reclining mechanism 7 (see FIG. 2). The seat back 1 is rotatably connected to the seat cushion 2 so that its angle can be adjusted. The reclining mechanism 7 adjusts the inclination angle of the seat back 1. Further, the seat back 1 and the seat cushion 2 may be collectively referred to as a seat body Sh. Further, a reclining cover 50 for protecting the reclining mechanism 7 is provided on the side portion of the seat cushion 2.

<Seat Frame F

Figure 2:
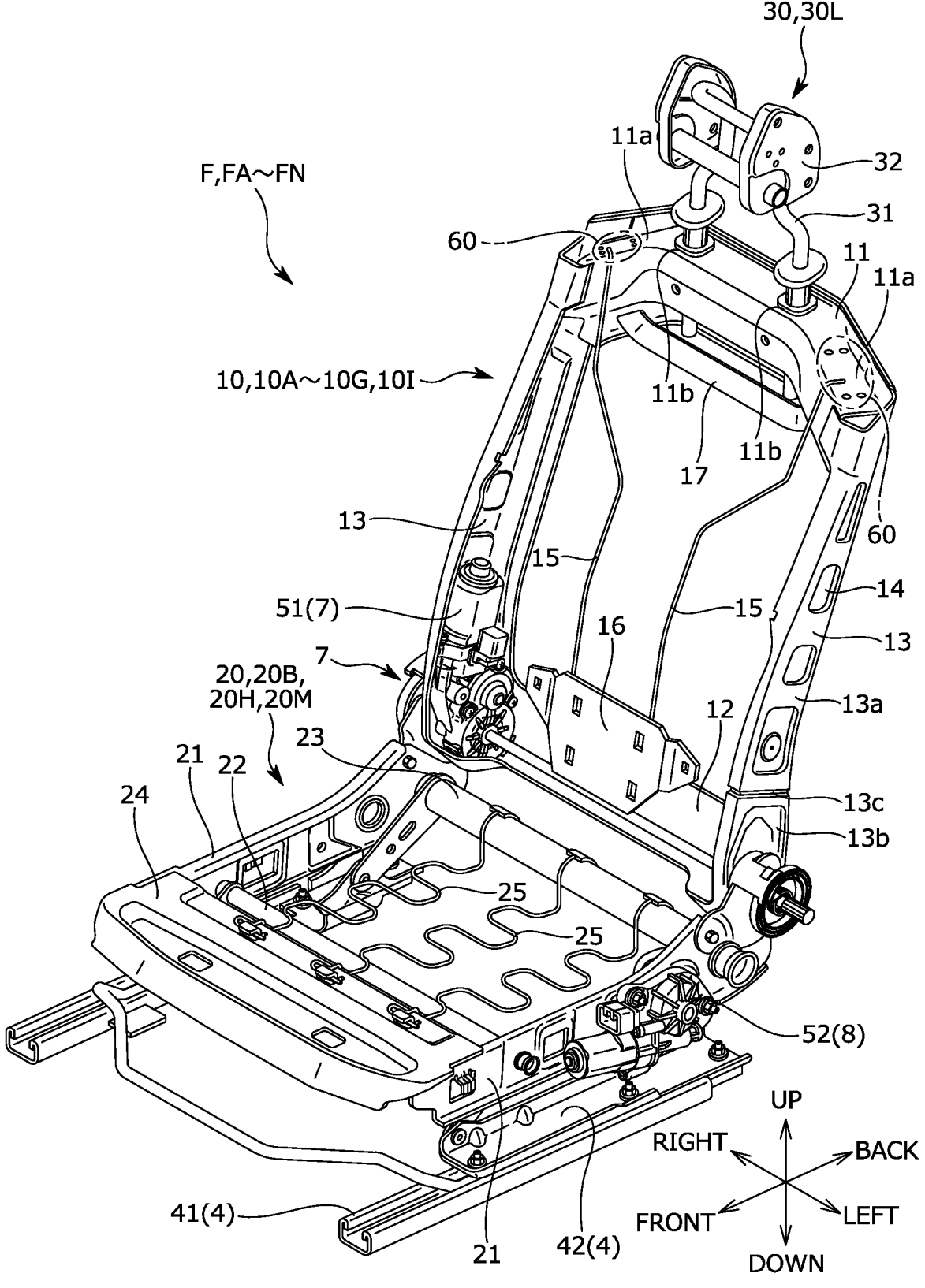
FIG. 2 is a perspective view showing a seat frame of a vehicle seat.

As shown in FIG. 2, a seat frame F is provided in the vehicle seat S and the seat frame F includes a seat back frame 10 which forms a skeleton of the seat back 1, a seat cushion frame 20 which forms a skeleton of the seat cushion 2, and a headrest frame 30 which forms a skeleton of the headrest.

Seat Back Frame 10

As shown in FIG. 2, the seat back frame 10 is formed in a rectangular frame shape as a whole and includes an upper frame 11, a lower frame 12, and a pair of back side frames 13 and 13. Further, each member that constitutes the seat back frame 10 is formed by pressing a steel plate.

The pair of back side frames 13 and 13 are arranged to be separated from each other in the seat width direction (right to left direction). The upper frame 11 is disposed between the pair of back side frames 13 and 13 and connects the upper ends of the back side frames 13 and 13. The lower frame 12 is disposed between the pair of back side frames 13 and 13 and connects the lower ends of the pair of back side frames 13 and 13.

Further, a recessed portion 14 which is recessed inward in the seat width direction is formed in each of the pair of back side frames 13 and 13.

Each of the pair of back side frames 13 and 13 is divided in its longitudinal direction and includes an upper member 13a that is located on the upper side and a lower member 13b that is located on the lower side. Further, the upper member 13a and the lower member 13b are joined by welding at a connecting portion 13c.

Further, in the seat back frame 10, a wire member 15 is provided across the upper frame 11 and the lower frame 12 and a plate-shaped pressure receiving member 16 is attached to the lower end of the wire member 15. As shown in FIG. 2, the upper end of the wire member 15 is bent in an L shape and is supported by an inclined portion 11a of the upper frame 11.

An actuator 51 (electric motor) for operating the reclining mechanism 7 is provided in the back side frame 13 which is located on the right side in the pair of back side frames 13. The actuator 51 is connected to an ECU (not shown) and can change the inclination angle of the seat back 1 with respect to the seat cushion 2 by operating the actuator 51 according to the command of the ECU or occupant.

Seat Cushion Frame 20

The seat cushion frame 20 is formed in a rectangular frame shape and a pair of cushion side frames 21 and 21 are provided on the side portions thereof. Further, the seat cushion frame 20 includes a front connecting frame 22 which connects the pair of cushion side frames 21 and 21 on the front side and a rear connecting frame 23 which connects them on the rear side.

The front connecting frame 22 and the rear connecting frame 23 which are located on the front and rear sides of the vehicle seat S are formed by round pipes. Further, a cushion pan frame 24 is provided in front of the front connecting frame 22. An S spring 25 is attached to bridge the cushion pan frame 24 and the rear connecting frame 23 and the S spring 25 serves as a pressure receiving member and supports the buttocks of the seated occupant from below.

Further, the vehicle seat S is provided with an electric height adjustment mechanism 8 which elevates the seat cushion 2 with respect to the floor surface. More specifically, the height adjustment mechanism 8 is configured to move the cushion side frames 21 and 21 up and down with respect to an upper rail 42 of a slide mechanism 4. The cushion side frame 21 and the upper rail 42 are connected by a rotatable link and the height can be adjusted by an actuator 52 provided on the cushion side frame 21.

Headrest 3 and Headrest Frame 30

The headrest 3 is attached to the upper portion of the seat back 1 to support the head of the seated person. As shown in FIG. 2, the headrest frame 30 which forms the skeleton of the headrest 3 is provided inside the headrest 3 and two headrest pillars 31 (also called headrest stays) which hang down from the lower portion of the headrest 3 are provided at both right and left ends of the headrest frame 30. The headrest pillar 31 is inserted through a headrest guide attached to the upper frame 11 of the seat back frame 10 so that the headrest 3 is attached to the seat back frame 10.

Further, a headrest side frame 32 which is formed in a plate shape is provided on the side portion of the headrest pillar 31.

Pad P and Cushion Trim Cover T

The pad P and the cushion trim cover T (cushion cover) are provided on the outside of the seat back frame 10, the seat cushion frame 20, and the headrest frame 30 to form the seat back 1, the seat cushion 2, and the headrest 3. The pad P is a urethane base material formed by foam molding using, for example, a urethane foam material, and the cushion trim cover T is formed of a skin material such as cloth, synthetic leather, or genuine leather.

Slide Mechanism 4

Further, as shown in FIG. 2, the slide mechanism 4 is provided at the lower portion of the vehicle seat S. The vehicle seat S is attached to the vehicle body floor to be slidable in the front to back direction by the slide mechanism 4.

The slide mechanism 4 is a device for sliding the vehicle seat S in the front to back direction and has a known structure (a structure of a general slide mechanism). The slide mechanism 4 includes a lower rail 41 which is fixed onto the vehicle body floor and an upper rail 42 which is slidable with respect to the lower rail 41. The upper rail 42 is slidable with respect to the lower rail 41 fixed to the vehicle body.

Reclining Mechanism 7

The reclining mechanism 7 is provided between the lower end portion of the seat back 1 and the rear end portion of the seat cushion 2. More specifically, the reclining mechanism 7 connects the seat back frame 10 of the seat back 1 and the seat cushion frame 20 of the seat cushion 2.

As described above, the reclining mechanism 7 is electrically operated and can change the angle of the seat back 1 (seat back frame 10) with respect to the seat cushion 2 (seat cushion frame 20) by the actuator 51 provided in the back side frame 13.

First Example

Figure 3:
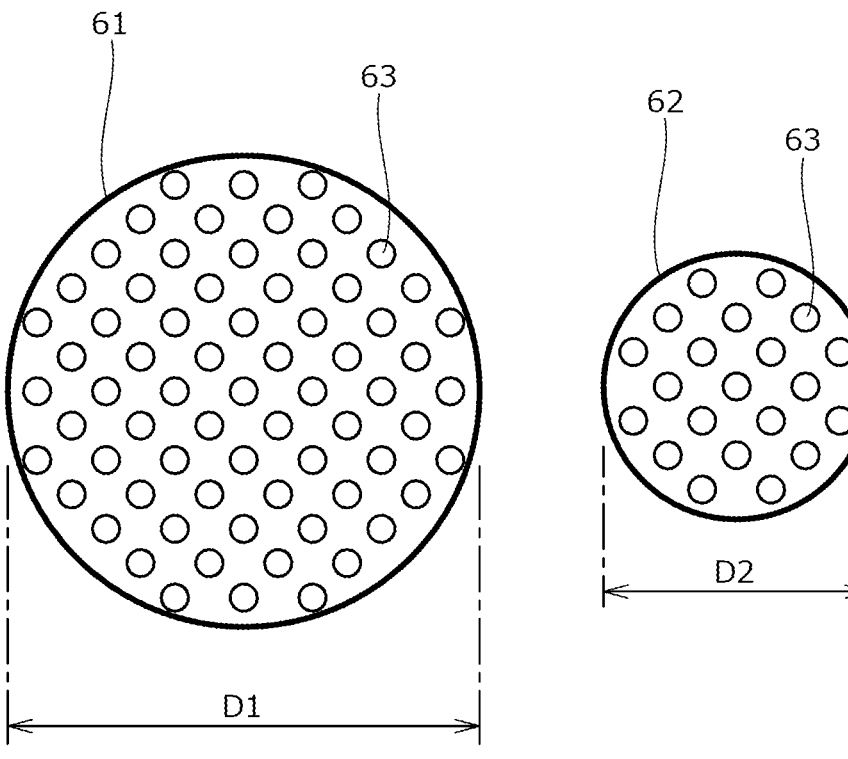
FIG. 3 is an explanatory diagram showing an uneven region constituting a resonance suppressing portion.

A resonance suppressing portion 60 which is provided in the seat frame F of the vehicle seat S according to a first example of this embodiment will be described with reference to FIGS. 3 to 5. FIG. 3 is an explanatory diagram showing an uneven region 61 which constitutes the resonance suppressing portion 60 and FIGS. 4A to 4F are diagrams showing an uneven portion 63 formed in the uneven region 61. Further, FIG. 5 is a diagram showing the seat frame F in which the resonance suppressing portion 60 is disposed on the inclined portion 11a of the upper frame 11.

The resonance suppressing portion 60 is formed by the uneven region 61 (first uneven region) in which non-penetrating recesses or protrusions or recesses or protrusions are continuously formed in a part of the seat frame F. The uneven region 61 may be formed in a plate-shaped portion of the seat frame F. Hereinafter, the non-penetrating recesses or protrusions formed in the uneven region 61 are referred to as the uneven portion 63. Additionally, the uneven portion 63 is a small recess or protrusion generally referred to as a dimple. Further, a linear protrusion (ridge-shaped portion) or a linear recess (groove-shaped portion) shown in FIGS. 4B to 4E are also included in the uneven portion 63 (dimple).

Since the uneven region 61 of the resonance suppressing portion 60 is formed on the seat frame F, the section modulus of the seat frame F changes and the natural frequency of the seat frame F changes. Accordingly, the resonance of the seat frame F due to the operational vibration of the actuator 51 can be suppressed.

The uneven region 61 is formed with a diameter D1 in the range of about 10 mmφ to 40 mmφ. The size or position of the uneven region 61 is adjusted so that the seat frame F has a desired natural frequency. The uneven region 61 may be formed in a polygonal shape such as a rectangular, triangular, or hexagonal shape in plan view.

Further, the resonance suppressing portion 60 may be formed by a plurality of uneven regions 61. The plurality of uneven regions 61 do not need to have the same width and may be formed to have a narrower range than the uneven region 61 as in the second uneven region 62 shown in FIG. 3. That is, the second uneven region 62 may be provided in a circular range having a diameter D2 smaller than a diameter D1. Additionally, in the following description, when the resonance suppressing portion 60 is formed by combining the uneven regions 61 of different ranges, the standard uneven region 61 will be referred to as a "first uneven region" and the uneven region having a narrower range will be separately referred to as a "second uneven region".

The uneven portion 63 formed in the uneven region 61 will be described with reference to FIGS. 4A to 4F.

Figure 4A:
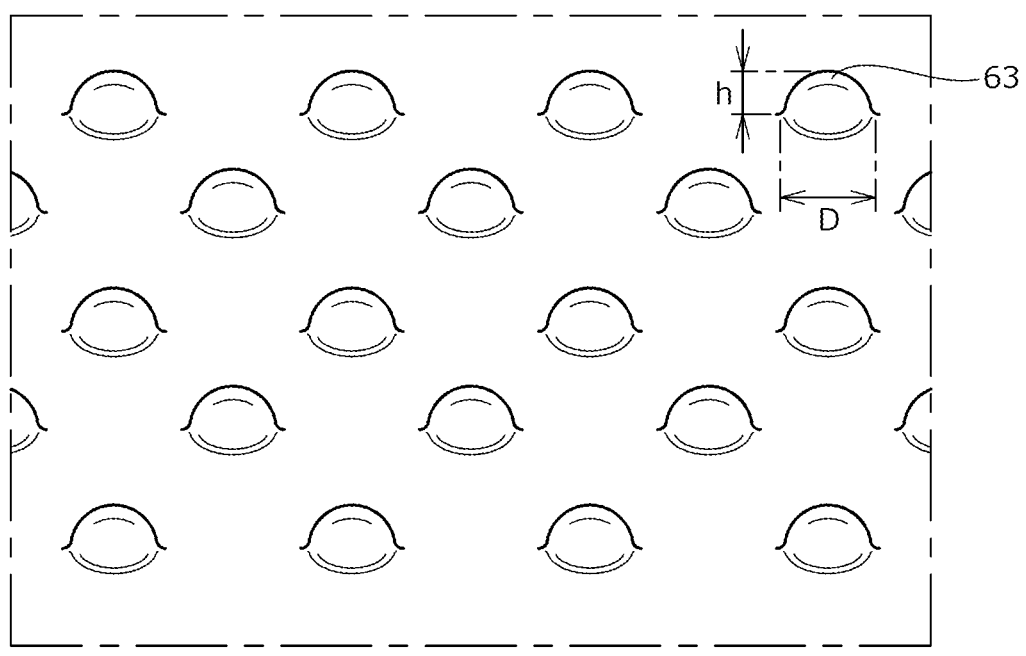
FIG. 4A is a diagram showing an example of an uneven region formed by a plurality of continuous protrusions.
Figure 5:
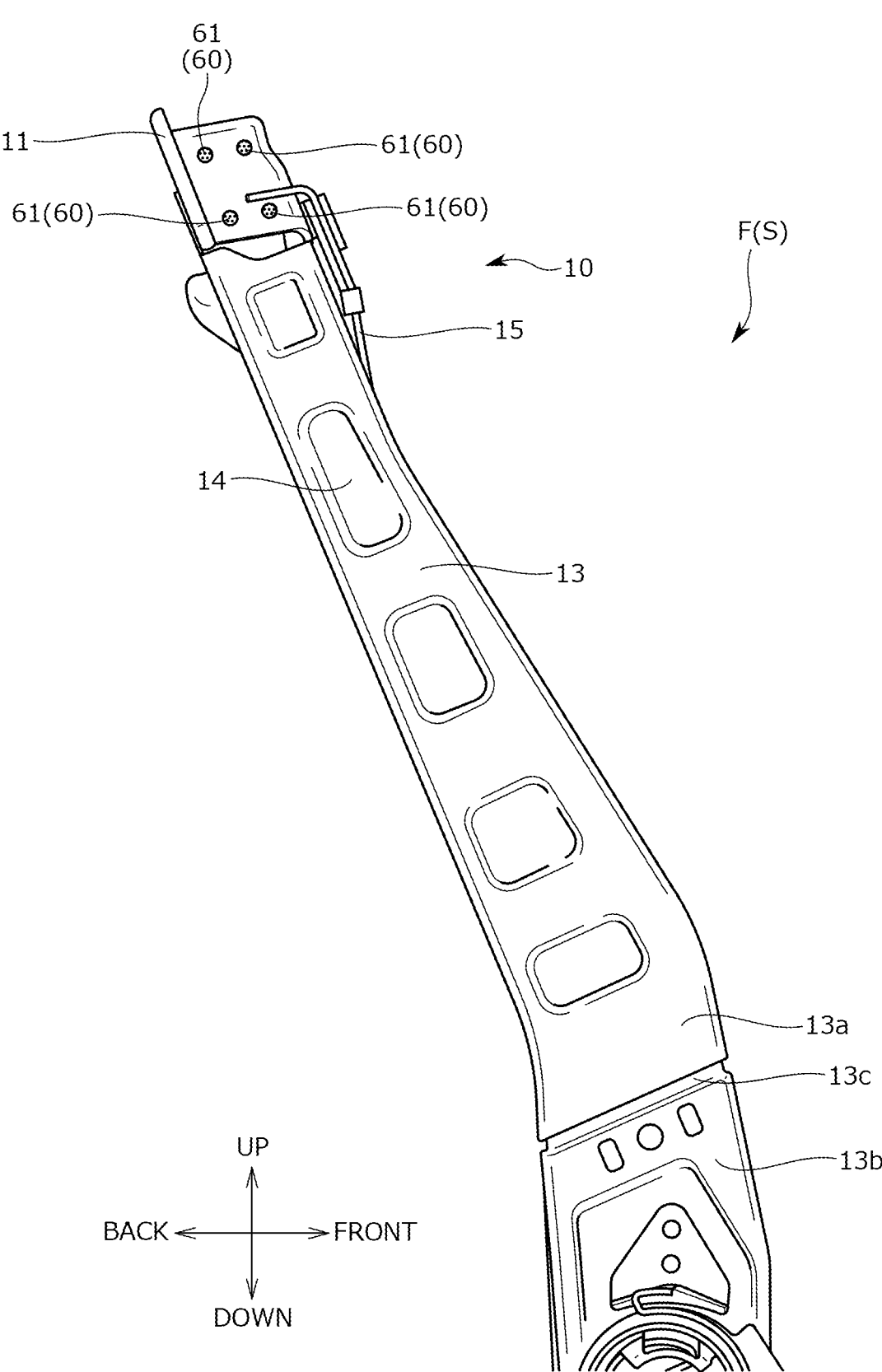
FIG. 5 is a side view showing a seat frame in which a resonance suppressing portion is disposed on an inclined portion of an upper frame.

The uneven portion 63 shown in FIG. 4A is formed by a hemispherical protrusion. The diameter D of each protrusion is in the range of 3 mmφ to 6 mmφ and the depth h thereof is in the range of 1 mm to 3 mm. However, the size of the uneven portion 63 is not limited thereto, the diameter D of the uneven portion 63 may be 6 mmφ or more, and the depth h thereof may be 1 mm or less and 3 mm or more.

Recesses may be arranged continuously as the uneven portions 63 and each uneven portion 63 may be formed in a rectangular or triangular shape in plan view.

Figure 4B:
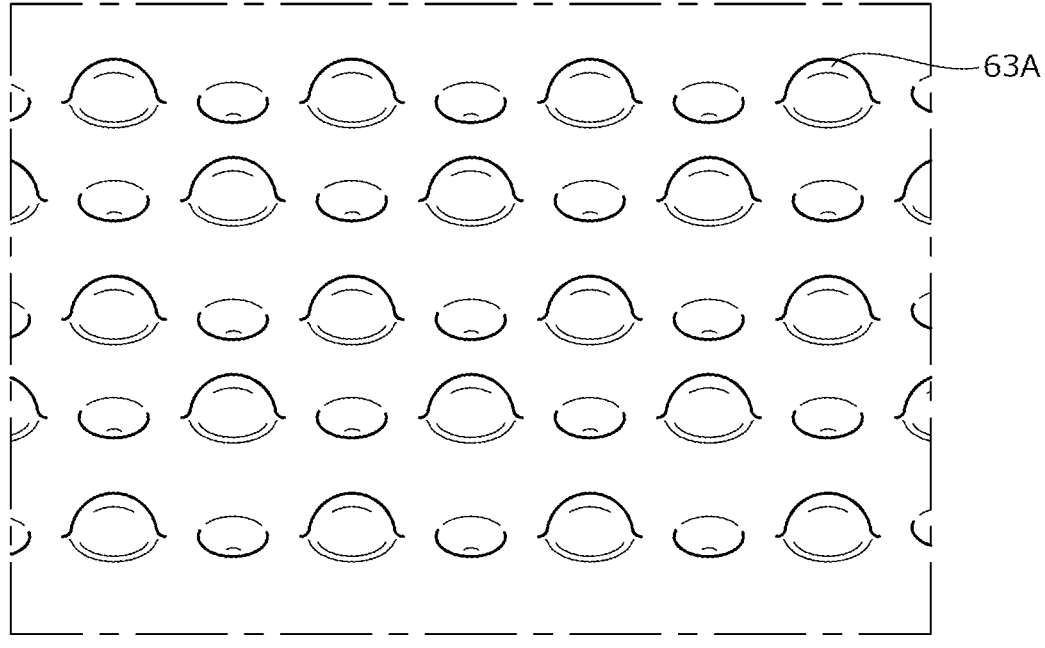
FIG. 4B is a diagram showing an example of an uneven region formed by a plurality of continuous protrusions and recesses.

An uneven portion 63 A shown in FIG. 4B is formed by a plurality of continuous protrusions and recesses. Each of the protrusion and the recess is formed in a hemispherical shape and the protrusion and the recess are arranged alternately. In other words, the adjacent protrusions in the uneven region 61 protrude in opposite directions.

Figure 4C:
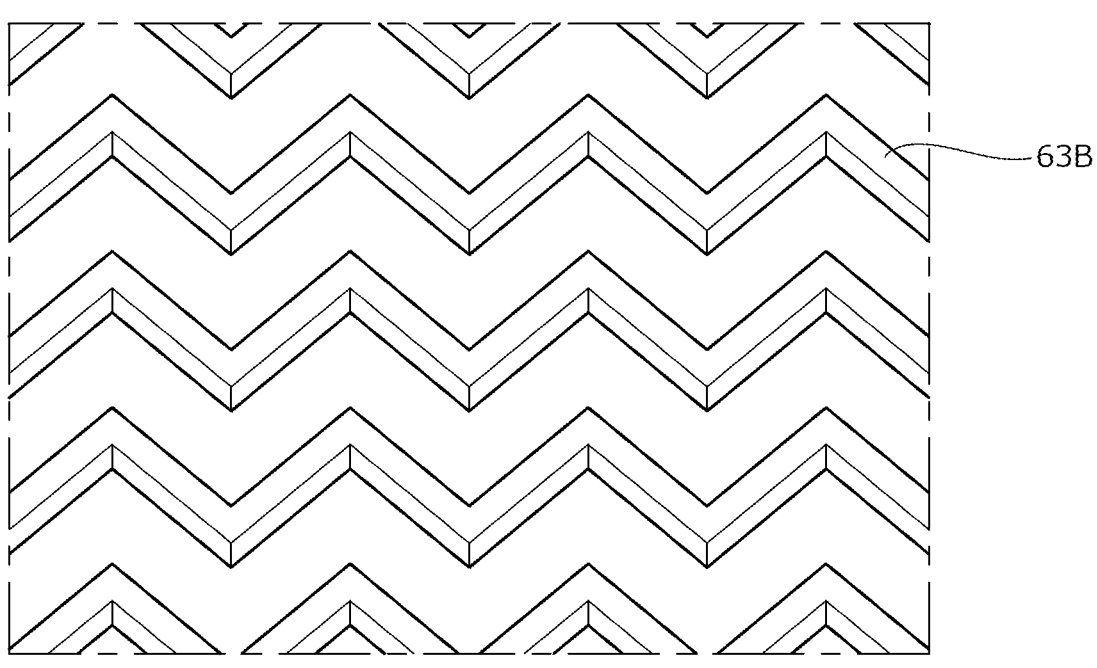
FIG. 4C is a diagram showing an example of an uneven region formed by a plurality of linear protrusions formed in a zigzag shape.

An uneven portion 63B shown in FIG. 4C is formed by a plurality of linear protrusions which are formed in a zigzag shape in plan view, in other words, repeatedly bent.

Figure 4D:
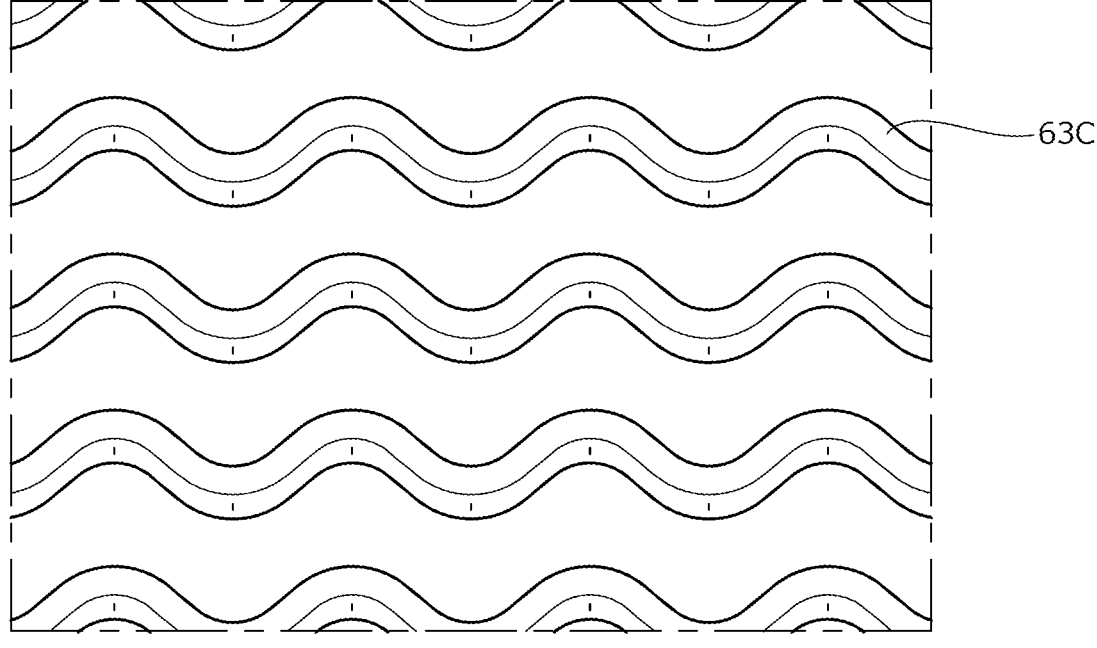
FIG. 4D is a diagram showing an example of an uneven region formed by a plurality of linear protrusions formed in a wavy shape.

An uneven portion 63C shown in FIG. 4D is formed by a plurality of linear protrusions which are formed in a wavy shape in plan view.

Figure 4E:
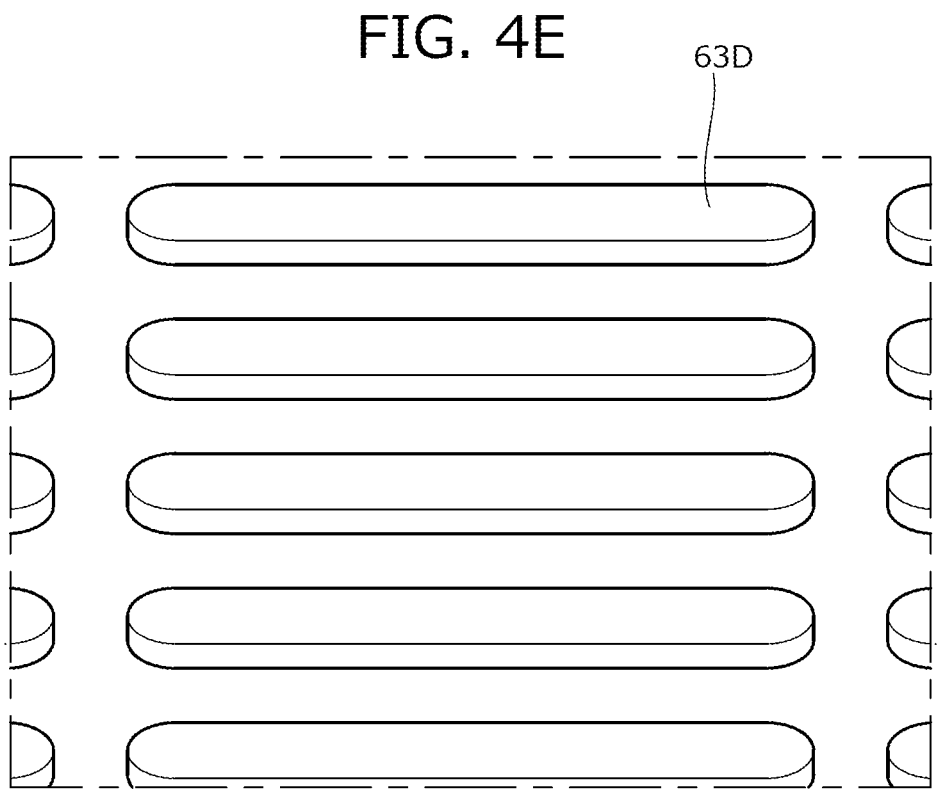
FIG. 4E is a diagram showing an example of an uneven region formed by a linear protrusion formed in an elongated straight line.

An uneven portion 63D shown in FIG. 4E is formed by a plurality of linear protrusions which are formed in an elongated straight line in plan view.

Figure 4F:
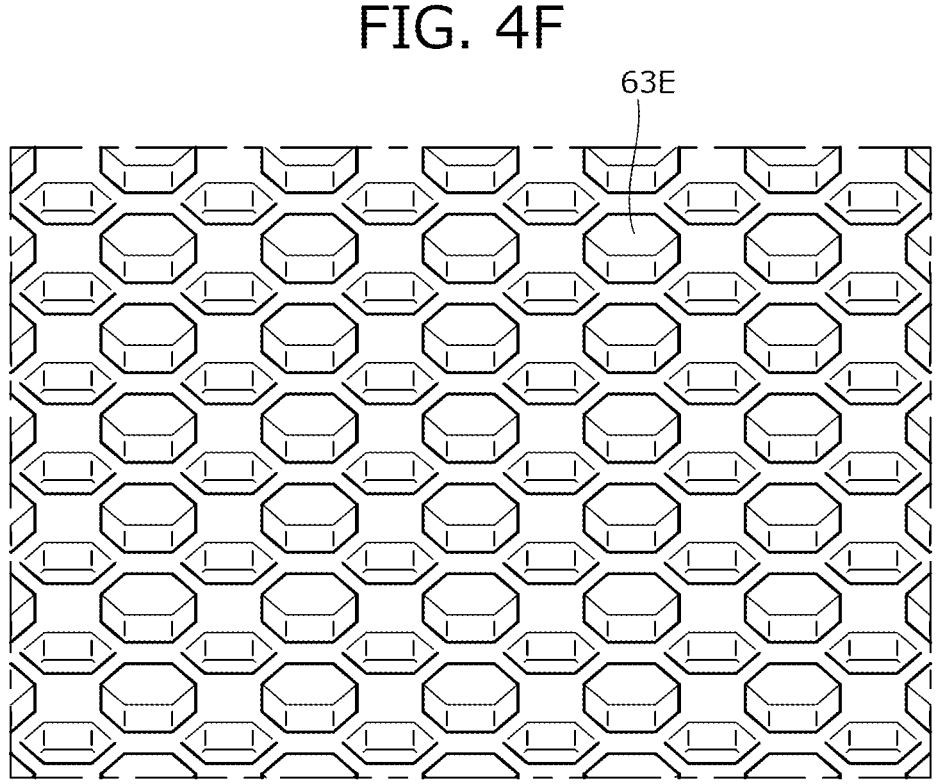
FIG. 4F is a diagram showing an example of an uneven region formed by hexagonal protrusions and recesses.

An uneven portion 63E shown in FIG. 4F is formed by continuously arranging the protrusions and recesses which are formed in a hexagonal shape in plan view.

In the seat back frame 10 of the seat frame F of the vehicle seat S, as shown in FIG. 5, the resonance suppressing portion 60 is disposed on the inclined portion 11a of the upper frame 11.

FIG. 5 shows the resonance suppressing portion 60 which is disposed on the inclined portion 11a located on the right side of the upper frame 11, but the resonance suppressing portion 60 is also disposed on the inclined portion 11a located on the left side of the upper frame 11 as shown in FIG. 2.

That is, the resonance suppressing portion 60 is disposed at a position symmetrical with respect to the center in the seat width direction. Further, in other words, the resonance suppressing portion 60 is disposed on the side of the upper frame 11 in the vicinity of the connection portion between the upper frame 11 and the back side frame 13.

Further, the resonance suppressing portion 60 is disposed above the actuator 51. Since the resonance suppressing portion 60 is disposed above the actuator 51, the resonance the back side 13 due to the operational vibration of the actuator 51 can be suppressed from being transmitted to the ears of the seated occupant.

As shown in FIG. 5, the resonance suppressing portion 60 includes four uneven regions 61. Four uneven regions 61 are arranged at predetermined intervals at the apexes of a rectangle.

The resonance suppressing portion 60 includes four uneven regions 61, but the present invention is not limited thereto. The resonance suppressing portion may include one to three uneven regions 61 or five or more uneven regions 61.

Since the resonance suppressing portion 60 formed by the uneven region 61 is provided on the upper frame 11, the natural vibration of the seat frame F changes at a position close to the ears of the seated occupant and the occurrence of the resonance between the actuator 51 and the seat back frame 10 can be suppressed. That is, since the resonance suppressing portion 60 is at a position close to the ears of the occupant, the occupant is less likely to feel the resonance sound.

Further, since the plurality of uneven regions 61 are provided, the rigidity of the upper frame 11 increases and the response of the seat back frame 10 can be reduced even when the same vibration is input.

Additionally, as shown in FIG. 5, the uneven region 61 is disposed on the inclined portion 11 a to avoid a portion which supports the wire member 15. In other words, the uneven region is disposed at a place in which the wire member 15 is not disposed and a position other than a place in which the end portion of the wire member 15 exists.

Since it is possible to confirm that the resonance suppressing portion is formed correctly by disposing the resonance suppressing portion 60 to avoid a portion which supports the wire member 15, the ease of inspection is improved. Further, the resonance suppressing portion is easily formed and the workability of attaching the wire member 15 is improved.

Second Example

Figure 6:
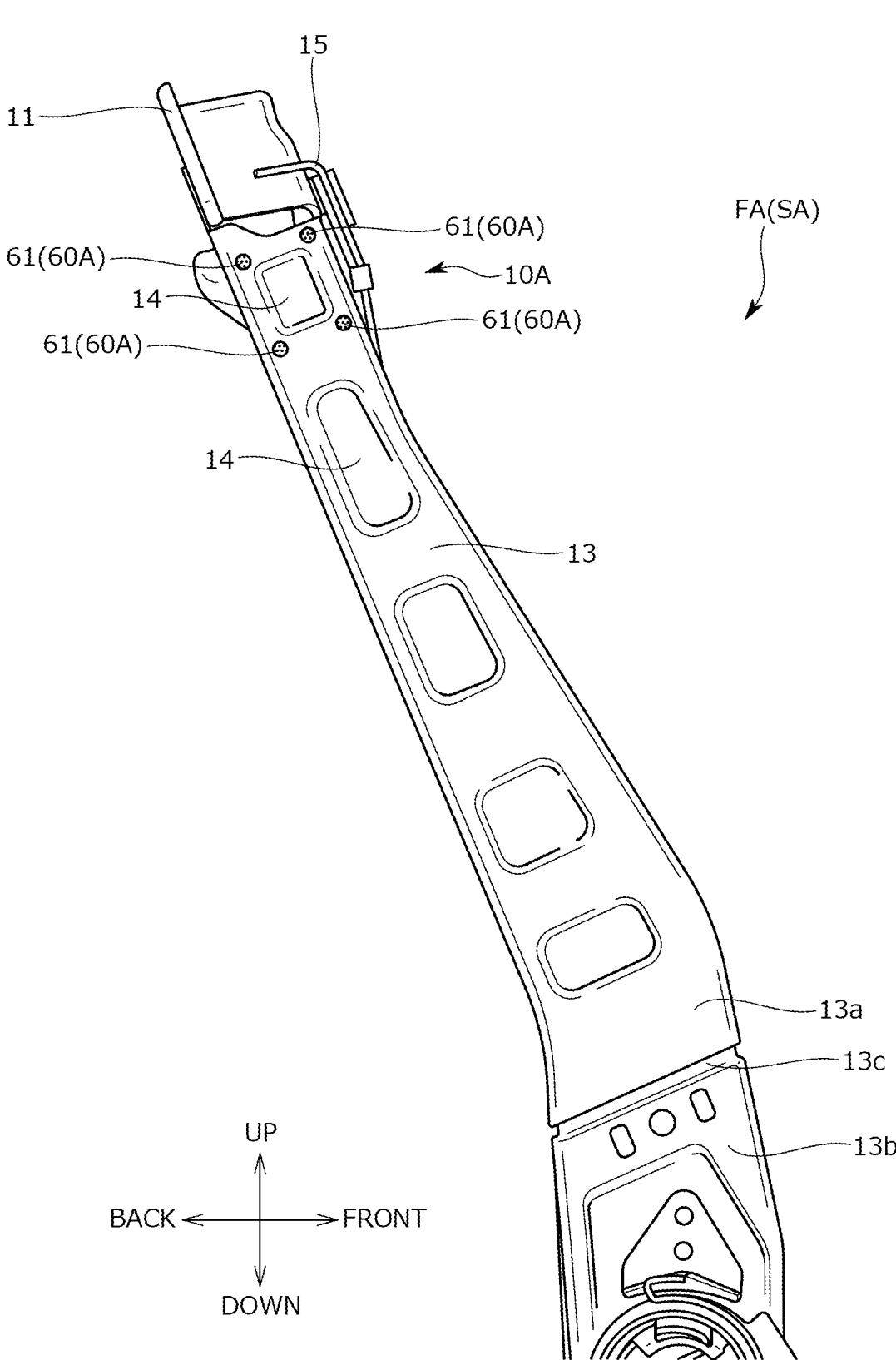
FIG. 6 is a side view showing a seat frame in which a resonance suppressing portion is disposed on an upper portion of a back side frame.

A vehicle seat SA according to a second example of this embodiment will be described with reference to FIG. 6. FIG. 6 is a side view showing a seat frame FA of the vehicle seat SA and is a diagram showing a position of a resonance suppressing portion 60A. Additionally, since the vehicle seat SA has the same configurations as those of the vehicle seat S of the first example except for the position of the resonance suppressing portion 60A, the same configurations and members as those of the vehicle seat S will be designated by the same reference numerals and the description thereof will be omitted.

As shown in FIG. 6, the resonance suppressing portion 60A is disposed on the upper portion of the back side frame 13 in a seat back frame 10A of the seat frame FA. In other words, the resonance suppressing portion 60A is disposed on the side of the back side frame 13 in the vicinity of the connection portion which connects the upper frame 11 and the back side frame 13.

The resonance suppressing portion 60A includes four uneven regions 61 and the uneven regions 61 are arranged at predetermined intervals at the apexes of a rectangle. Further, the uneven region 61 is disposed to avoid the recessed portion 14 formed in the back side frame 13. In other words, the uneven region 61 is disposed on a flat portion around the recessed portion 14.

Further, although not shown in the drawings, the resonance suppressing portion 60A is also disposed on the upper portion of the left back side frame 13. The resonance suppressing portion 60A is disposed at a position symmetrical with respect to the center in the seat width direction.

Since the resonance suppressing portion 60A formed by the uneven region 61 is provided on the upper portion of the back side frame 13, the natural vibration of the seat frame FA, that is, the seat back frame 10A changes at a position close to the ears of the seated occupant and the occurrence of the resonance between the actuator 51 and the seat back frame 10A can be suppressed. That is, since the resonance suppressing portion 60A is at a position close to the ears of the occupant, the occupant is less like to feel the resonance sound.

Third Example

Figure 7:
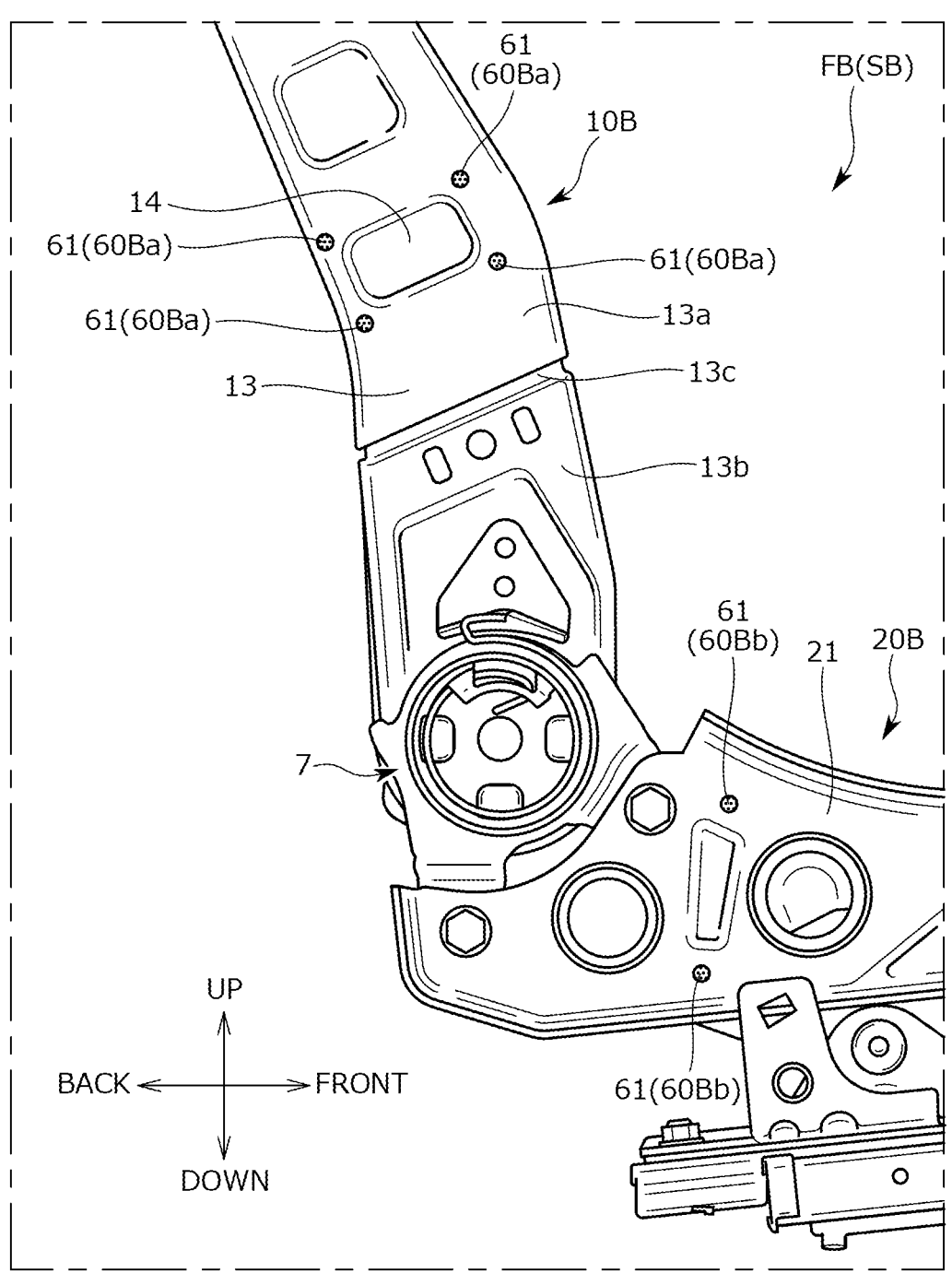
FIG. 7 is a side view showing a seat frame in which a resonance suppressing portion is disposed in the vicinity of a connection portion between a back side frame and a cushion side frame.

A vehicle seat SB according to a third example of this embodiment will be described with reference to FIG. 7. FIG. 7 is a side view showing a connection portion between a seat back frame 10B and a seat cushion frame 20B constituting a seat frame FB of the vehicle seat SB and is a diagram showing the positions of resonance suppressing portions 60Ba and 60Bb disposed on the seat frame FB. Additionally, since the vehicle seat SB has the same configurations as those of the vehicle seats S and SA of the first example and the second example except for the positions of the resonance suppressing portions 60Ba and 60Bb, the same configurations and members as those of the vehicle seats S and SA will be designated by the same reference numerals and the description thereof will be omitted.

As shown in FIG. 7, the resonance suppressing portion 60Ba is disposed on the side of the back side frame 13 at the base of the back side frame 13, in other words, in the vicinity of the connection portion between the back side frame 13 and the cushion side frame 21 in the seat back frame 10B.

Further, in other words, the resonance suppressing portion 60Ba is disposed on the side of the upper member 13a in the vicinity of the connecting portion 13c between the upper member 13a and the lower member 13b constituting the back side frame 13. The resonance suppressing portion 60Ba may be disposed on the side of the lower member 13b.

Further, the strength near the connecting portion 13c is lower than other portions and the resonance is likely to occur. Therefore, since the resonance suppressing portion 60Ba is disposed in the vicinity of the connecting portion 13c, the rigidity is improved. Then, since the natural frequency is changed by changing the section modulus of the back side frame 13, the occurrence of the resonance can be suppressed.

Further, the resonance suppressing portion 60Bb is disposed on the side of the cushion side frame 21 at the base of the cushion side frame 21, that is, in the vicinity of the connection portion between the back side frame 13 and the cushion side frame 21 in the seat cushion frame 20B.

At the base of the seat back frame 10B and the seat cushion frame 20B, that is, in the vicinity of the connecting portion, the relatively flat portion has a larger area than other portions, that is, the frame is formed to have a larger width. Since the resonance is likely to occur in a portion having a flat and wide surface, the natural frequencies of the seat back frame 10B and the seat cushion frame 20B constituting the seat frame FB are changed by disposing the uneven region 61 on a wide surface portion as in the resonance suppressing portions 60Ba and 60Bb and the resonance can be suppressed more effectively.

Additionally, the uneven region 61 is disposed to avoid the recessed portion 14 of the back side frame 13 or a recessed portion 28 formed in the cushion side frame 21.

Fourth Example

Figure 8:
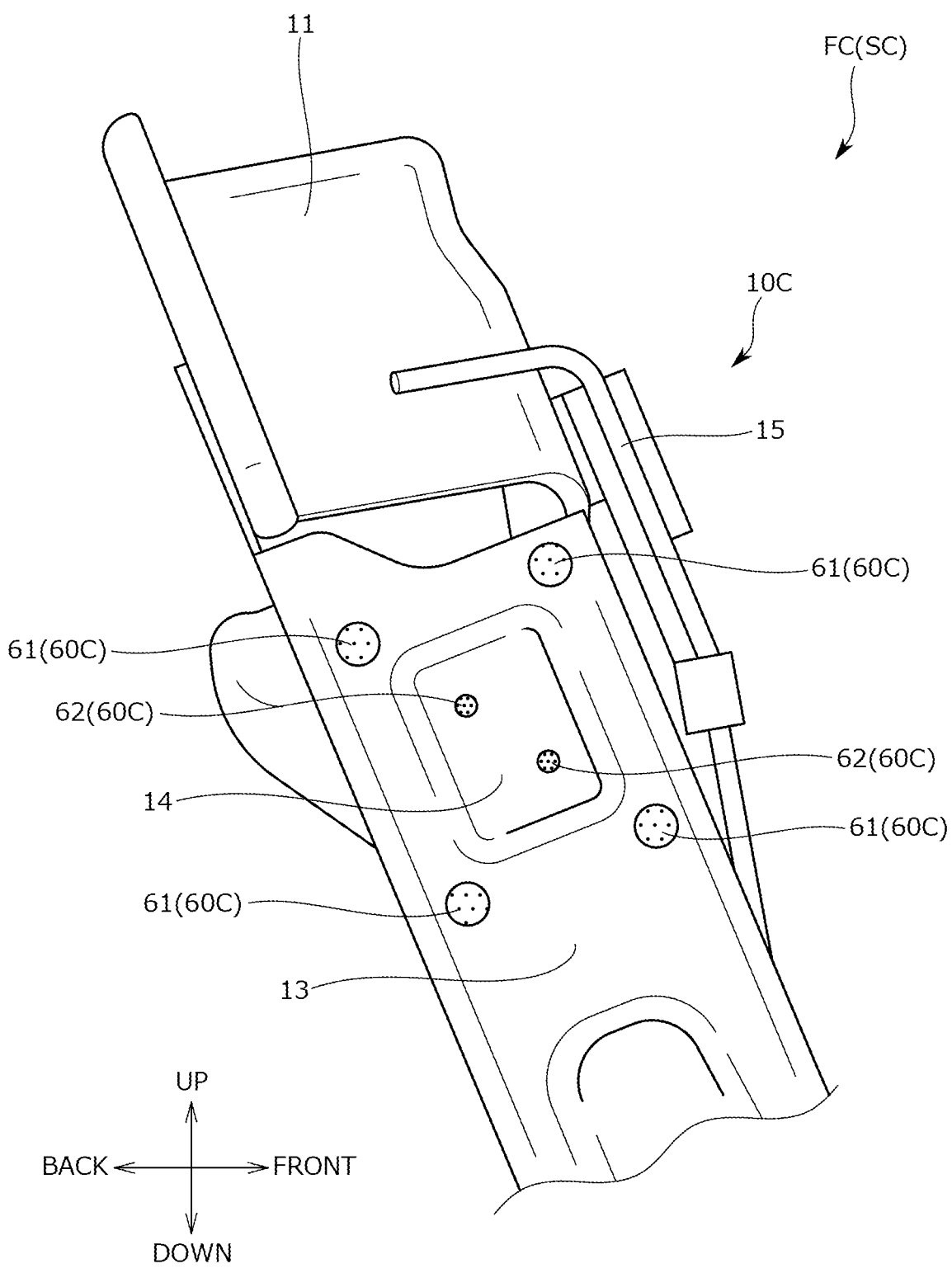
FIG. 8 is a side view showing a seat frame in which a resonance suppressing portion having a first uneven region and a second uneven region is disposed.

A vehicle seat SC according to a fourth example of this embodiment will be described with reference to FIG. 8. FIG. 8 is an enlarged side view of an upper portion of a seat back frame 10C of a seat frame FC of the vehicle seat SC and is a diagram showing a position of a resonance suppressing portion 60C. Additionally, since the vehicle seat SC has the same configurations as those of the vehicle seats S, SA, and SB of the first example to the third example except for the position of the resonance suppressing portion 60C, the same configurations and members as those of the vehicle seats S, SA, and SB will be designated by the same reference numerals and the description thereof will be omitted.

The resonance suppressing portion 60° C. includes two types of uneven regions (the first uneven region 61, the second uneven region 62). The first uneven region 61 and the second uneven region 62 are regions in which the protrusions or (uneven 63) recesses portions are continuously arranged, but the range of the second uneven region 62 is formed to be narrower than the range of the first uneven region 61. In other words, the second uneven region 62 is formed so that the area of the second uneven region 62 is smaller than the area of the first uneven region 61.

The resonance suppressing portion 60C is disposed on the upper portion of the back side frame 13 of the seat back frame 10C as in the resonance suppressing portion 60A of the second example of this embodiment and the first uneven region 61 is disposed around the recessed portion 14 as in the uneven region 61 of the resonance suppressing portion 60A. Then, at least one second uneven region 62 narrower than the first uneven region 61 is disposed between the first uneven regions 61. In the fourth example, four second uneven regions 62 are arranged between the first uneven regions 61. Further, the second uneven region 62 is disposed in the recessed portion 14. Three or more second uneven regions 62 may be arranged in the recessed portion 14.

Additionally, the resonance suppressing portion 60C is similarly disposed on the back side frame 13 disposed on the left side and is disposed symmetrically with respect to the center in the seat width direction.

Since the second uneven region 62 which is smaller than the first uneven region 61 is disposed between the plurality of first uneven regions 61 in this way, the section modulus of the seat back frame 10C changes and the rigidity of the seat back frame 10C is further increased. Accordingly, the natural frequency of the seat frame FC changes and the occurrence of the resonance between the actuator 51 and the seat back frame 10C can be suppressed.

Fifth Example

Figure 9:
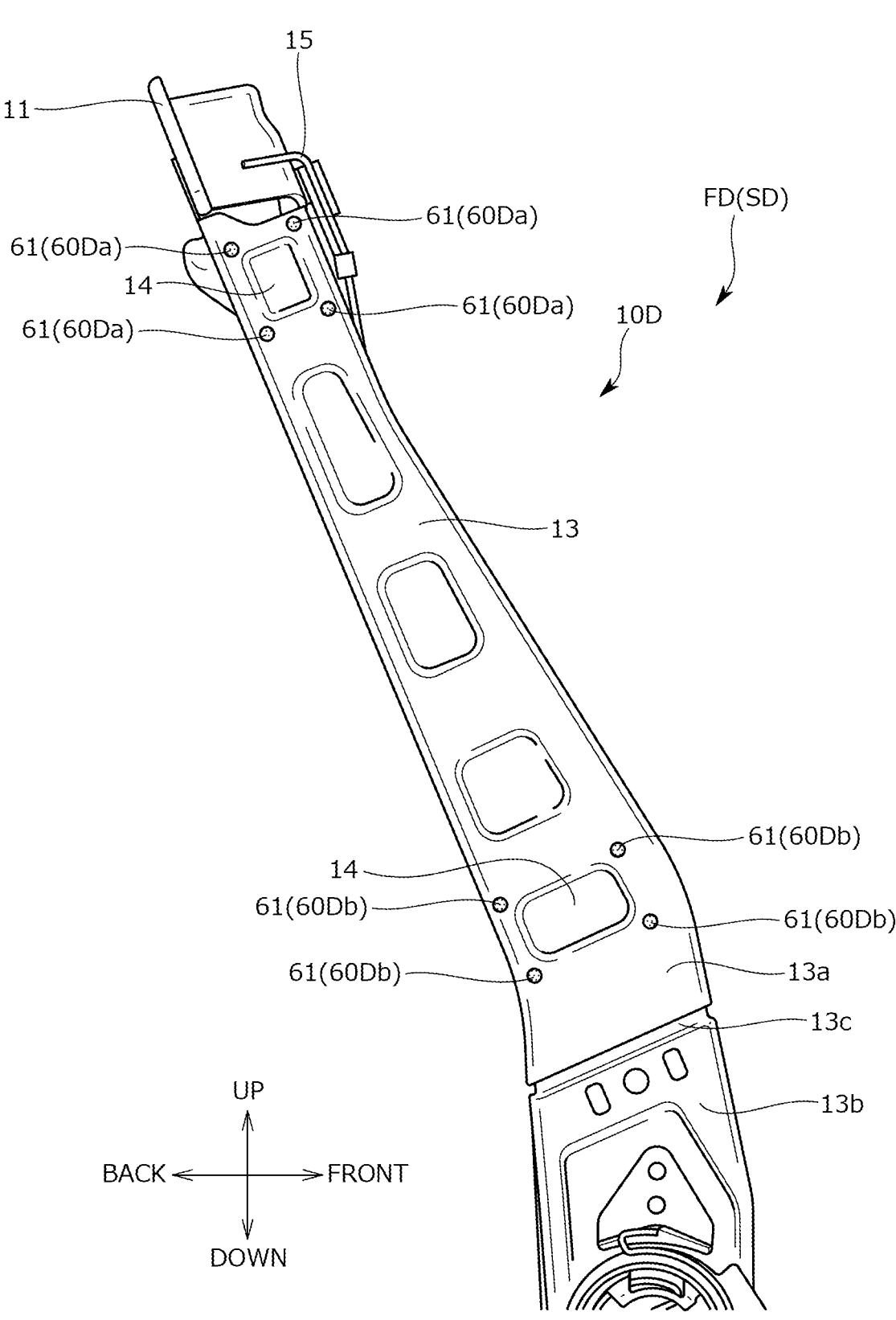
FIG. 9 is a side view showing a seat frame in which a resonance suppressing portion is disposed in the vicinity of an upper portion and a base of a side frame.

A vehicle seat SD according to a fifth example of this embodiment will be described with reference to FIG. 9. FIG. 9 is a side view showing a seat frame FD of the vehicle seat SD.

As shown in FIG. 9, two resonance suppressing portions 60Da and 60Db are arranged on the back side frame 13 of a seat back frame 10D of the seat frame FD. The resonance suppressing portion 60Da is disposed on the upper portion of the back side frame 13 and the resonance suppressing portion 60Db is disposed on the base of the back side frame 13. Further, the resonance suppressing portions 60Da and 60Db are similarly arranged on the back side frame 13 disposed on the left side and are arranged symmetrically with respect to the center in the seat width direction.

Additionally, since the vehicle seat SD has the same configurations as those of the vehicle seats S and SA to SC of the first example to the fourth example except for the positions of the resonance suppressing portions 60Da and 60Db, the same configurations and members as those of the vehicle seats S and SA to SC will be designated by the same reference numerals and the description thereof will be omitted.

The resonance suppressing portion 60Db is provided in the vicinity of the base of the back side frame 13 with a large surface and the resonance suppressing portion 60Da is provided on the upper portion of the back side frame 13 close to the ears of the occupant. With such an arrangement, it is also possible to suppress the occurrence of the resonance in the upper portion of the back side frame 13 near the ears of the occupant while suppressing the resonance in the vicinity of the base of the back side frame 13 in which the resonance is likely to occur.

Sixth Example

Figure 10:
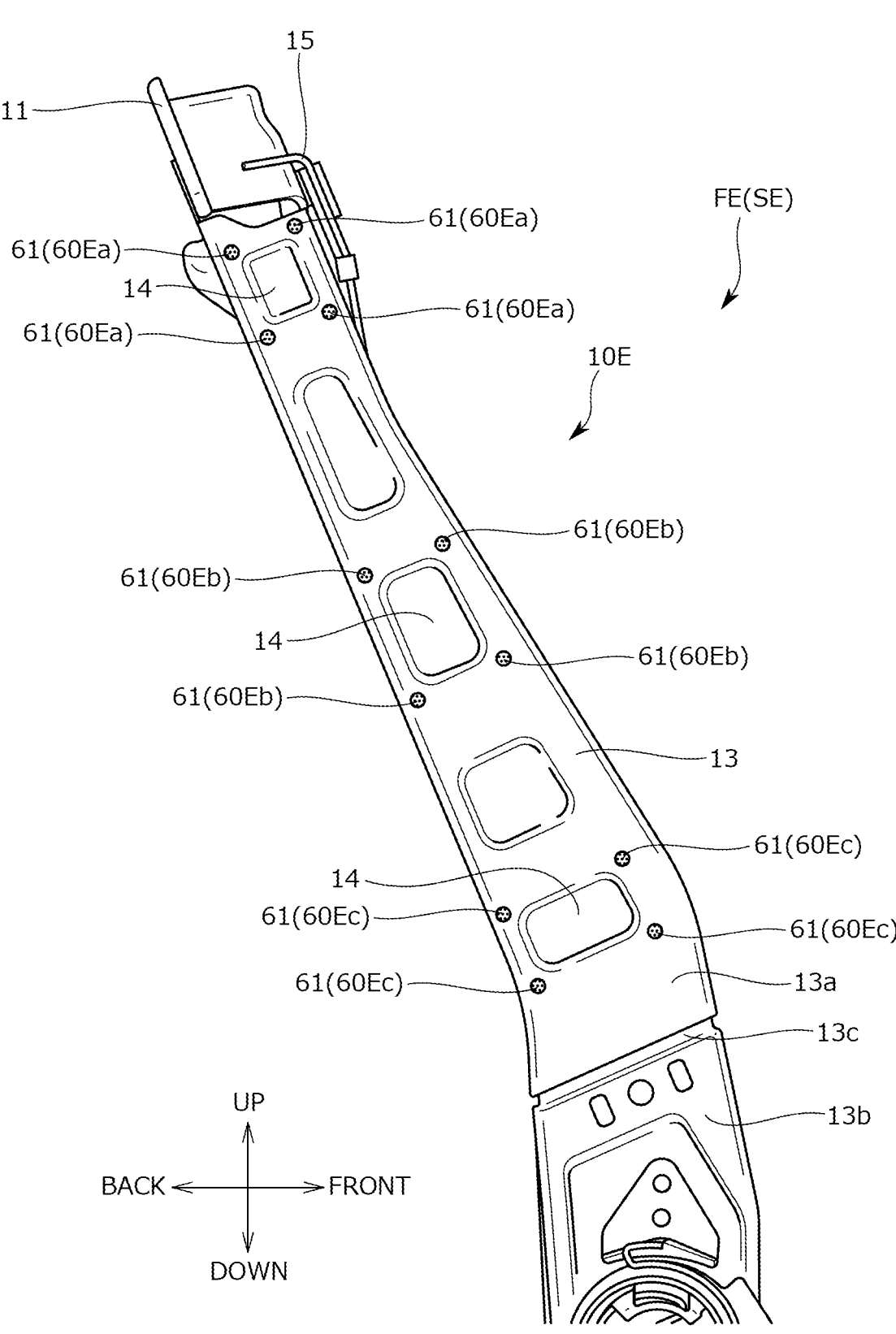
FIG. 10 is a side view showing a seat frame in which resonance suppressing portions are arranged at three positions of a side frame at intervals.

A vehicle seat SE according to a sixth example of this embodiment will be described with reference to FIG. 10. FIG. 10 is a side view showing a seat frame FE of the vehicle seat SE.

As shown in FIG. 10, three resonance suppressing portions 60Ea, 60Eb, and 60Ec are arranged on the back side frame 13 of a seat back frame 10E of the seat frame FE at intervals. The resonance suppressing portion 60Ea is disposed on the upper portion of the back side frame 13, the resonance suppressing portion 60Eb is disposed on the middle portion of the back side frame 13, and the resonance suppressing portion 60Ec is disposed on the base of the back side frame 13, more specifically, the base of the upper member 13a.

Further, three resonance suppressing portions 60Ea, 60Eb, and 60Ec are similarly arranged on the back side frame 13 disposed on the left side and are arranged symmetrically with respect to the center in the seat width direction.

Additionally, since the vehicle seat SE has the same configurations as those of the vehicle seats S and SA to SD of the first example to the fifth example except for the positions of the resonance suppressing portions 60Ea to 60Ec, the same configurations and members as those of the vehicle seats S and SA to SD will be designated by the same reference numerals and the description thereof will be omitted.

Since the resonance suppressing portions 60Ea, 60Eb, and 60Ec are formed at intervals in at least three positions of the back side frame 13, it is possible to more effectively suppress the occurrence of the resonance between the actuator 51 and the seat back frame 10E (seat frame FE).

Seventh Example

Figure 11:
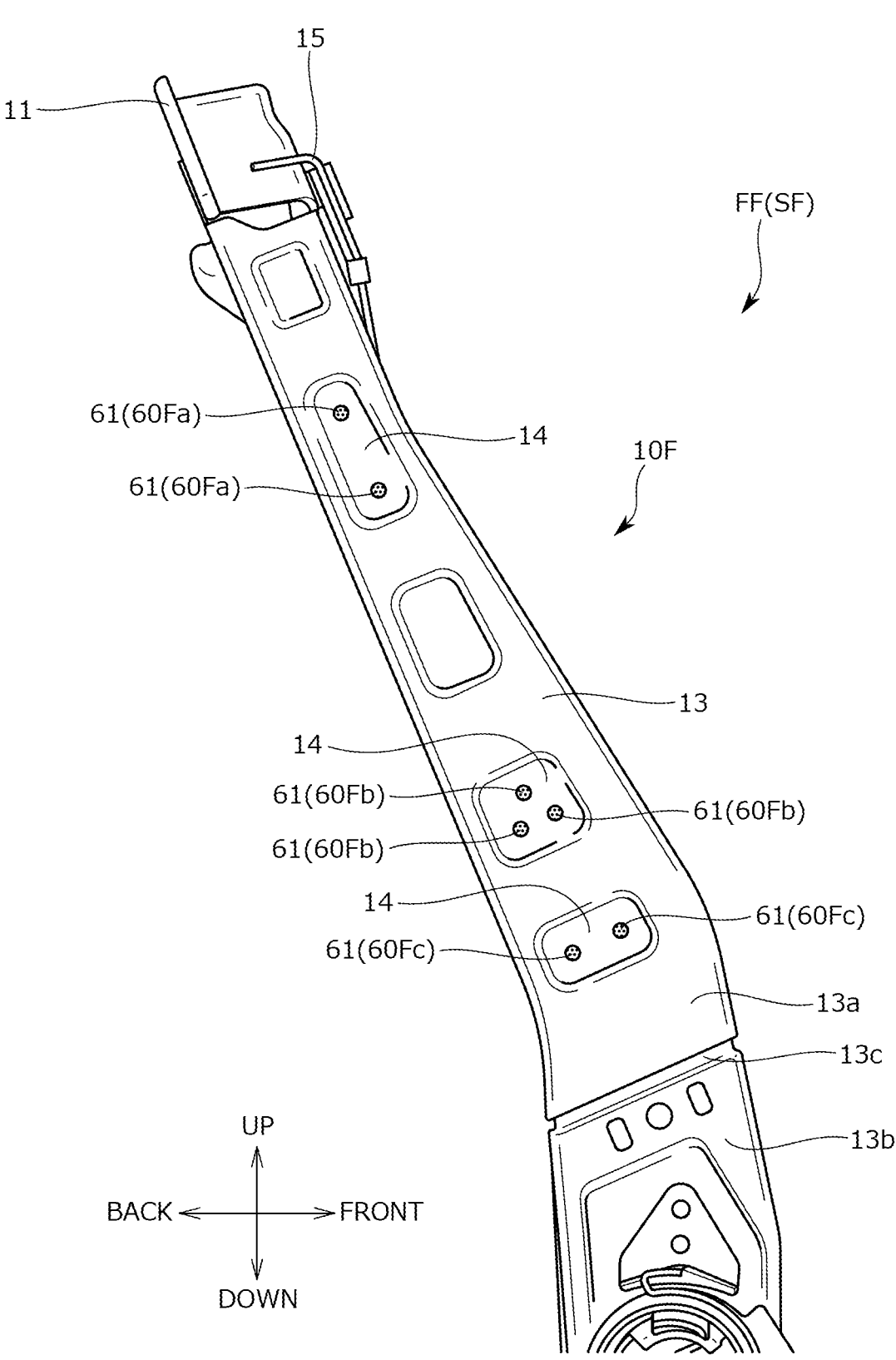
FIG. 11 is a side view showing a seat frame in which a resonance suppressing portion is disposed in a recessed portion of a back side frame.

A vehicle seat SF according to a seventh example of this embodiment will be described with reference to FIG. 11. FIG. 11 is a side view showing a seat frame FF of the vehicle seat SF.

As shown in FIG. 11, the plurality of recessed portions 14 are formed on the back side frame 13 of a seat back frame 10F of the seat frame FF and resonance suppressing portions 60Fa, 60Fb, and 60Fc are arranged in the recessed portions 14. The resonance suppressing portion 60Fa includes two uneven regions 61 and the two uneven regions 61 are arranged at intervals in the extension direction of the back side frame 13. The resonance suppressing portion 60Fb includes three uneven regions 61 and the three uneven regions 61 are arranged at intervals at the apexes of a triangle. The resonance suppressing portion 60Fc includes two uneven regions and the two uneven regions are arranged at intervals in the width direction of the back side frame 13 (the front to back direction of the vehicle).

Additionally, since the vehicle seat SF has the same configurations as those of the vehicle seats S and SA to SE of the first example to the sixth example except for the positions of the resonance suppressing portions 60Fa to 60Fc, the same configurations and members as those of the vehicle seats S and SA to SE will be designated by the same reference numerals and the description thereof will be omitted.

Since the resonance suppressing portion 60F is disposed in the recessed portion, the section modulus of the seat back frame 10F changes and the rigidity of the seat back frame 10 F increases. Accordingly, it is possible to further suppress the occurrence of the resonance between the actuator 51 and the seat back frame 10F (seat frame FF).

Eighth Example

Figure 12:
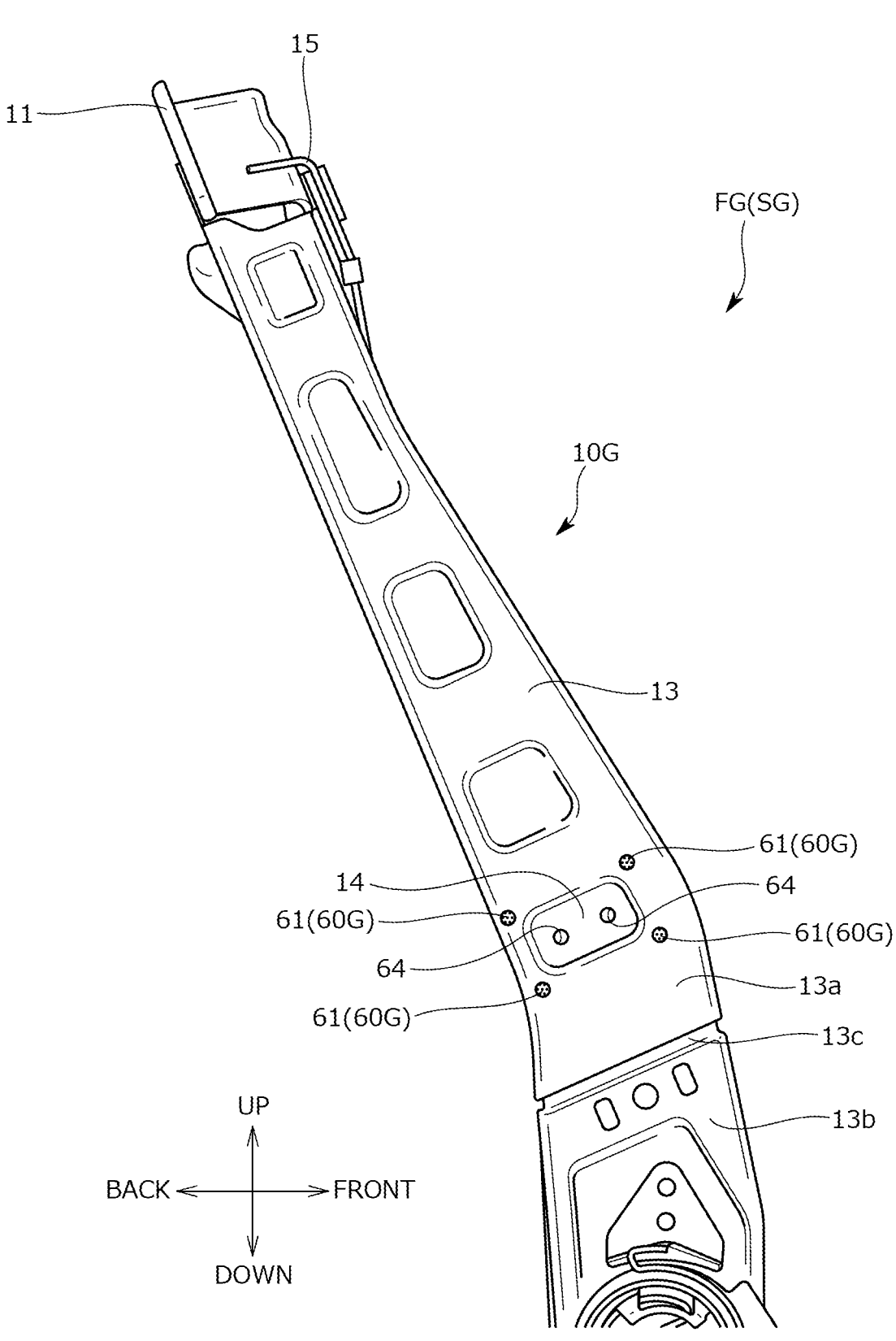
FIG. 12 is a side view showing a seat frame in which a through hole is formed between regions constituting a resonance suppressing portion.

A vehicle seat SG according to an eighth example of this embodiment will be described with reference to FIG. 12. FIG. 12 is a side view showing a seat frame FG of the vehicle seat SG.

As shown in FIG. 12, a resonance suppressing portion 60G is disposed around the recessed portion 14 formed in the vicinity of the base in the back side frame 13 of a seat back frame 10G of the seat frame FG and four uneven regions 61 are arranged in the vicinity of the apexes of the recessed portion 14 formed in a rectangle shape.

In the resonance suppressing portion 60G, two through holes 64 are formed between the uneven regions 61. In the example shown in FIG. 12, two through holes 64 are formed, but at least one through hole 64 may be provided. Further, the shape of the through hole 64 is not limited to the circular shape and may be formed in a polygonal shape or an oval shape.

Additionally, since the vehicle seat SG has the same configurations as those of the vehicle seats S and SA to SF of the first example to the seventh example except for the resonance suppressing portion 60G, the same configurations and members as those of the vehicle seats S and SA to SF will be designated by the same reference numerals and the description thereof will be omitted.

Since the mass of the seat back frame 10G is adjusted by forming the through hole 64, the resonance between the actuator 51 and the seat back frame 10G (seat frame FG) can be suppressed.

Ninth Example

Figure 13:
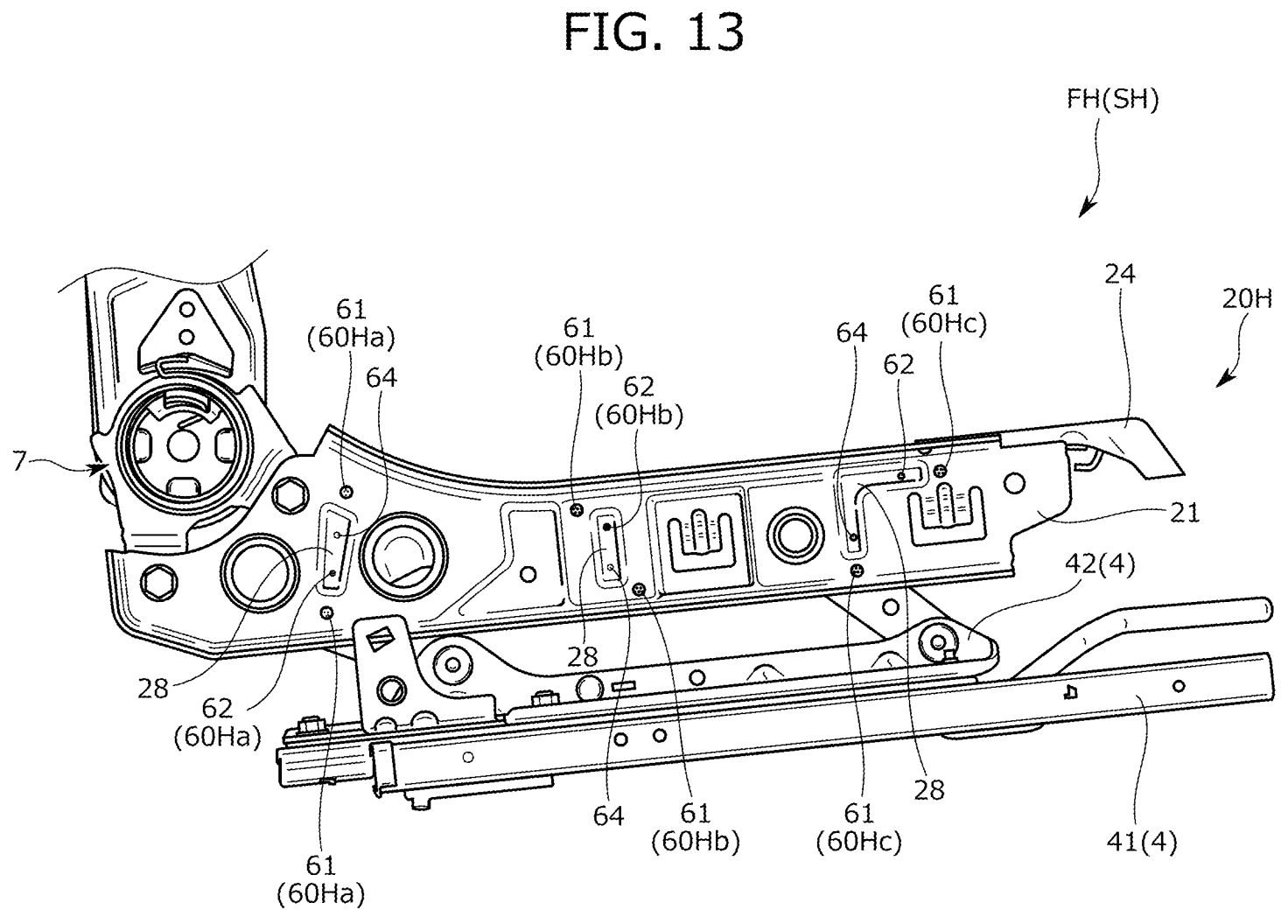

A vehicle seat SH according to a ninth example of this embodiment will be described with reference to FIG. 13. FIG. 13 is a side view showing a seat frame FH of the vehicle seat SH.

As shown in FIG. 13, the plurality of recessed portions 28 are formed in the cushion side frame 21 of a cushion frame 20H of the seat frame FH and the resonance suppressing portions 60Ha, 60Hb, and 60Hc are arranged to match the recessed portions 28.

Additionally, since the vehicle seat SH has the same configurations as those of the vehicle seats S and SA to SG of the first example to the eighth example except for the resonance suppressing portions 60Ha to 60Hc, the same configurations and members as those of the vehicle seats S and SA to SG will be designated by the same reference numerals and the description thereof will be omitted.

FIG. 13 shows the resonance suppressing portions 60Ha, 60Hb, and 60Hc arranged on the right cushion side frame 21, but the resonance suppressing portions 60Ha, 60Hb, and 60Hc are also formed on the cushion side frame 21 disposed on the left side and are arranged at a position symmetrical with respect to the center in the seat width direction.

Each of the resonance suppressing portions 60Ha, 60Hb, and 60Hc includes the first uneven region 61 and the second uneven region 62 having a narrower range than the first uneven region 61.

Each of the resonance suppressing portions 60Ha, 60Hb, and 60Hc includes two first uneven regions 61 around the recessed portion 28 and the second uneven region 62 is disposed in the recessed portion 28. Further, the through hole 64 is formed in the recessed portion 28.

Since the resonance suppressing portions 60Ha, 60Hb, and 60Hc are arranged on the cushion side frame 21, the section modulus of the cushion side frame 21 changes and the rigidity of the cushion side frame 21 increases. Accordingly, the natural frequency of the cushion frame 20H changes and the resonance between the cushion frame 20H (seat frame FH) and the actuator 52 attached to the cushion side frame 21 can be suppressed.

Tenth Example

Figure 14:
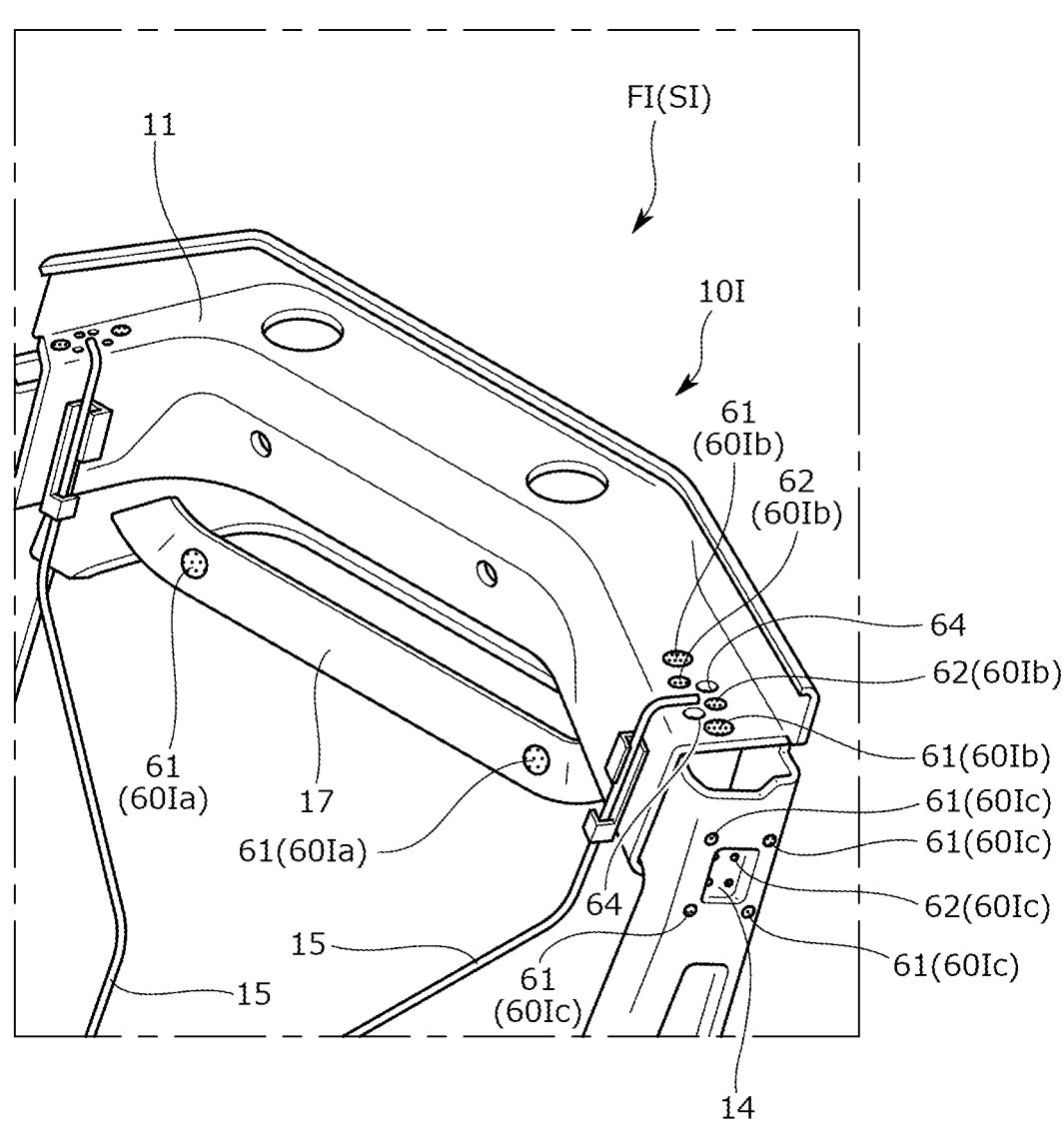
FIG. 14 is a perspective view showing a seat frame in which a resonance suppressing portion is disposed on an upper frame.

A vehicle seat SI according to a tenth example of this embodiment will be described with reference to FIG. 14. FIG. 14 is a perspective view showing a seat frame FI of the vehicle seat SI and is an enlarged perspective view of the upper frame 11 of the seat frame FI.

As shown in FIG. 14, the upper frame 11 is provided with a reinforcement member 17 which extends across both right and left end portions of the upper frame 11.

A resonance suppressing portion 60Ia is formed in the reinforcement member 17 and as shown in FIG. 14, the first uneven region 61 is disposed at a portion in which the reinforcement member 17 is connected to the upper frame 11, in other words, both right and left end portions of the reinforcement member 17.

Further, a resonance suppressing portion 60Ib is formed on each of the inclined portions 11a formed on the right and left sides of the upper frame 11. Two resonance suppressing portions 60Ib are arranged at a position symmetrical with respect to the center in the seat width direction.

Each resonance suppressing portion 60Ib includes two first uneven regions 61 and two second uneven regions 62 which are narrower than the first uneven regions 61. The second uneven region 62 is disposed between two first uneven regions 61. Further, the through hole 64 is formed at two positions between two first uneven regions 61. The resonance suppressing portion 60Ib is disposed at a position not overlapping the edges of the through holes 64 at two positions, that is, the first uneven region 61 and the second uneven region 62 of the resonance suppressing portion 60Ib are arranged to avoid the through hole 64. In other words, the first uneven region 61 and the second uneven region 62 are arranged at a portion without the through hole 64.

The wire member 15 is attached to the upper frame 11, but the first uneven region 61 and the second uneven region 62 of the resonance suppressing portion 60Ib are arranged to avoid a portion which supports the wire member 15. In other words, the first uneven region 61 and the second uneven region 62 are arranged at a position other than the contact position of the end portion of the wire member 15 in the inclined portion 11a of the upper frame 11.

Further, as shown in FIG. 14, a resonance suppressing portion 60Ic is formed on the upper portion of the right back side frame 13. The resonance suppressing portion 60Ic is similarly formed on the upper portion of the left back side frame 13. Two resonance suppressing portions 60Ic are arranged at a position symmetrical with respect to the center in the seat width direction.

The resonance suppressing portion 60Ic includes four first uneven regions 61 and four second uneven regions 62 and the first uneven region 61 is disposed around the recessed portion formed on the upper portion of the back side frame 13. The second uneven region 62 is disposed in the recessed portion 14.

Additionally, since the vehicle seat SI has the same configurations as those of the vehicle seats S and SA to SH of the first example to the ninth example except for the resonance suppressing portions 60Ia to 60Ic, the same configurations and members as those of the vehicle seats S and SA to SH will be designated by the same reference numerals and the description thereof will be omitted.

Since the resonance suppressing portions 60Ia, 60Ib, and 60Ic are arranged on the reinforcement member 17 of the upper frame 11, the inclined portion 11a of the upper frame, and the upper portion of the back side frame 13, the section modulus of the seat back frame 10I changes and the rigidity of the seat back frame 10I increases. Accordingly, the natural frequency of the seat back frame 101 changes and the resonance between the seat back frame 10I (seat frame FI) and the actuator 51 attached to the seat back frame 10 I can be suppressed.

Eleventh Example

Figure 15:
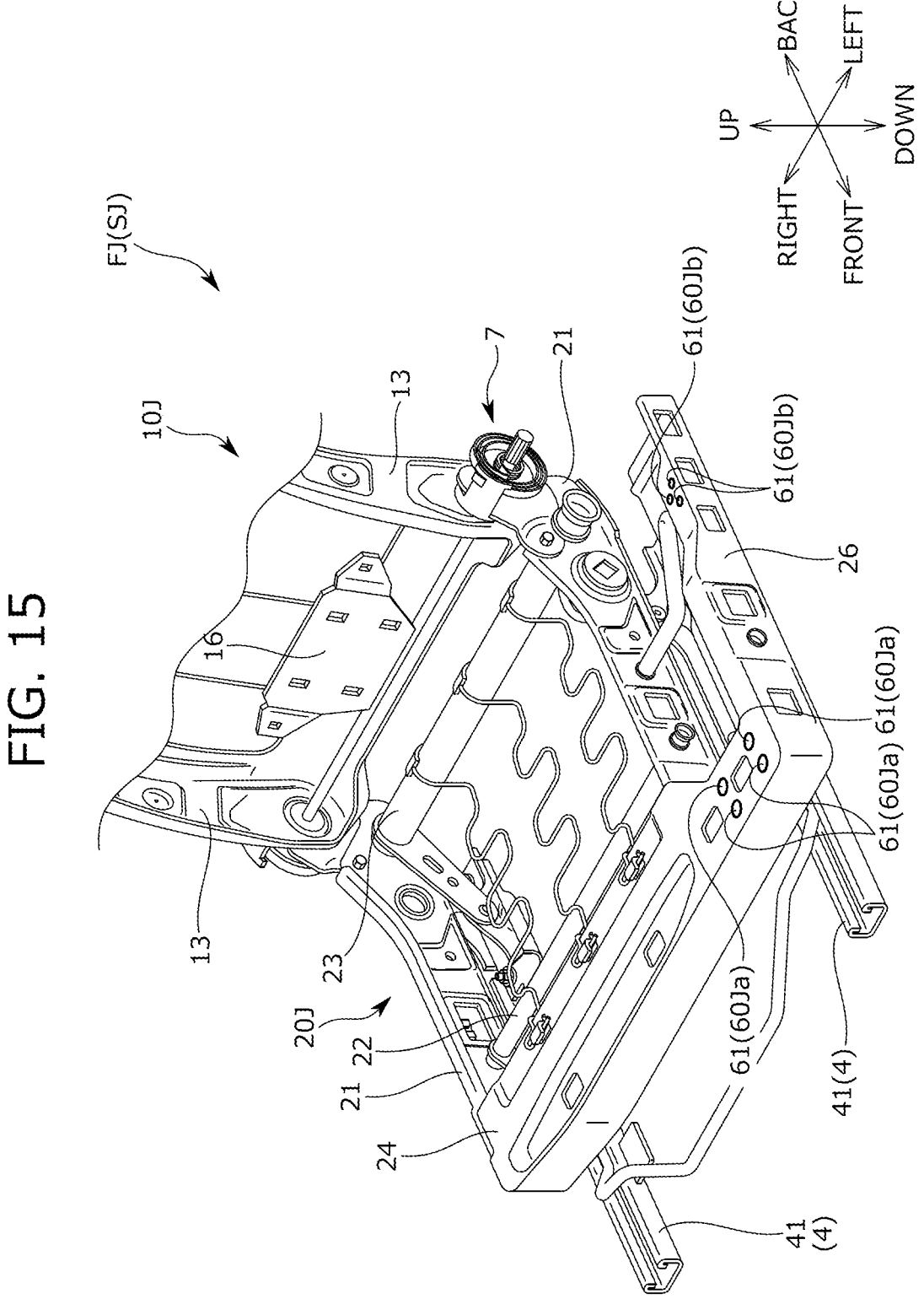
FIG. 15 is a perspective view showing a seat frame in which a resonance suppressing portion is disposed on an enlarged seat surface portion.

A vehicle seat SJ according to an eleventh example of this embodiment will be described with reference to FIG. 15. FIG. 15 is a perspective view showing a seat frame FJ of the vehicle seat SJ.

In the vehicle seat SJ, the seat cushion 2 is enlarged to the left side and an enlarged seat surface frame 26 which enlarges the seat cushion frame 20J to the left side in the seat width direction is provided to support the enlarged seat surface. Since the enlarged seat surface frame 26 is supported in a cantilevered manner, the shaking caused by the actuator 52 tends to be large.

In the vehicle seat SJ, two resonance suppressing portions 60Ja and 60Jb are provided at a position in which the shaking tends to be large. Specifically, the resonance suppressing portion 60Ja is disposed at the front end portion of the enlarged seat surface frame 26 connected to the cushion pan frame 24 and the resonance suppressing portion 60Jb is disposed at the rear end portion of the enlarged seat surface frame 26 connected to the cushion side frame 21. Further, as shown in FIG. 15, the resonance suppressing portion 60Ja includes four uneven regions 61. Further, the resonance suppressing portion 60Jb includes three uneven regions 61.

Additionally, since the vehicle seat SJ has the same configurations as those of the vehicle seats S and SA to SH of the first example to the tenth example except for the enlarged seat surface frame 26 and the resonance suppressing portions 60Ja and 60Jb, the same configurations and members as those of the vehicle seats S and SA to SH will be designated by the same reference numerals and the description thereof will be omitted.

Since the resonance suppressing portions 60Ja and 60Jb are arranged on the enlarged seat surface frame 26, the section modulus of the enlarged seat surface frame 26 changes and the rigidity of the enlarged seat surface frame 26 increases. Therefore, for example, the resonance between the seat cushion frame 20J (seat frame FJ) and the actuator 52 attached to the seat cushion frame 20J can be suppressed.

Twelfth Example

Figure 16:
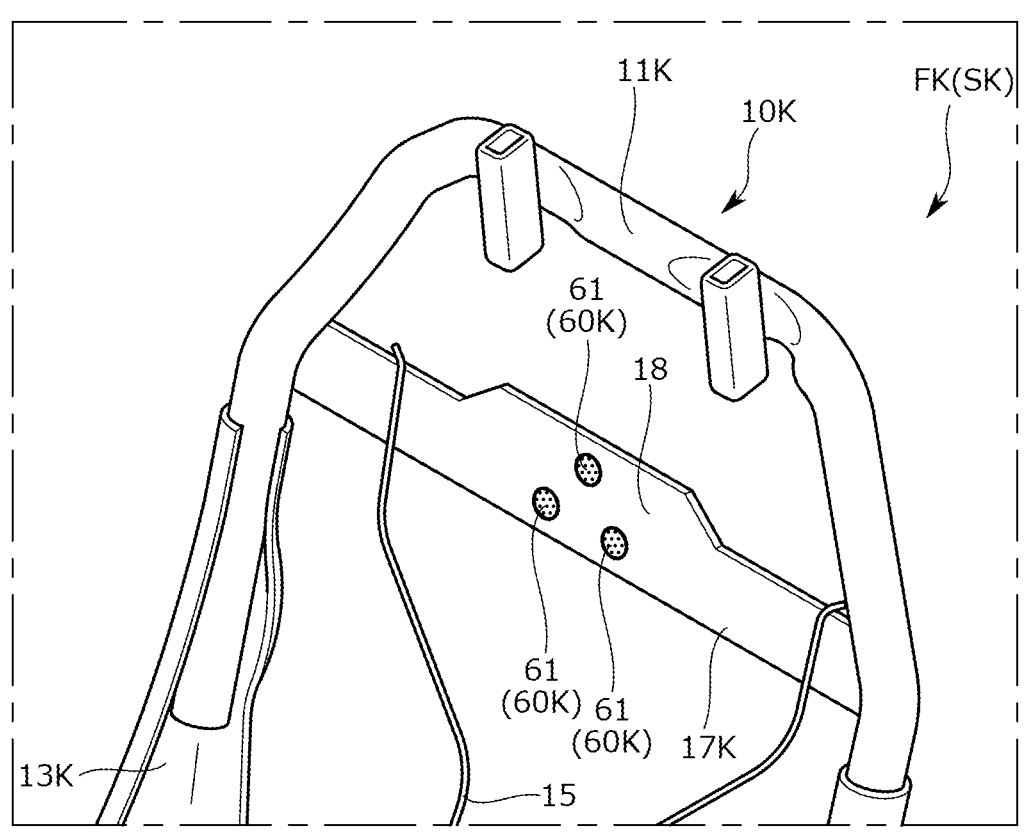
FIG. 16 is a perspective view showing a seat frame in which a resonance suppressing portion is disposed on an auxiliary member connecting both side portions of an upper frame.
Figure 16:
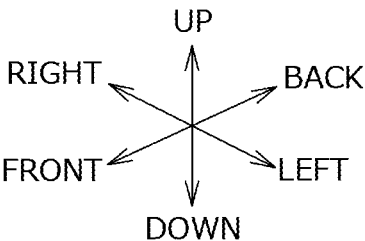

A vehicle seat SK according to a twelfth example of this embodiment will be described with reference to FIG. 16. FIG. 16 is a perspective view showing a seat frame FK of the vehicle seat SK.

A seat back frame 10K of the seat frame FK is provided with an upper frame 11K which connects the upper end portions of the back side frame 13K. Both side portions of the upper frame 11K are provided with a plate-shaped reinforcement member 17K and the wire member 15 extending from the pressure receiving member is supported by the reinforcement member 17K. At the center of the reinforcement member 17K, a wide portion 18 is provided between the wire members 15. The rigidity of the portion (wide portion 18) between the portions supporting the wire member 15 is low and the resonance is likely to occur in the wide portion 18 of the reinforcement member 17K.

In the vehicle seat SK, a resonance suppressing portion 60K is provided on the wide portion 18 of the reinforcement member 17K. The resonance suppressing portion 60K includes three uneven regions 61.

Since the resonance suppressing portion 60K formed by the uneven region 61 is provided at a portion in which the rigidity is low and the resonance is likely to occur, the section modulus of the seat back frame 20K changes and the rigidity of the seat back frame 20K increases. Therefore, for example, the resonance between the seat back frame 20K (seat frame FK) and the actuator 51 attached to the seat back frame 20K can be suppressed.

Thirteenth Example

Figure 17:
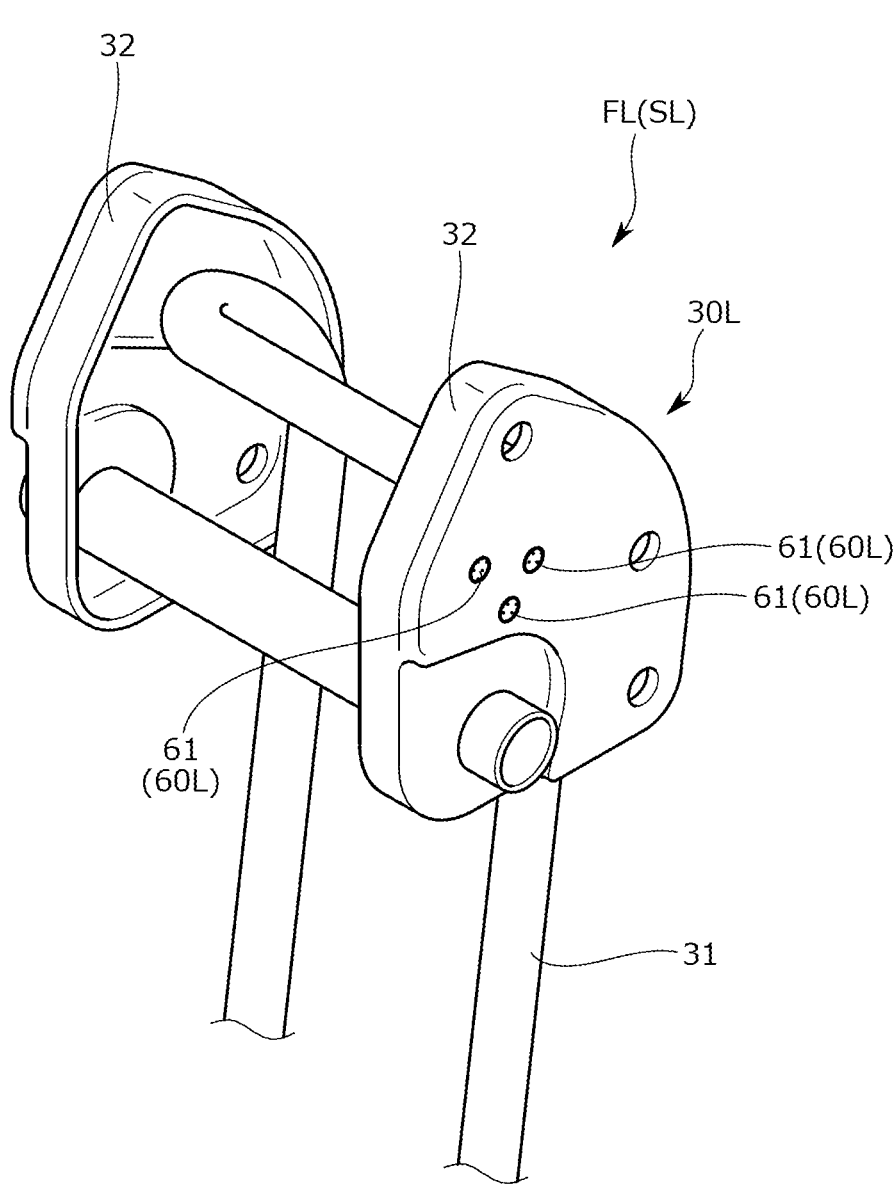
FIG. 17 is a perspective view showing a headrest frame in which a resonance suppressing portion is disposed on a side frame of a headrest.

A vehicle seat SL according to a thirteenth example of this embodiment will be described with reference to FIG. 17. FIG. 17 is a perspective view showing the headrest frame 30 (seat frame FL) of the headrest 3 of the vehicle seat SL.

The headrest frame 30 includes two headrest pillars 31 which are connected to the seat back frame 10 and the plate-shaped headrest side frame 32 which is provided in each headrest pillar 31. The headrest 3 is an electric headrest and the headrest side frame 32 is configured to move in the seat width direction by an actuator (not shown).

Since the headrest side frame 32 is formed of thick metal and is close to the ears of the occupant, the occupant is likely to feel the resonance sound when the actuator is driven and the headrest side frame 32 moves.

In the vehicle seat SL, the resonance suppressing portion 60L is provided in each headrest side frame 32. The resonance suppressing portion 60L includes three uneven regions 61.

Since the resonance suppressing portion 60L formed by the uneven region 61 is provided at a portion in which the resonance is likely to occur, the section modulus of the headrest frame 30L changes and the rigidity increases. Accordingly, since the natural frequency of the headrest frame 30L changes, for example, the resonance between the headrest side frame 32 (seat frame FL) and the actuator attached to the headrest frame 30L can be suppressed.

Fourteenth Example

Figure 18:
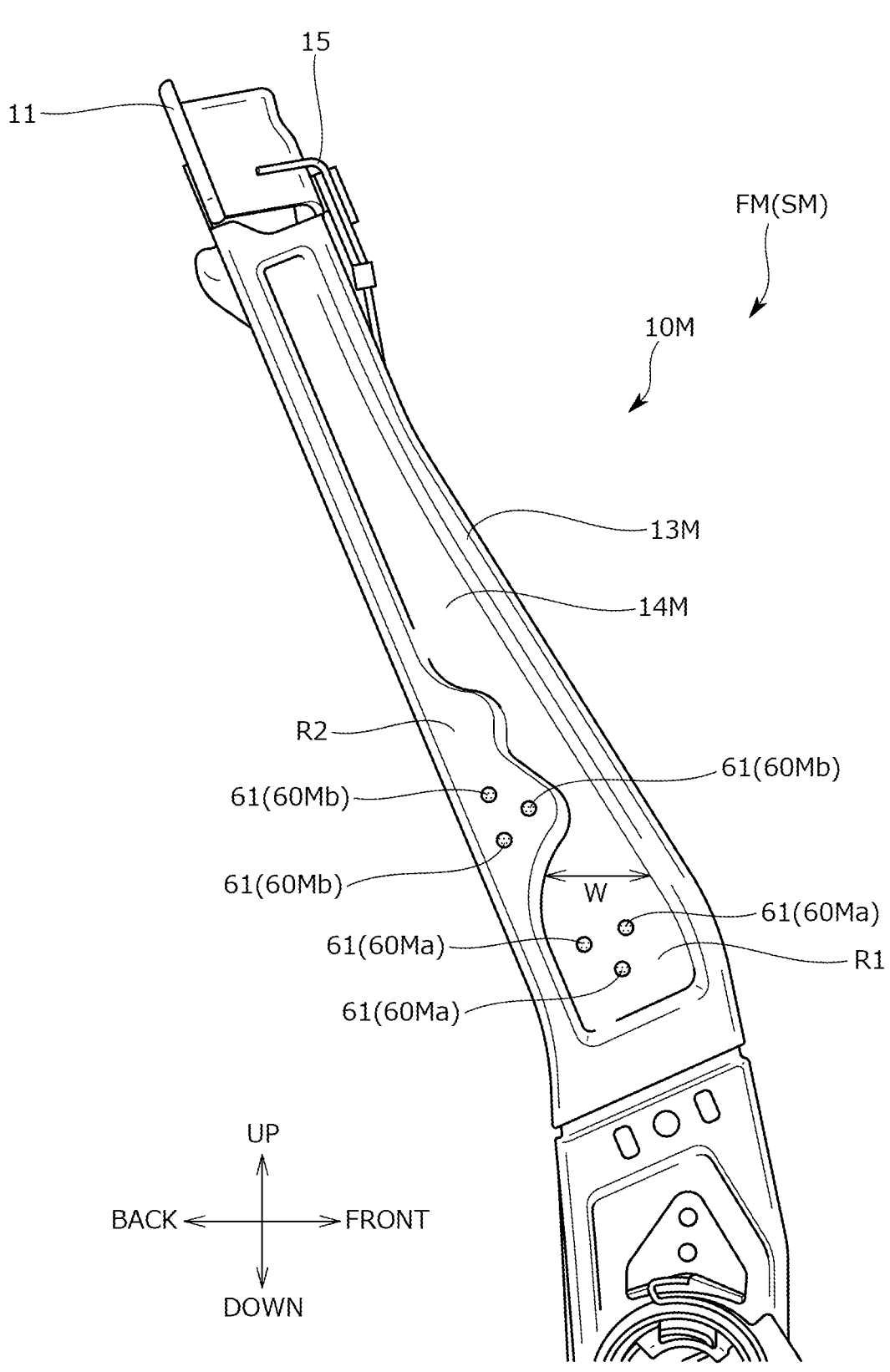
FIG. 18 is a side view showing a seat frame in which a resonance suppressing portion is disposed on a back side frame.

A vehicle seat SM according to a fourteenth example of this embodiment will be described with reference to FIG. 18. FIG. 18 is a side view showing a seat frame FM of the vehicle seat SM.

As shown in FIG. 18, a recessed portion 14M which is recessed inward in the seat width direction, in other words, a recess which is recessed in the seat width direction is formed throughout the back side frame 13M of the seat back frame 10M of the seat frame FM. The width W of the recessed portion 14M (the length in the front to back direction) is formed such that a relatively wide flat portion R1 is formed near the base. In the recessed portion 14M, the flat portion R1 has a lower strength than other portions. Further, a flat portion R2 of the back side frame 13 which is surrounded by the recessed portion 14M and has a wider flat portion due to the small width W of the recessed portion 14M also has a lower strength than other portions. When the rigidity decreases, the resonance is likely to occur due to the operation of the actuator 51 or the like.

In the vehicle seat SM, a resonance suppressing portion 60Ma is disposed on the flat portion R1 of the recessed portion 14M. Further, a resonance suppressing portion 60Mb is disposed on the relatively wide flat portion R2 in the back side frame 13M.

Each of the resonance suppressing portions 60Ma and 60Mb includes three uneven regions 61. This is an example and the resonance suppressing portion may include one or two uneven regions 61 or four or more uneven regions 61.

Additionally, since the vehicle seat SM has the same configurations as those of the vehicle seats S and SA to SI of the first example to the tenth example except for the back side frame 13M and the resonance suppressing portions 60Ma and 60Mb, the same configurations and members as those of the vehicle seats S and SA to SI will be designated by the same reference numerals and the description thereof will be omitted.

Since the resonance suppressing portions 60Ma and 60Mb formed by the uneven regions 61 are provided in the flat portions R1 and R2 in which the resonance is likely to occur, the section modulus of the back side frame 13M changes and the rigidity increases. Accordingly, since the natural frequency of the back side frame 13M changes, for example, the resonance between the back side frame 13M (seat frame FM) and the actuator 51 attached to the seat back frame 10M can be suppressed.

Fifteenth Example

Figure 19:
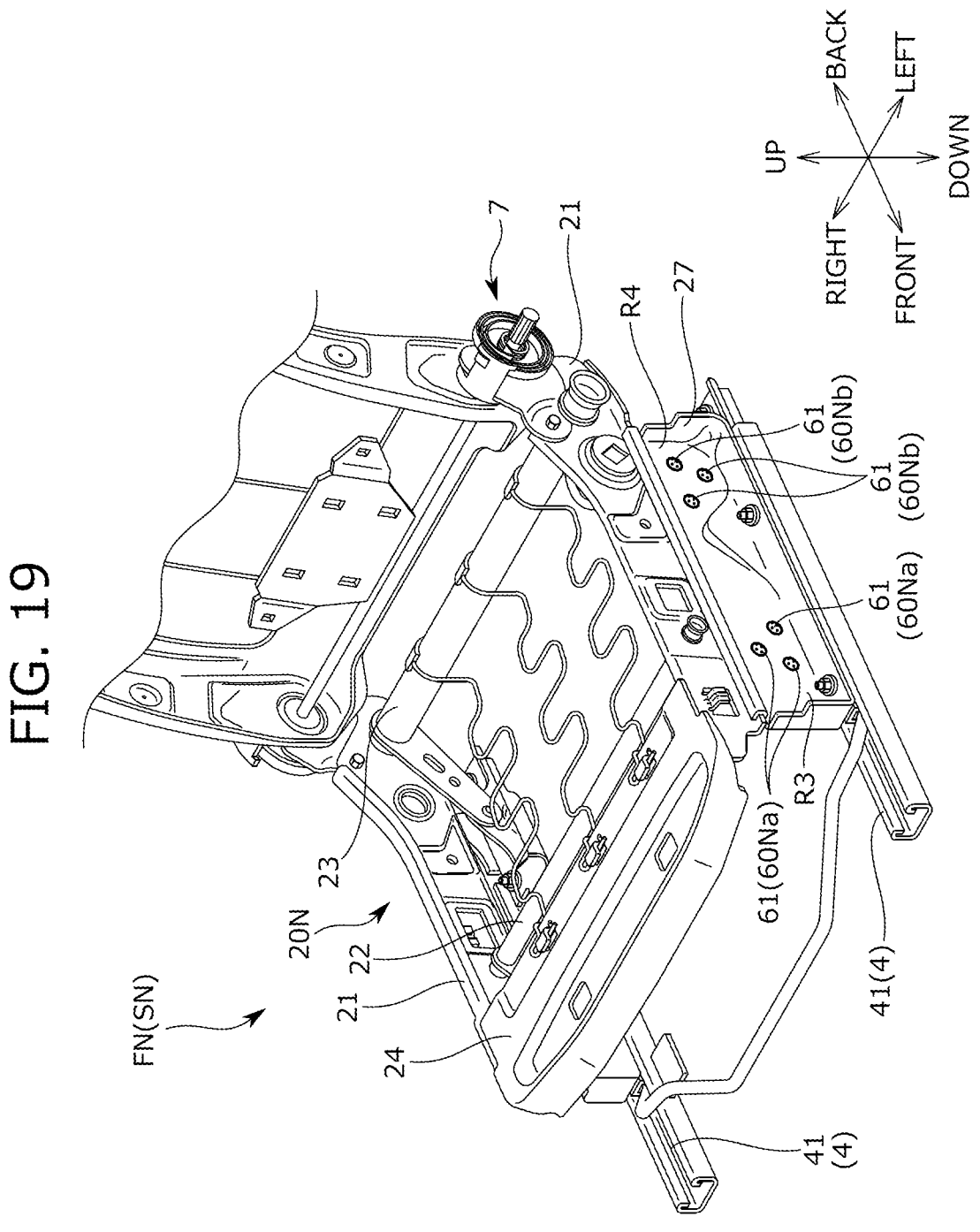
FIG. 19 is a perspective view showing a seat cushion frame in which a resonance suppressing portion is disposed on a cover frame.

A vehicle seat SN according to a fifteenth example of this embodiment will be described with reference to FIG. 19. FIG. 19 is a perspective view showing a seat frame FN of the vehicle seat SN.

As shown in FIG. 19, a cover frame 27 is attached to the left cushion side frame 21 in a seat cushion frame 20 N of the seat frame FN. For example, the cover frame 27 prevents dirt, dust, or the like from entering between the cushion side frame 21 and the lower rail 41 of the slide mechanism 4.

Since the cover frame 27 has relatively large flat portions R3 and R4 as shown in FIG. 19, the cover frame 27 tends to shake more and the resonance is likely to occur due to the operation of the actuator 52 or the like attached to the seat cushion frame 20.

In the vehicle seat SN, resonance suppressing portions 60Na and 60Nb are arranged on the flat portions R3 and R4 of the cover frame 27 in which the resonance is likely to occur. Each of the resonance suppressing portions 60Na and 60Nb includes three uneven regions 61. This is an example and the resonance suppressing portions 60Na and 60Nb may include one or two uneven regions 61 or four or more uneven regions 61.

Additionally, since the vehicle seat SN has the same configurations as those of the vehicle seats S and SA to SI of the first example to the tenth example except for the cover frame 27 and the resonance suppressing portions 60Na and 60Nb, the same configurations and members as those of the vehicle seats S and SA to SI will be designated by the same reference numerals and the description thereof will be omitted.

Since the resonance suppressing portions 60Na and 60Nb formed by the uneven regions 61 are provided in the flat portions R1 and R2 of the cover frame 27 in which the resonance is likely to occur, the section modulus of the cover frame 27 changes and the rigidity increases. Accordingly, since the natural frequency of the cover frame 27 changes, for example, the resonance between the cover frame 27 (seat frame FN) and the actuator 52 attached to the seat cushion frame 20N can be suppressed.

Second Embodiment

Hereinafter, a second embodiment of the present invention will be described with reference to FIGS. 20 to 35.

The second embodiment relates to a conveyance seat and particularly to a conveyance seat with a bottom plate.

Background Art

Conventionally, there is known an occupant sitting seat used in a small conveyance such as buggies (all-terrain vehicles) (for example, see JP S 61-24632 A). In this conveyance seat such as a buggy, a bottom plate formed of a resin material is used as a support member on which a cushion material is placed and a nut of a separate member is used to fix the bottom plate to a frame of a conveyance.

Figure 35:
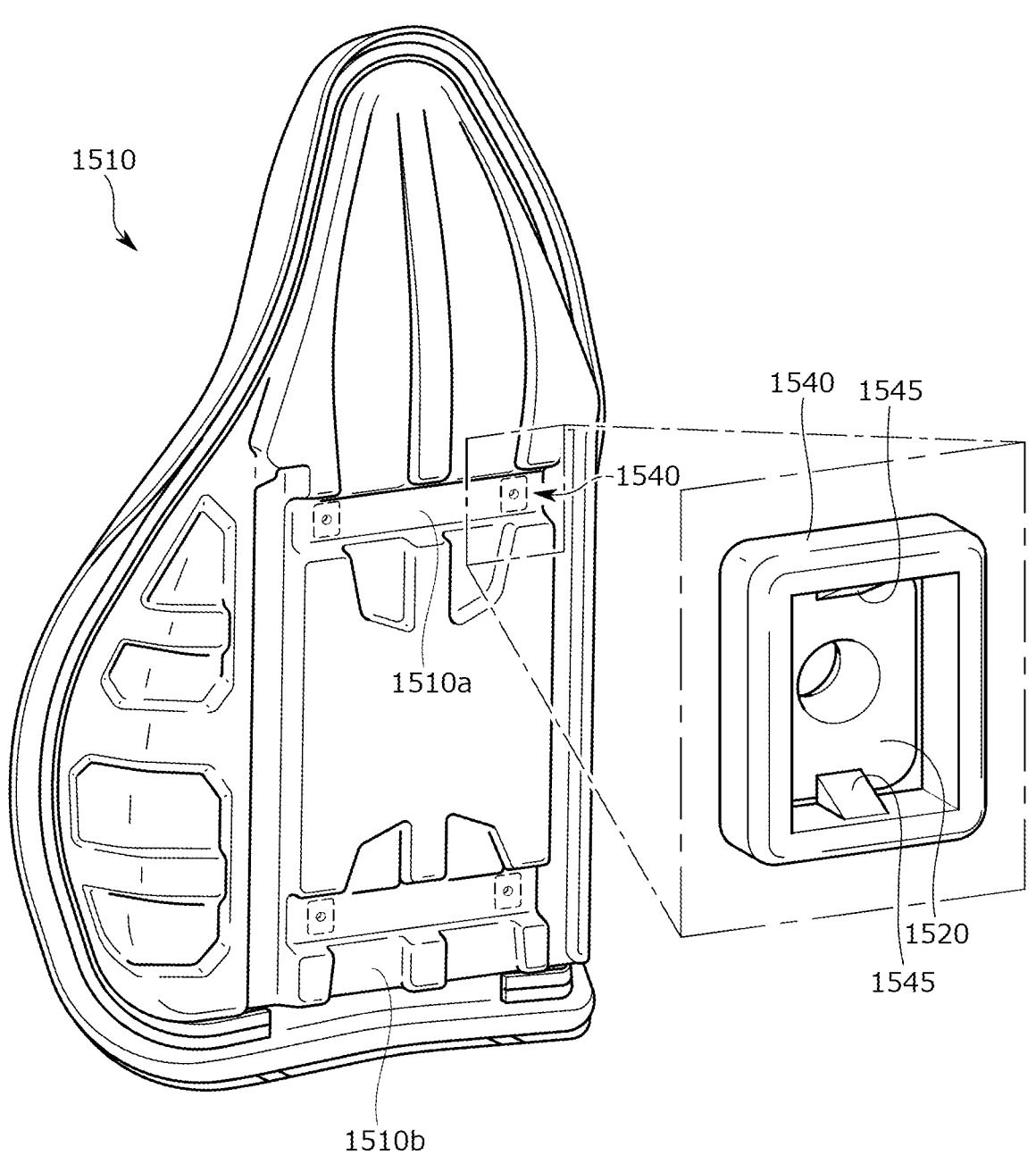
FIG. 35 is a diagram showing a nut assembly structure in a conventional bottom plate.

FIG. 35 shows a nut assembly structure in a conventional bottom plate. FIG. 35 is a perspective view of a bottom plate 1510 of a seat back seen from the rear side and an enlarged explanatory diagram of a nut accommodation portion 1540 seen from the front side. In the rear surface of the bottom plate 1510, recesses 1510a and 1510b which are recessed from the rear side to the front side extend in the width direction of the bottom plate 1510 and are arranged in the up to down direction. Then, a nut accommodation portion 1540 for accommodating a nut 1520 is provided at each of the right and left end portions of the recesses 1510a and 1510b.

The nut accommodation portion 1540 is formed by a rectangular recess which is opened toward the front side and is recessed from the front side to the rear side and claw portions 1545 and 1545 respectively protruding downward and upward to prevent falling are formed at the upper and lower facing positions of the edge forming the outer periphery of the recess. When assembling the nut 1520, the nut 1520 is inserted from the front side of the nut accommodation portion 1540 and is pressed, until it fits, into the rear space of the claw portion 1545 over the claw portion 1545 so that the nut 1520 is assembled to the nut accommodation portion 1540. Since the claw portion 1545 is formed, the front surface of the nut 1520 comes into contact with the claw portion 1545 when the nut 1520 is once fitted into the nut accommodation portion 1540. Accordingly, the nut 1520 is accommodated in the nut accommodation portion 1540 without falling forward from the opening of the recess of the nut accommodation portion 1540.

Then, the bottom plate 1510 can be fixed to a frame (not shown) on the side of the vehicle body by fastening a fastener such as a bolt (not shown) to the nut 1520 from the front side of the nut 1520 in such a manner that the frame comes into contact with the rear surfaces of the recesses 1510 a and 1510 b of the bottom plate 1510 while the nut 1520 is accommodated in the nut accommodation portion 1540.

Technical Problem

In the technique described in FIG. 35, the recess of the nut accommodation portion opens forward, that is, toward a direction perpendicular to a surface of the bottom plate and the opening has a size substantially the same as the outer periphery of the nut. When assembling the nut, the upper and lower ends or the right and left ends of the flat nut need to be pinched and pressed into the recess from the front side of the opening. Accordingly, the nut is not easily inserted and hence improvements in work efficiency are needed. Further, when the nut is firmly pressed into the nut accommodation portion from the front side to the rear side of the opening, there is a risk that the claw portion is damaged or falls off. Further, when the length of the claw portion is increased or enlarged so that the claw portion does not fall off, there is a risk that the nut is not easily inserted.

The present invention has been made in view of the above-described problems and an object thereof is to provide a conveyance seat capable of improving assembling workability by easily assembling a nut to a bottom plate.

Further, another object of the present invention is to provide a conveyance seat having a bottom plate with a structure in which a claw portion of a nut accommodation portion does not fall off.

Solution to Problem

According to a conveyance seat of the present invention, the above-described problems are solved by a conveyance seat having an occupant support portion supporting an occupant, wherein the occupant support portion includes a bottom plate which serves as a base member constituting the occupant support portion, wherein the bottom plate is provided with an accommodation portion which accommodates a nut for fixing the bottom plate, wherein the accommodation portion is provided with an insertion opening for inserting the nut and a claw portion for fixing the nut, and wherein the insertion opening is provided at one end portion of the accommodation portion in a direction along a surface of the bottom plate.

In this way, since the insertion opening for inserting the nut is provided at one end portion of the accommodation portion in a direction along the surface of the bottom plate, the insertion opening can be decreased in size. Further, since the nut is inserted from one end portion side in a direction along the surface of the bottom plate, the nut can be inserted into the accommodation portion while being slid along the surface of the bottom plate from the insertion opening. Since the insertion opening is provided at such a position of the accommodation portion, the nut is easily inserted into the accommodation portion compared to the case in which the nut is pressed from the front side of the accommodation portion to be inserted into the accommodation portion. Accordingly, the nut is easily assembled to the bottom plate and hence assembling workability is improved. Further, since it is not necessary to firmly press the nut from the front side when inserting the nut from the insertion opening, the claw portion of the accommodation portion does not fall off and hence the nut does not fall off from the claw portion. Further, the burden on the claw portion can be reduced and the damage of the claw portion can be suppressed.

At this time, the accommodation portion may include a front surface as a surface facing the occupant side and a back surface as a surface facing the side opposite to the front surface, the insertion opening of the accommodation portion may be provided at one side portion of the accommodation portion in a right to left direction of the seat, and an opening of the insertion opening may be formed by communicating from the side portion of the accommodation portion to a part of the back surface of the accommodation portion.

With the above-described configuration, since the nut can be assembled by being inserted in the right to left direction of the seat from the insertion opening provided in the side portion of the accommodation portion, the nut is easily inserted. Further, since the opening of the insertion opening is formed to communicate from the side portion to the back surface, the opening portion is large and the nut is easily inserted.

Further, the claw portion may extend from an end portion of the accommodation portion toward the inside of the accommodation portion, and a base end portion of the claw portion may be formed by a reinforcement portion having a larger width than a tip portion of the claw portion.

With the above-described configuration, the strength of the claw portion can be improved. Further, since it is not necessary to thicken the claw portion in order to increase the strength of the claw portion, the strength of the claw portion can be improved while maintaining the easy insertion of the nut.

Further, the accommodation portion may be provided with a locking portion which locks an end portion of the nut.

With the above-described configuration, since a portion for locking the nut is also provided in a portion other than the claw portion, the nut can be firmly fixed.

Further, when a direction parallel to a direction in which the nut is inserted into the accommodation portion is a first direction and a direction parallel to the surface of the bottom plate and perpendicular to the first direction is a second direction, the locking portion may be provided at both end portions of the accommodation portion in the second direction and be provided at a position not overlapping the claw portion in the first direction and the second direction.

With the above-described configuration, the arrangement of the locking portion and the claw portion for locking the nut can be set in a well-balanced manner, and the nut can be supported in a well-balanced manner.

Further, when a direction parallel to a direction in which the nut is inserted into the accommodation portion is a first direction and a direction parallel to the surface of the bottom plate and perpendicular to the first direction is a second direction, the claw portion may be provided at a position overlapping a bolt through hole formed in the nut in the first direction in a state in which the nut is accommodated in the accommodation portion and the locking portion may be provided at a position overlapping the bolt through hole in the second direction in a state in which the nut is accommodated in the accommodation portion.

With the above-described configuration, since the locking portion and the claw portion are arranged in a well-balanced manner in relation to the bolt through hole formed in the nut, the nut can be supported in a well-balanced and stable manner when fastening the bolt.

The accommodation portion may include an accommodation space which accommodates the nut and an outer peripheral wall which has a predetermined thickness and surrounds the accommodation space, the outer peripheral wall may include a first wall portion which is a portion provided with the claw portion and a second wall portion which is a portion other than the portion provided with the claw portion, and when a direction perpendicular to the surface of the bottom plate is a third direction, the thickness of the second wall portion in the third direction may be thicker than the thickness of the first wall portion in the third direction.

With the above-described configuration, since the second wall portion in the outer peripheral wall formed around the accommodation space accommodating the nut, that is, the outer peripheral wall of the portion without the claw portion is thickened, it is possible to ensure the strength of the wall of the portion to which a force is applied from the nut when the nut idly rotates due to the fastening of the bolt.

Further, the reinforcement portion of the claw portion may be provided with a barb and the barb may have a larger width than a diameter of a bolt through hole formed in the nut.

With the above-described configuration, it is possible to prevent the barb of the claw portion from entering the bolt through hole when inserting the nut into the accommodation portion and to smoothly insert the nut. Further, it is possible to prevent a worker from mistakenly thinking that the nut has been inserted while the barb enters the bolt through hole and the nut is caught in the claw portion.

Further, the reinforcement portion of the claw portion may be formed to be thinner than a connection portion between the reinforcement portion and the bottom plate.

With the above-described configuration, since the claw portion is easily bent, the nut is easily inserted and workability is improved.

Further, the insertion opening may spread from the inside to the outside of the accommodation portion.

With the above-described configuration, the nut is easily inserted into the accommodation portion and workability is improved.

Advantageous Effects of Invention

According to the present invention, the nut is easily inserted into the accommodation portion, the nut is easily assembled to the bottom plate, and assembling workability is improved. Further, since the claw portion of the accommodation portion does not fall off, the nut does not fall off from the claw portion, the burden on the claw portion can be reduced, and the damage of the claw portion can be suppressed.

According to the present invention, the strength of the claw portion can be improved while maintaining the easy insertion of the nut.

According to the present invention, the nut can be firmly fixed.

According to the present invention, the nut can be supported in a well-balanced and stable manner.

According to the present invention, it is possible to ensure the strength of the portion of the accommodation portion to which a force is applied from the nut when the nut idly rotates.

According to the present invention, it is possible to prevent the barb of the claw portion from entering the bolt through hole when inserting the nut into the accommodation portion and to smoothly insert the nut. Further, it is possible to prevent a worker from mistakenly thinking that the nut has been inserted while the barb enters the bolt through hole and the nut is caught in the claw portion.

According to the present invention, the nut is easily inserted into the accommodation portion and workability is improved.

Description of Embodiments

Hereinafter, a configuration of a vehicle seat S1000 of a buggy (all-terrain vehicle) will be described as a conveyance seat according to the second embodiment of the present invention with reference to FIGS. 20 to 25.

Additionally, the embodiments described below are merely examples for facilitating understanding of the present invention and do not limit the present invention. That is, the materials, shapes, dimensions, arrangements, and the like of the seat components described below may be changed and improved without departing from the spirit of the present invention and the present invention includes, of course, equivalents thereof.

In the following description, the "front to back direction", the "front to back direction of the seat", the "front side of the seat", and the "rear side of the seat" mean the front to back direction, the front side, and the rear side when viewed from the occupant of the vehicle seat and are directions that match the vehicle traveling directions. The "right to left direction", the "right to left direction of the seat", the "right side of the seat", and the "left side of the seat" mean the right to left direction, the right side, and the left side when viewed from the occupant of the vehicle seat. The "seat width direction" means the width direction of the vehicle seat and matches the right to left direction when viewed from the occupant of the vehicle seat. Further, the "up to down direction" and the "up to down direction of the seat" mean the height direction of the vehicle seat and match the up to down direction when the vehicle seat is viewed from the front side.

Figure 20:
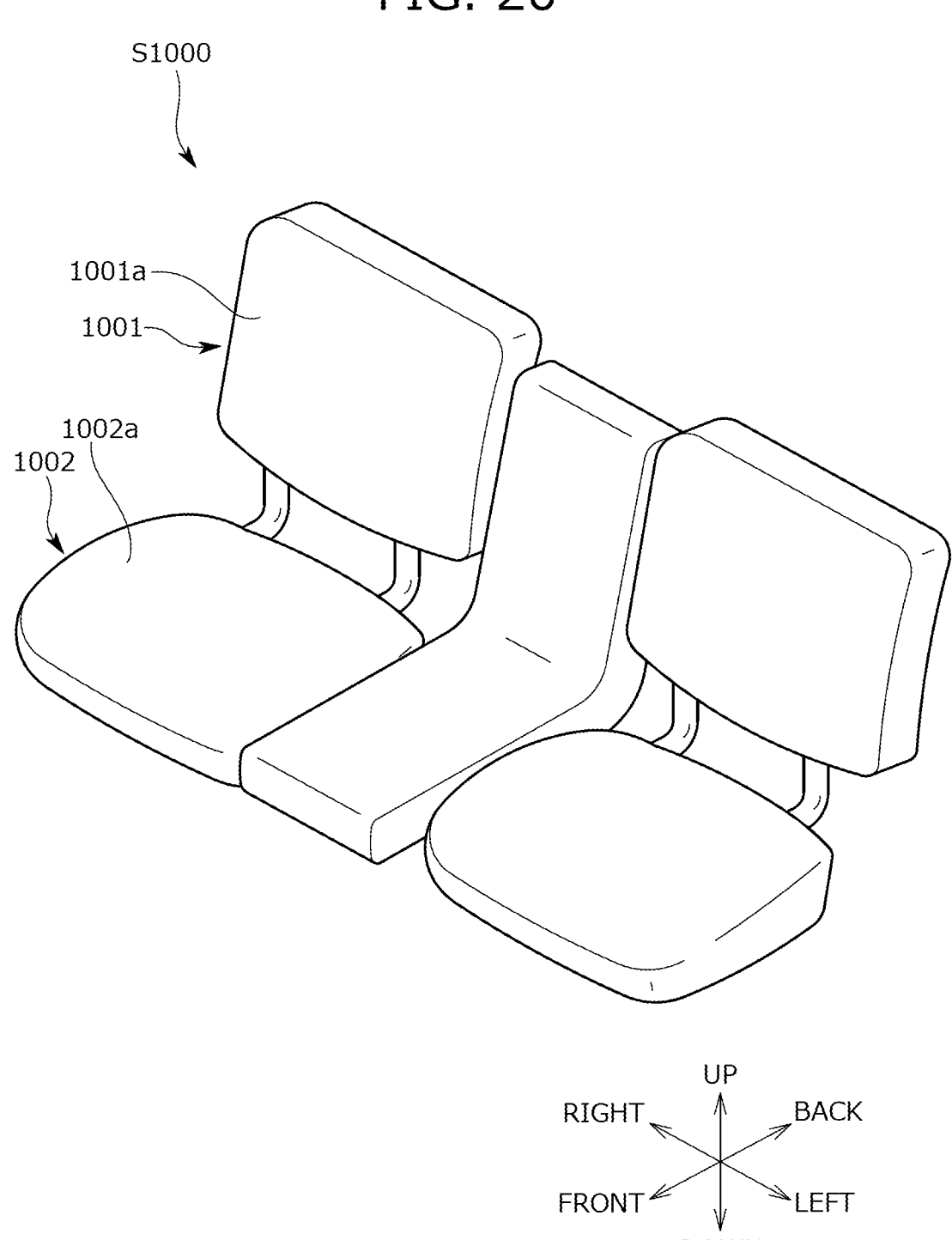
FIG. 20 is an external perspective view of a conveyance seat according to the present invention.

FIG. 20 is an external perspective view of the vehicle seat S1000. As shown in FIG. 20, the vehicle seat S1000 includes a seat back 1001 and a seat cushion 1002. The seat back 1001 is a backrest portion that supports the back of an occupant from behind and corresponds to an occupant support portion. The seat back 1001 is configured by placing a pad material (not shown) on a bottom plate 1010 (see FIG. 21) as a base member constituting the seat back 1001 and covering the bottom plate 1010 and the pad material with a skin material 1001a. The seat cushion 1002 is a seating portion which supports the occupant from below and corresponds to an occupant support portion. Similarly, the seat cushion 1002 is configured by placing a pad material (not shown) on a bottom plate 1030 (see FIG. 30) as a base member constituting the seat cushion 1002 and covering the bottom plate 1030 and the pad material with a skin material 1002a.

First Example

A vehicle seat S1000 in which a nut accommodation portion is provided in the bottom plate 1010 of the seat back 1001 will be described as a first example of this embodiment.

Figure 21:
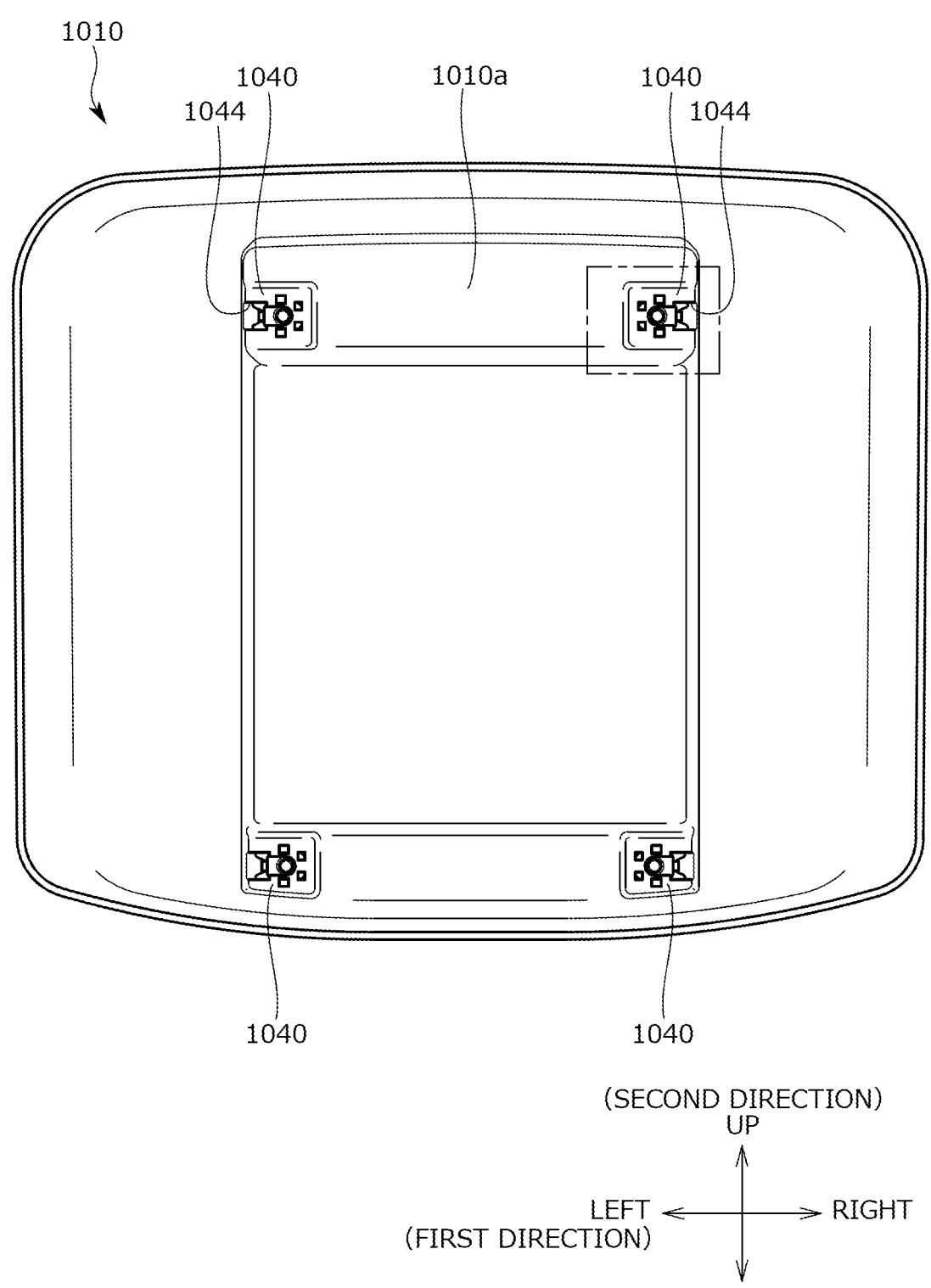
FIG. 21 is a rear view of a bottom plate of a seat back.

FIG. 21 is a rear view of the bottom plate 1010 of the seat back 1001.

The bottom plate 1010 is a base member that forms the outer shape of the seat back 1001, is also called a base plate or a bottom plate, and is also a pad support on which a pad material is placed and which supports the pad material. The bottom plate 1010 is fixed by a bolt to a frame (not shown) that forms the outer shape of a conveyance (buggy), and is installed inside the vehicle. The bottom plate 1010 is formed of a resin material, extends in the right to left direction and the up to down direction, has a plate shape having a front surface and a rear surface, and is molded into a predetermined shape.

Additionally, since the bottom plate 1010 of the first example is formed so that the front surface and the rear surface are substantially parallel to each other as a whole, in the following description, "along the surface of the bottom plate 1010" means a state along the front surface and/or the rear surface of the bottom plate 1010 and a state substantially parallel to the front surface and/or the rear surface of the bottom plate 1010.

As shown in FIG. 21, a nut accommodation portion 1040 which serves as an accommodation portion for accommodating a nut 1020 used to fix the bottom plate 1010 is provided at four positions on the right side and the left side of the seat at the upper and lower portions of the bottom plate 1010. The nut 1020 is fastened with a bolt (not shown) when the bottom plate 1010 is fixed to the frame.

Hereinafter, the nut accommodation portion 1040 according to the first example will be described with reference to FIGS. 22 to 25 by exemplifying the nut accommodation portion 1040 provided on the right upper side in FIG. 21 among the nut accommodation portions 1040 provided at four positions in the bottom plate 1010. Regarding the nut accommodation portions 1040 provided in other places, the nut accommodation portion 1040 provided on the left side in FIG. 21 is different from the nut accommodation portion 1040 to be described below in that they are bilaterally symmetrical, but has the same configuration in other respects.

Figure 22:
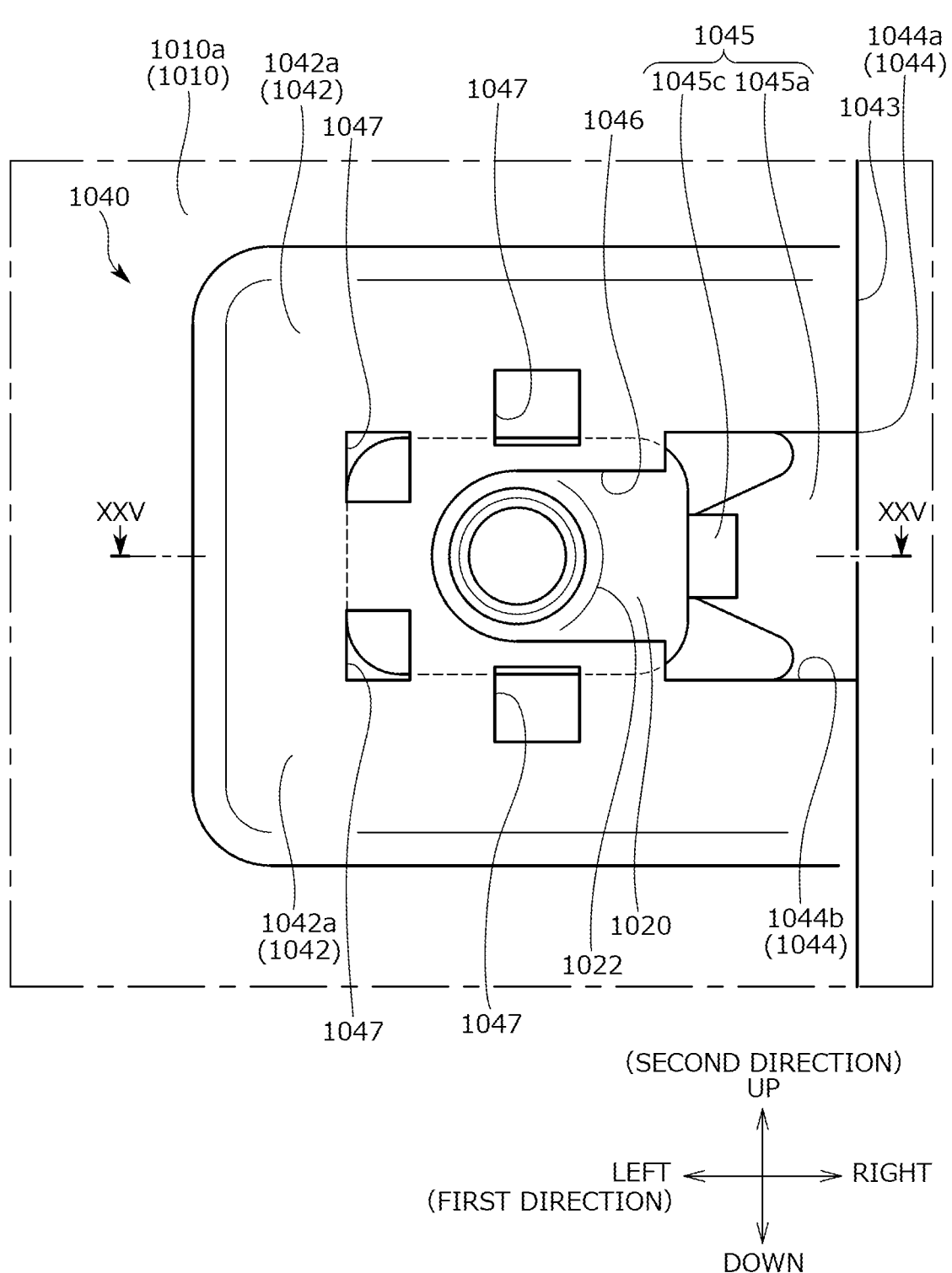
FIG. 22 is a rear view of a nut accommodation portion in a nut accommodated state.
Figure 23:
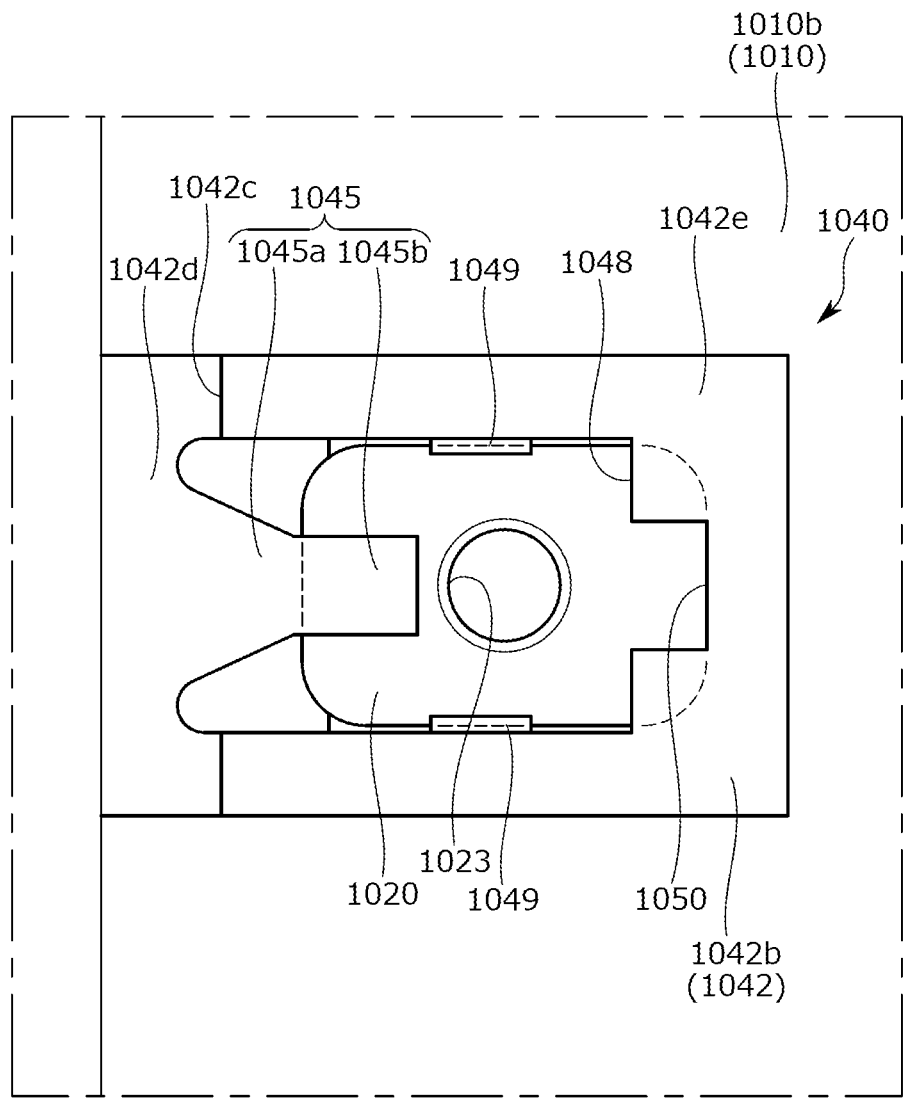
FIG. 23 is a front view of a nut accommodation portion in a nut accommodated state.
Figure 23:
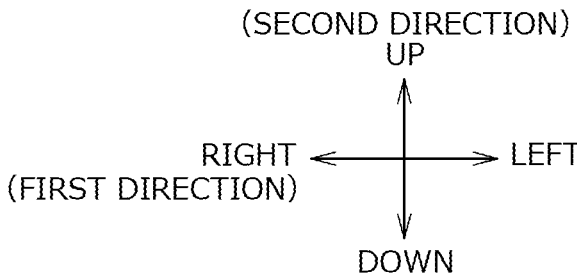
Figure 24:
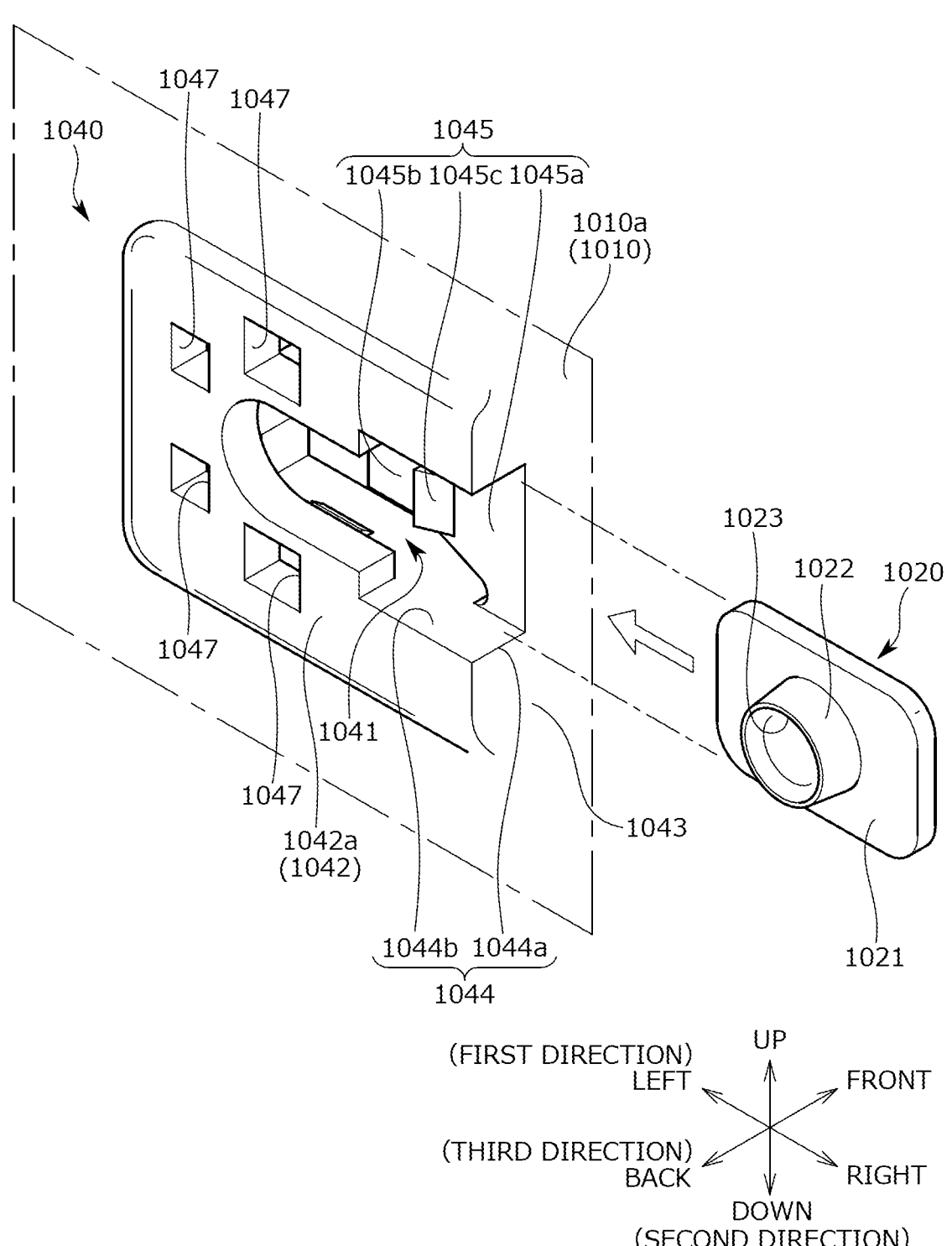
FIG. 24 is an explanatory diagram showing a state in which a nut is inserted into a nut accommodation portion.
Figure 25:
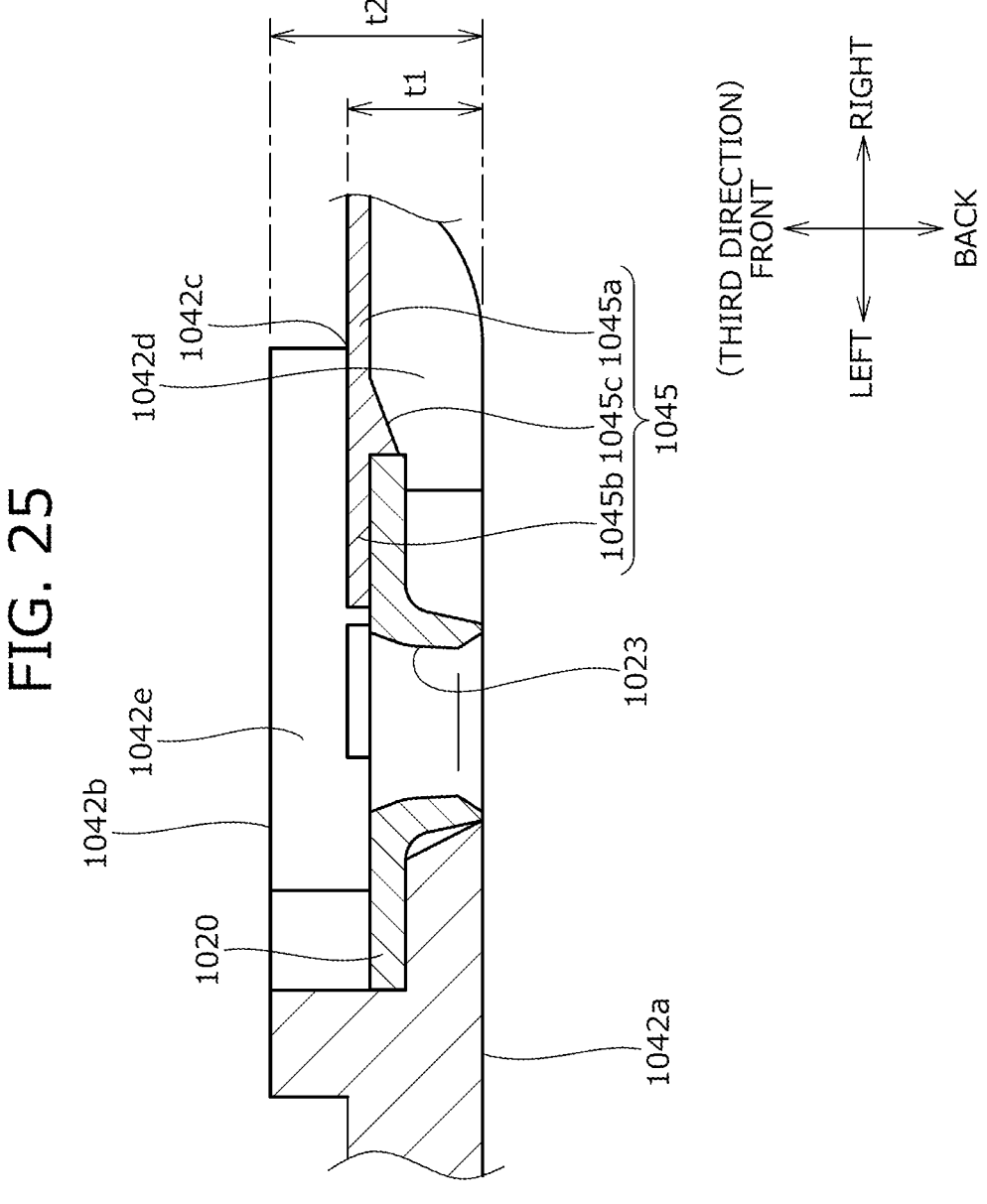
FIG. 25 is a cross-sectional view taken along a line XXV-XXV of FIG. 22.

FIGS. 22 and 23 are respective rear and front views of the nut accommodation portion 1040 in a state in which the nut 1020 is accommodated, FIG. 24 is an explanatory diagram showing a state in which the nut 1020 is inserted into the nut accommodation portion 1040, and FIG. 25 is a cross-sectional view taken along a line XXV-XXV of FIG. 22.

As shown in FIGS. 22 to 25, the nut 1020 used in the vehicle seat S1000 according to this example includes a substantially rectangular plate-shaped pedestal portion 1021, a hollow tubular portion 1022 which is provided at the center of the pedestal portion 1021 and protrudes from the pedestal portion 1021, and a bolt through hole 1023 which is formed in the tubular portion 1022. The nut 1020 according to this example is formed of a metal material and a thread for fastening the bolt is formed on the inner surface of the tubular portion 1022 forming the bolt through hole 1023. In each drawing, the thread is omitted. However, the present invention is not limited thereto and the nut may be formed of a resin material.

The nut accommodation portion 1040 is formed on the surface of the bottom plate 1010. Specifically, the nut accommodation portion 1040 bulges from each of a rear surface 1010a and a front surface 1010b of the bottom plate 1010 in the thickness direction of the bottom plate 1010 and in the front to back direction of this example and is integrally formed with the bottom plate 1010. As shown in FIGS. 22 and 23, the nut accommodation portion 1040 includes a substantially rectangular parallelepiped accommodation space 1041 which accommodates the nut 1020 and an outer peripheral wall 1042 which has a predetermined thickness in the front to back direction and is formed to surround the accommodation space 1041. The outer peripheral wall 1042 includes a rear wall 1042a which is formed to bulge backward from the rear surface 1010a around the portion provided with the nut accommodation portion 1040 in the rear surface 1010a of the bottom plate 1010 and a front wall 1042b which bulges forward from the front surface 1010b around the portion provided with the nut accommodation portion 1040 in the front surface 1010b of the bottom plate 1010.

Additionally, the front surface 1010b which faces the front side of the seat in the bottom plate 1010 of the seat back 1001 is a surface which faces the occupant side, that is, an occupant support surface which is a surface supporting the back of the occupant from behind and is a front surface in this example. The front wall 1042b of the nut accommodation portion 1040 includes a front surface facing occupant side. Further, the rear surface 1010a which faces the rear side of the seat is a back surface which faces the side opposite to the front surface of this example and the rear wall 1042a of the nut accommodation portion 1040 includes a back surface facing the side opposite to the front surface.

In the nut accommodation portion 1040, one end portion in a direction along the surface of the bottom plate 1010 is provided with an insertion opening 1044 for inserting the nut 1020. Specifically, the insertion opening 1044 is provided in a side portion 1043 which is an end portion (one end portion) on one side in the right to left direction of the nut accommodation portion 1040. The insertion opening 1044 is formed by an opening for communicating between a side portion opening 1044a opening on the side of the side portion 1043 of the nut accommodation portion 1040 and a rear surface opening 1044b opening in a part on the side of the side portion opening 1044a in the rear surface (in other words, the rear wall 1042a of the outer peripheral wall 1042) as the back surface of the nut accommodation portion 1040. In this way, since the insertion opening 1044 is formed by the opening communicating from the side portion 1043 of the nut accommodation portion 1040 to a part of the rear wall 1042a as the back surface of the nut accommodation portion 1040 and the wide opening portion is ensured, the nut 1020 is easily inserted. Additionally, the insertion opening 1044 is provided on the outside in the right to left direction of the vehicle seat S1000 in the nut accommodation portion 1040, that is, the side portion 1043 close to the outer periphery of the bottom plate 1010.

The side portion 1043 which is the end portion provided with the insertion opening 1044 of the nut accommodation portion 1040 is provided with a claw portion 1045 which extends from the end portion, specifically, the edge of the side portion opening 1044a of the insertion opening 1044 toward the inside of the nut accommodation portion 1040 along the direction substantially parallel to the surface of the bottom plate 1010. The claw portion 1045 includes a base end portion 1045a which is a base portion connected to the edge of the side portion opening 1044a and a tip portion 1045b which extends from the base end portion 1045a toward the inside of the accommodation space 1041 and the base end portion 1045a is formed to be wider than the tip portion 1045b.

More specifically, as shown in FIGS. 22 to 24, the base end portion 1045a of the claw portion 1045 has a vertical width extending from the upper end to the lower end of the edge of the side portion opening 1044a, that is, a length in the up to down direction at the connection portion with the edge of the side portion opening 1044a, is formed so that the vertical width becomes narrower, that is, the length in the up to down direction becomes smaller as it goes inward, and is connected to the tip portion 1045b. In this way, in the claw portion 1045, the vertical width of the base end portion 1045a is formed to be wider than the vertical width of the tip portion 1045b and the portion having a wide vertical width functions as the reinforcement portion. In this way, the base end portion 1045a is formed by a wide reinforcement portion. Since the wide reinforcement portion is provided, the strength of the claw portion 1045 can be improved. Further, since it is not necessary to thicken the claw portion 1045 in order to increase the strength of the claw portion 1045, the nut 1020 is easily inserted.

A barb 1045c which is a protrusion protruding toward the inside of the nut accommodation portion 1040 is provided at a position in the vicinity of the boundary line with the tip portion 1045b on the surface facing the accommodation space 1041, that is, the surface facing the inside of the nut accommodation portion 1040 at the base end portion 1045a of the claw portion 1045. As shown in FIGS. 24 and 25, the barb 1045*c* has a protrusion amount which is large enough to allow the nut 1020 to ride over the barb 1045 *c* when the nut 1020 is inserted from the insertion opening 1044 along the inner surface of the claw portion 1045. Further, a surface facing the inside of the barb 1045*c* is formed as an inclined surface which gently rises from the base end portion 1045*a* toward the tip portion 1045*b*. The end portion (end surface) on the side of the tip portion 1045*b* of the barb 1045 *c* erects in a direction substantially perpendicular to the inner surface of the claw portion 1045. Additionally, the inward protrusion amount of the barb 1045*c* is formed to be smaller than the thickness of the nut 1020.

The accommodation of the nut 1020 will be described in detail. The nut 1020 is inserted from the insertion opening 1044 to the accommodation space 1041 in a direction along the surface of the bottom plate 1010, specifically, the portion provided with the nut accommodation portion 1040 in the bottom plate 1010 or the peripheral surface (that is, a direction substantially parallel to the surface), in this example, the right to left direction, is accommodated in the nut accommodation portion 1040, and is assembled to the bottom plate 1010. At this time, the nut 1020 is inserted from the insertion opening 1044 along the inner surface of the claw portion 1045 and moves to the accommodation space 1041 over the inclined surface of the barb 1045*c*. Then, when the entire nut 1020 is accommodated in the accommodation space 1041 over the barb 1045*c,* the end portion (end surface) on the side of the insertion opening 1044 of the nut 1020 comes into contact with the end portion (end surface) on the side of the tip portion 1045*b* of the barb 1045*c* to be in a locked state and hence the nut 1020 is prevented from falling off. In this way, the claw portion 1045 supports the nut 1020 in the front to back direction by the tip portion 1045*b* and locks the nut 1020 by the barb 1045*c* in the right to left direction.

As described above, since the nut 1020 is inserted into the nut accommodation portion 1040 by being moved from the insertion opening 1044 provided in the side portion 1043 of the nut accommodation portion 1040 in a direction along the surface of the bottom plate 1010 and a direction along the extension direction of the claw portion 1045, it is not necessary to press the nut 1020 with a large force compared to the conventional configuration in which the nut is inserted in a direction (specifically, a substantially perpendicular direction) intersecting the extension direction of the claw portion. Accordingly, the nut 1020 is easily inserted into the nut accommodation portion 1040 and the operation of assembling the nut 1020 to the bottom plate 1010 can be easily performed. Further, the claw portion 1045 does not fall off, the burden on the claw portion 1045 can be reduced, and the damage of the claw portion 1045 can be suppressed. Further, since the insertion opening 1044 is provided on the outside of the vehicle seat S 1000 in the right to left direction, that is, the side portion close to the outer periphery of the bottom plate 1010, workability is further improved.

As shown in FIG. 22, the rear wall 1042*a* forming the rear surface of the nut accommodation portion 1040 is provided with a receiving portion 1046 which is notched in a C shape from the outside to inside in the right to left direction of the seat and into which the tubular portion 1022 of the nut 1020 is inserted and fitted and a plurality of holes 1047. Since the plurality of holes 1047 are formed, the mold can be removed when molding the bottom plate 1010 provided with the nut accommodation portion 1040.

As shown in FIG. 23, the rear wall 1042*a* forming the front surface of the nut accommodation portion 1040 is provided with an opening 1048 having a size such that a part of the outer periphery of the pedestal portion 1021 of the nut 1020 is visible. The side portion on the side of the insertion opening 1044 of the opening 1048 is provided with the above-described claw portions 1045. Further, the upper and lower end portions of the nut accommodation portion 1040, more specifically, the upper and lower ends of the opening 1048 are provided with a locking portion 1049 which is formed by a protrusion protruding toward the center of the opening 1048. The locking portion 1049 locks the end portion of the nut 1020, specifically, the upper and lower ends of the pedestal portion 1021 of the nut 1020.

The arrangement of the claw portion 1045 and the locking portion 1049 will be described in detail. The claw portion 1045 extends from the substantially center position in the up to down direction of one side portion of the opening 1048 (specifically, the side portion on the side of the side portion 1043 of the outer peripheral wall 1042) toward the center of the opening 1048 and extends to a position substantially half the width of the opening 1048. The locking portions 1049 are provided at two positions at the upper and lower ends of the opening 1048 in the up to down direction and are each provided at a position that does not overlap (does not line up with) the claw portions 1045 in the right to left direction and the up to down direction. Further, in a state in which the nut 1020 is accommodated in the nut accommodation portion 1040, the claw portion 1045 is provided at a position overlapping the bolt through hole 1023 formed in the nut 1020 in the right to left direction and the locking portion 1049 is provided at a position overlapping the bolt through hole 1023 in the up to down direction. Additionally, the length of the claw portion 1045 in the right to left direction is set not to overlap the bolt through hole 1023 of the nut 1020 in the front to back direction.

In this way, since the locking portion 1049 is provided in the nut accommodation portion 1040 in addition to the claw portion 1045, the nut 1020 is supported by the claw portion 1045 and the locking portion 1049 and the nut 1020 can be firmly fixed. Particularly, since the claw portion 1045 supports the nut 1020 in the right to left direction by the barb 1045*c* and the locking portion 1049 supports the nut 1020 in the front to back direction, the nut 1020 can be reliably supported as a whole. Further, since the claw portion 1045 and the locking portion 1049 are arranged in a well-balanced manner so as not to overlap vertically and horizontally, the nut 1020 can be supported in a well-balanced and stable manner. Further, since the claw portion 1045 and the locking portion 1049 are arranged in a well-balanced manner at the vertical and horizontal positions of the bolt through hole 1023, the nut 1020 can be supported in a well-balanced and stable manner when a force is applied due to bolt fastening.

Here, when a direction (the right to left direction in this example) parallel to the direction in which the nut 1020 is inserted into the nut accommodation portion 1040 is a "first direction", a direction parallel to the surface of the bottom plate 1010 and perpendicular to the first direction (the up to down direction in this example) is a "second direction", and a direction perpendicular to the surface of the bottom plate 1010 (the front to back direction in this example) is a "third direction", the arrangement of the claw portion 1045, the locking portion 1049, and the bolt through hole 1023 can be rephrased as follows.

The claw portion 1045 extends from the substantially center position in the second direction in one side portion of the opening 1048 in the first direction toward the center of the opening 1048 and extends to a position substantially half the width of the opening 1048. The locking portions 1049 are provided at two positions at both end portions of the opening 1048 of the nut accommodation portion 1040 in the second direction and are each provided at a position that does not overlap (does not line up with) the claw portions 1045 in the first direction and the second direction. Further, in a state in which the nut 1020 is accommodated in the nut accommodation portion 1040, the claw portion 1045 is provided at a position overlapping the bolt through hole 1023 formed in the nut 1020 in the first direction and the locking portion 1049 is provided at a position overlapping the bolt through hole 1023 in the second direction. Additionally, the length of the claw portion 1045 in the second direction does not overlap the bolt through hole 1023 of the nut 1020 in the third direction.

A recess 1050 which is recessed outward is formed on the side opposite to the claw portion 1045 in the right to left direction in the rear wall 1042*a* of the outer peripheral wall 1042 which surrounds the nut accommodation portion 1040. Since the recess 1050 is formed, one of the facing side portions of the nut accommodation portion 1040, that is, the side provided with the claw portion 1045 has a convex shape and the side provided with the recess 1050 has a concave shape. Accordingly, they have a corresponding shape. In this way, it is possible to facilitate removing from the mold during molding by matching the shape of one of the facing side portions to the shape of the other.

As shown in FIG. 25, the rear wall 1042*a* of the outer peripheral wall 1042 has two levels of bulging toward the front side and has a stepped portion 1042*c* in which a difference in level occurs as the bulging amount changes. When the thickness of the outer peripheral wall 1042 in the front to back direction (the third direction) is the sum of the thickness of the rear wall 1042*a* in the front to back direction and the thickness of the rear wall 1042*a* in the front to back direction, the outer peripheral wall 1042 includes a first wall portion 1042*d* which has a small thickness (thin) and a second wall portion 1042*e* which has a large thickness (thick). More specifically, a portion provided with the claw portion 1045, particularly, the base end portion 1045*a* of the claw portion 1045 in the outer peripheral wall 1042 is the first wall portion 1042*d* and a portion other than the portion provided with the claw portion 1045 is the second wall portion 1042*e*. The first wall portion 1042*d* has a thickness t1 in the front to back direction (the third direction) and the second wall portion 1042*e* has a thickness t2 in the front to back direction (the third direction) bulging to the front side in relation to the first wall portion 1042*d* and thicker than the thickness t1 (that is, t1<t2).

The upper and lower ends of the nut 1020 and the side end portion opposite to the claw portion 1045 come into contact with the second wall portion 1042 e which is a portion without the claw portion 1045 in the outer peripheral wall 1042. When a bolt (not shown) is inserted into the bolt through hole 1023 and is rotated to be fastened to the nut 1020, the nut 1020 may idly rotate. When the nut 1020 is idly rotated, the end portion of the nut 1020 locked to the claw portion 1045 is reliably supported by the claw portion 1045 provided with the base end portion 1045 a as the reinforcement portion and hence the idle rotation of the nut 1020 is suppressed. On the other hand, since the other end portions, that is, the upper and lower ends of the nut 1020 and the side end portion opposite to the claw portion 1045 are not supported by the claw portion 1045, a load is applied to the contact surface of the second wall portion 1042*e*, which is in contact with the nut 1020. Here, the second wall portion 1042*e* is thickened to ensure the strength of the wall of the portion to which a force is applied from the nut 1020 and to further suppress the idle rotation of the nut 1020. With such a configuration, the nut 1020 can be stably supported in the accommodation space 1041 during bolt fastening.

Modified Example of Nut Accommodation Portion

Next, a configuration of a nut accommodation portion 1060 according to a modified example of the nut accommodation portion will be described with reference to FIGS. 26 to 29. The nut accommodation portion 1060 according to this modified example is provided at four positions in the bottom plate 1010 constituting the seat back 1001 as in the nut accommodation portion 1040 and the nut accommodation portion portions 1060 arranged at the above-described positions (the right upper side at four positions) will be described as an example. Additionally, the same configurations and members as those of the nut accommodation portion 1040 will be designated by the same reference numerals and the description thereof will be omitted.

Figure 26:
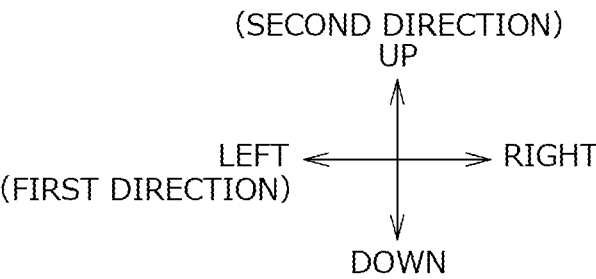
FIG. 26 is a rear view of a nut accommodation portion in a nut accommodated state according to a modified example.
Figure 27:
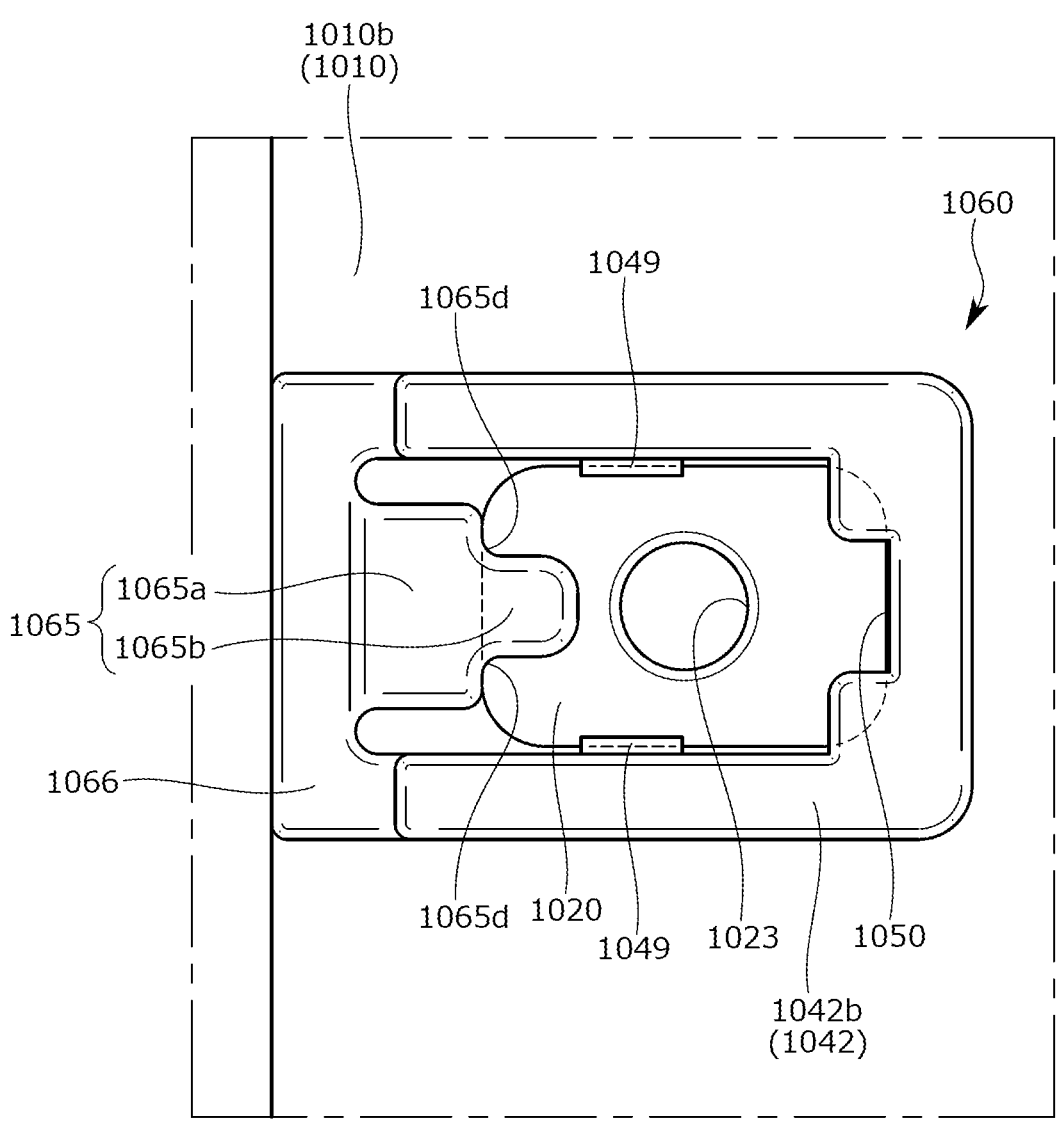
FIG. 27 is a front view of a nut accommodation portion in a nut accommodated state according to a modified example.
Figure 27:
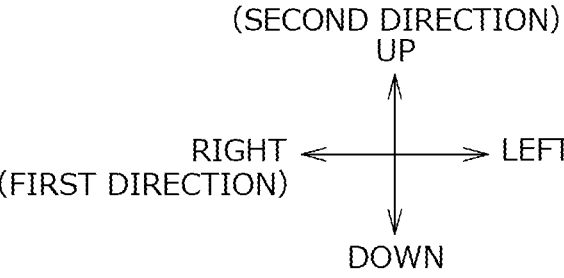
Figure 28:
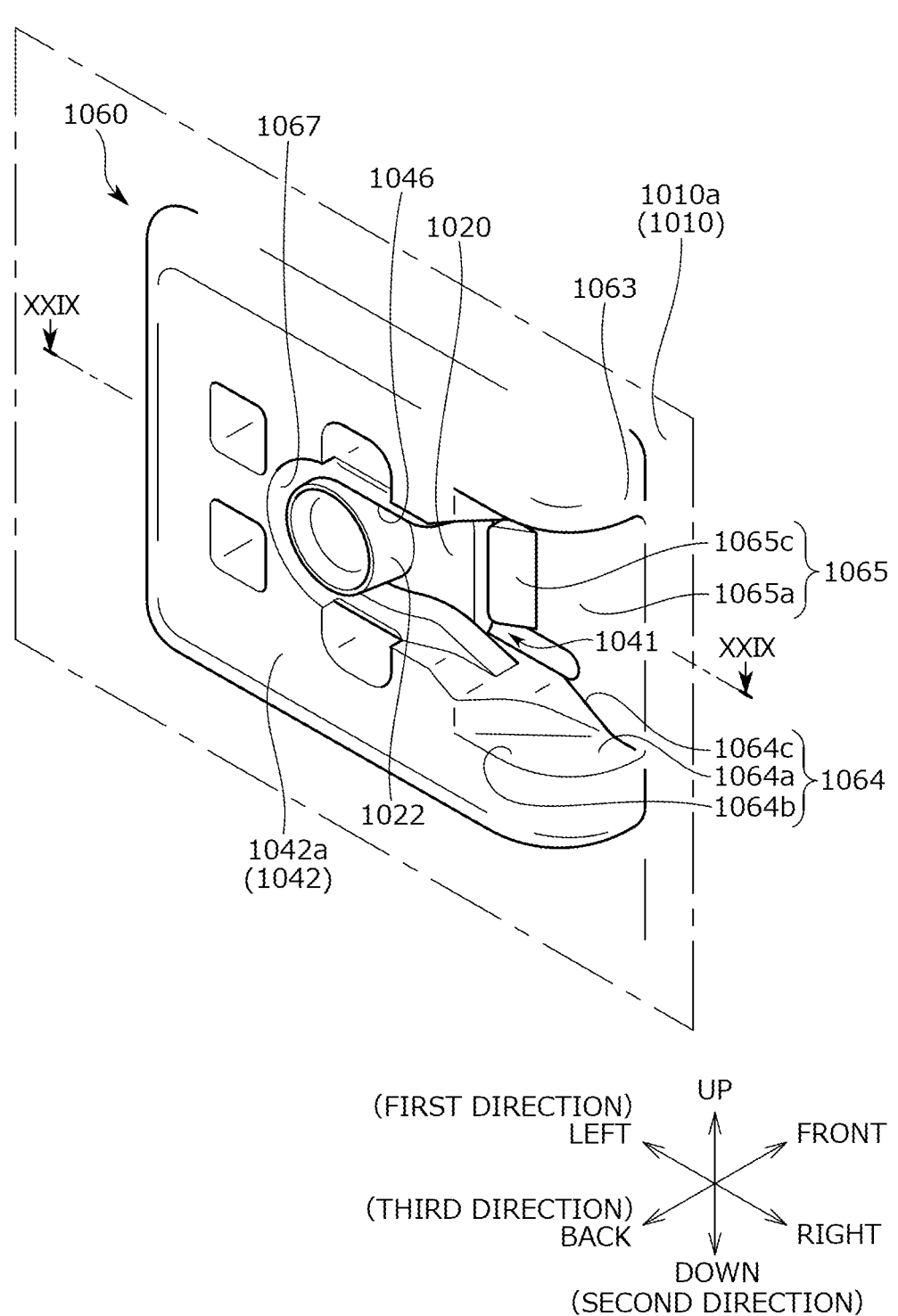
FIG. 28 is a perspective view of a nut accommodation portion in a nut accommodated state according to a modified example.
Figure 29:
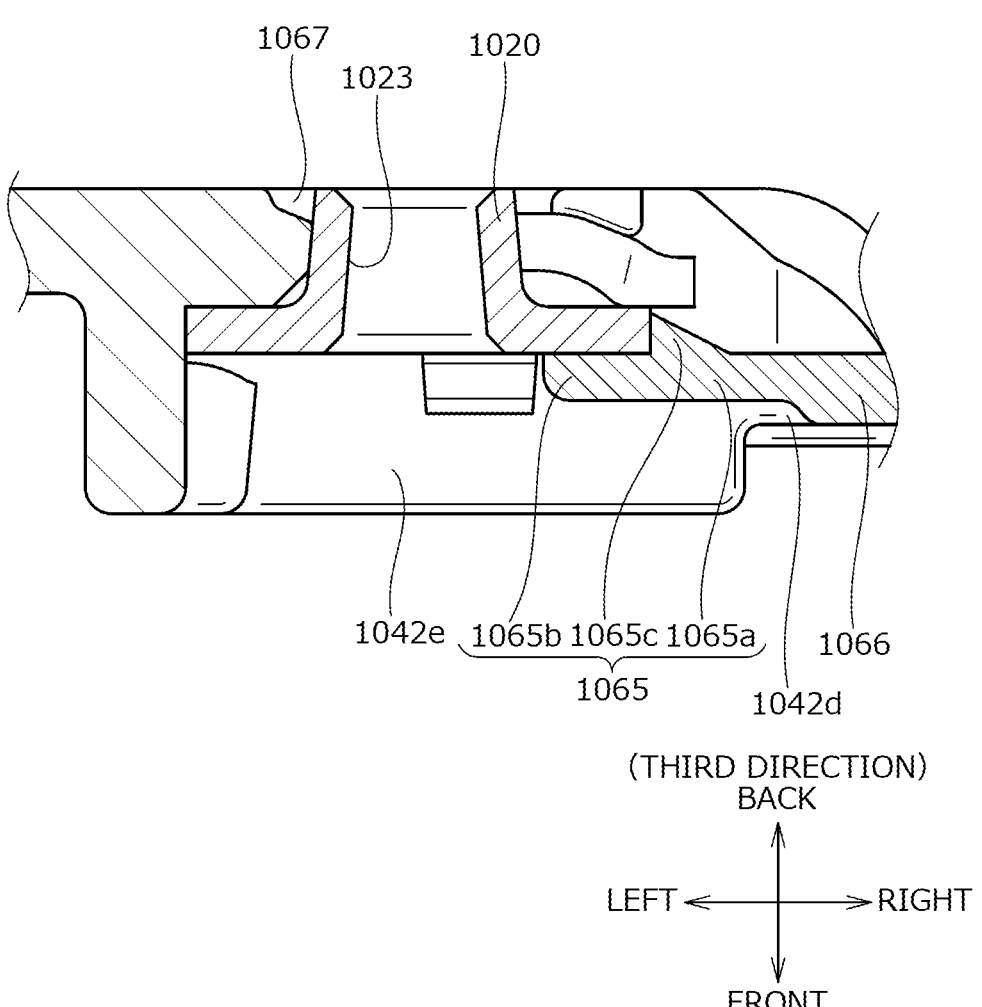
FIG. 29 is a cross-sectional view taken along a line XXIX-XXIX of FIG. 28.

FIGS. 26, 27, and 28 are respectively rear, front, and perspective views of the nut accommodation portion 1060 accommodating the nut 1020 and FIG. 29 is a cross-sectional view taken along a line XXIX-XXIX of FIG. 28.

An insertion opening 1064 for inserting the nut 1020 is provided in a side portion 1063 which is an end portion side (one end portion side) on one side of the nut accommodation portion 1060 in the right to left direction. The insertion opening 1064 is formed by an opening for communicating a side portion opening 1064*a* opening on the side of the side portion 1063 of the nut accommodation portion 1060 and a rear surface opening 1064*b* opening in a part on the side of the side portion opening 1064*a* in the rear wall 1042*a* which is the rear surface of the nut accommodation portion 1060.

As shown in FIG. 26, an inclined portion 1064*c* is formed at each of the upper and lower sides of the insertion opening 1064 of the nut accommodation portion 1060. The upper inclined portion 1064*c* obliquely extends upward from the inside to the outside of the nut accommodation portion 1060, the lower inclined portion 1064*c* obliquely extends downward from the inside to the outside of the nut accommodation portion 1060, and the insertion opening 1064 is formed to spread from the inside to the outside. In this way, since the insertion opening 1064 spreads from the inside to the outside, the nut 1020 is easily inserted into the nut accommodation portion 1060 and workability is improved.

The side portion 1063 on the side provided with the insertion opening 1064 of the nut accommodation portion 1060 is provided with a claw portion 1065 which extends from the edge of the side portion opening 1064*a* of the insertion opening 1064 toward the inside of the nut accommodation portion 1060 in a direction substantially parallel to the surface of the bottom plate 1010. The claw portion 1065 includes a base end portion 1065*a* which is a base portion connected to the edge of the side portion opening 1064 a and a tip portion 1065*b* which extends from the base end portion 1065*a* toward the inside of the accommodation space 1041.

As shown in FIG. 27, a notch 1065*d* is formed at the upper and lower positions in the claw portion 1065 and the vertical width of the tip portion 1065*b* (the length in the up to down direction) is smaller and narrower than the vertical width of the base end portion 1065*a* (the length in the up to down direction). In other words, the vertical width of the base end portion 1065*a* is larger than the vertical width of the tip portion 1065*b* and is formed to be large. The base end portion 1065*a* having a large vertical width constitutes the reinforcement portion and the strength of the claw portion 1065 can be improved.

Further, the tip of the claw portion 1065, that is, the inner end portion of the tip portion 1065*b* has a shape with rounded upper and lower corners. In this way, since the tip of the claw portion 1065 is rounded, the shape of the mold can be rounded and the strength is improved. If the tip has a corner, it is easy to apply a force, but if the tip has a rounded shape, the force will be dispersed and the strength will be improved.

A barb 1065*c* which is formed as a protrusion protruding toward the inside of the nut accommodation portion 1060 is provided at a position in the vicinity of the boundary line with the tip portion 1065*b* on the surface : the accommodation space 1041, that is, the surface facing the inside of the nut accommodation portion 1060 at the base end portion 1065*a* of the claw portion 1065. As shown in FIG. 26, the barb 1065*c* has a vertical width larger than the diameter of the bolt through hole 1023 formed in the nut 1020 and is formed to have a large width. In this way, since the barb 1065*c* of the claw portion 1065 is formed to have a larger width than the diameter of the bolt through hole 1023, it is possible to prevent the barb 1065*c* from entering the bolt through hole 1023 when the nut 1020 is inserted into the nut accommodation portion 1060. Accordingly, the nut 1020 can be smoothly inserted. Further, it is possible to prevent a worker from mistakenly thinking that the nut 1020 has been inserted while the barb 1065*c* enters the bolt through hole 1023 and the nut 1020 is caught by the claw portion 1065. Additionally, since the configuration, action, and function of the barb 1065*c* other than those described above are the same as those of the barb 1045*c,* the description thereof will be omitted.

As shown in FIGS. 27 and 29, the claw portion 1065 includes the base end portion 1065*a* and a connection portion 1066 which is a portion connected to the bottom plate 1010 and is connected to the bottom plate 1010 through the connection portion 1066. The front surface of the base end portion 1065*a* of the claw portion 1065 is recessed backward in relation to the front surface of the connection portion 1066 and the thickness of the base end portion 1065*a* in the front to back direction is thinner (smaller) than the thickness of the connection portion 1066 in the front to back direction. In this way, since the base end portion 1065*a* as the reinforcement portion is formed to be thin, the claw portion 1065 is easily bent and the nut 1020 is easily inserted.

Further, a recess 1067 which is recessed forward in relation to the other portions of the rear wall 1042*a* is formed around the receiving portion 1046 into which the tubular portion 1022 of the nut 1020 is inserted in the rear wall 1042*a*. Since the recess 1067 is formed around the receiving portion 1046, the thickness of the outer peripheral wall 1042 around the nut 1020 is thinned and the height in the front to back direction is lowered. Accordingly, the operator's finger grip becomes easier when inserting the nut 1020 and workability is improved.

In the above-described examples, an example has been described in which the insertion opening of the nut accommodation portion is provided in the side portion in the right to left direction of the seat, but the arrangement of the insertion openings is not limited thereto. The insertion opening may be provided at one end portion in the up to down direction of the seat which is the other direction along the surface of the bottom plate 1010, that is, the upper end portion or the lower end portion of the nut accommodation portion. That is, it is possible to provide the nut accommodation portion having a configuration in which the entire configuration of the nut accommodation portion 1040 or the nut accommodation portion 1060 is rotated about 90° upward or downward. In this way, even when the insertion opening is provided at the upper end portion or the lower end portion of the nut accommodation portion, the nut 1020 can be similarly inserted in a direction along the surface of the bottom plate 1010 instead of being pressed from the front side.

Second Example

Figure 30:
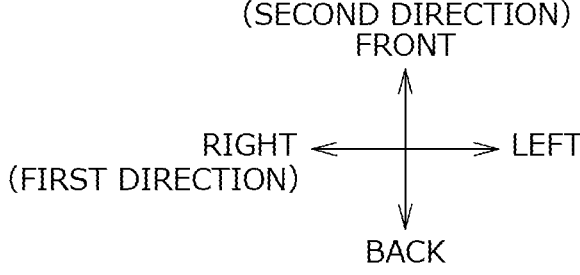
FIG. 30 is a bottom view of a bottom plate of a seat cushion.

Next, a second example of the second embodiment will be described with reference to FIG. 30. FIG. 30 is a bottom view of the bottom plate 1030 of the seat cushion 1002.

In the first example, an example of a configuration has been described in which the nut accommodation portion 1040 or the nut accommodation portion 1060 is provided on the bottom plate 1010 as the base member of the seat back 1001 in the vehicle seat S1000, but in the second example, as shown in FIG. 30, a nut accommodation portion 1040 or a nut accommodation portion 1040 ' having the same configuration as the nut accommodation portion 1060 is provided on the bottom plate 1030 as the base member forming the outer shape of the seat cushion 1002.

The bottom plate 1030 is formed of a resin material, extends in the right to left direction and the front to back direction, has a plate shape having a front surface and a lower surface, and is molded into a predetermined shape. Since the upper surface and the lower surface of the bottom plate 1030 of this example are formed to be substantially parallel as a whole, hereinafter, "along the surface of the bottom plate 1030" means a state along the upper surface and/or the lower surface of the bottom plate 1030 and a state substantially parallel to the upper surface and/or the lower surface of the bottom plate 1030.

An upper surface (not shown) which faces the upper side of the seat in the bottom plate 1030 of the seat cushion 1002 is a surface which faces the occupant side, that is, an occupant support surface which is a surface supporting the occupant from below and is a front surface in this example. Further, a lower surface 1030 a which faces the lower side of the seat is a back surface which faces the side opposite to the front surface of this example.

In the second example, since the configuration itself of the nut accommodation portion 1040' is the same as that of the nut accommodation portion 1040 or the nut accommodation portion 1060, the description will be omitted.

The lower surface 1030*a* and the upper surface of the bottom plate 1030 respectively correspond to the rear surface 1010*a* and the front surface 1010*b* of the bottom plate 1010 of the first example, the lower wall of the nut accommodation portion 1040' corresponds to the rear wall 1042*a* of the nut accommodation portion 1040, and the upper wall of the nut accommodation portion 1040' corresponds to the front wall 1042*b* of the nut accommodation portion 1040.

An insertion opening 1044' of the nut accommodation portion 1040' is provided at one end portion in the right to left direction which is one end portion in a direction along the surface of the bottom plate 1030 in the nut accommodation portion 1040'. With such a configuration, also in this example, the nut is accommodated in the nut accommodation portion 1040' in a direction along the surface of the bottom plate 1030, specifically, the portion provided with the nut accommodation portion 1040' in the bottom plate 1030 or the peripheral surface and is assembled to the bottom plate 1030.

Further, when a direction (the right to left direction in the second example) parallel to the direction in which the nut is inserted into the nut accommodation portion 1040' is a "first direction", a direction (the front to back direction in this example) parallel to the surface of the bottom plate 1030 and perpendicular to the first direction is a "second direction", and a direction (the up to down direction in the second example) perpendicular to the surface of the bottom plate 1030 is a "third direction", the arrangement of the claw portion, the locking portion, and the bolt through hole is rephrased as follows as described in the first example. Additionally, since the configurations of the claw portion, the locking portion, and the bolt through hole are the same as the configuration described in FIGS. 22 to 29 of the first example except for the direction, illustrations and detailed descriptions will be omitted.

The claw portion is provided to extend inward from one end portion of the nut accommodation portion 1040' in a direction substantially parallel to the surface of the bottom plate 1030. The locking portions are provided at two positions of both end portions in the second direction of the opening of the nut accommodation portion 1040' to be arranged in the second direction and each locking portion is provided at a position not overlapping (not line up with) the claw portion in the first direction and the second direction. Further, in a state in which the nut is accommodated in the nut accommodation portion 1040', the claw portion is provided at a position overlapping the bolt through hole formed in the nut in the first direction and the locking portion is provided at a position overlapping the bolt through hole in the second direction.

Further, also in the outer peripheral wall of the nut accommodation portion 1040', when a direction (the up to down direction in the second example) perpendicular to the surface of the bottom plate 1030 is a "third direction", this is rephrased as follows. That is, the outer peripheral wall includes the first wall portion which is a portion provided with the claw portion and the second wall portion which is a portion other than the portion provided with the claw portion and the thickness of the second wall portion in the third direction is thicker than the thickness of the first wall portion in the third direction. Additionally, since the configuration including the first wall portion and the second wall portion of the outer peripheral wall is the same as the configuration shown in FIG. 25 of the first example except for the direction, the configuration will be omitted.

As in the above-described configuration, the nut accommodation portion can be provided on the bottom plate 1030 of the seat cushion 1002.

Further, an example has been described in which the insertion opening of the nut accommodation portion is provided in the side portion in the right to left direction of the seat, but the arrangement of the insertion opening is not limited thereto. That is, the insertion opening may be provided at one end portion in the front to back direction of the seat which is the other direction along the surface of the bottom plate 1030, that is, the front end portion or the rear end portion of the nut accommodation portion. In this way, even when the insertion opening is provided at the front end portion or the rear end portion of the nut accommodation portion, the nut can be similarly inserted in a direction along the surface of the bottom plate 1030 instead of being pressed from the front side of the accommodation space of the nut accommodation portion.

Other Application Examples

In each of the above-described examples, the vehicle seat mounted on the buggy has been described as an example, but the present invention is not limited thereto. Hereinafter, an example in which the present invention is applied to a conveyance seat of a motorcycle as a conveyance other than the buggy will be described with reference to FIGS. 31 to 34.

Figure 31:
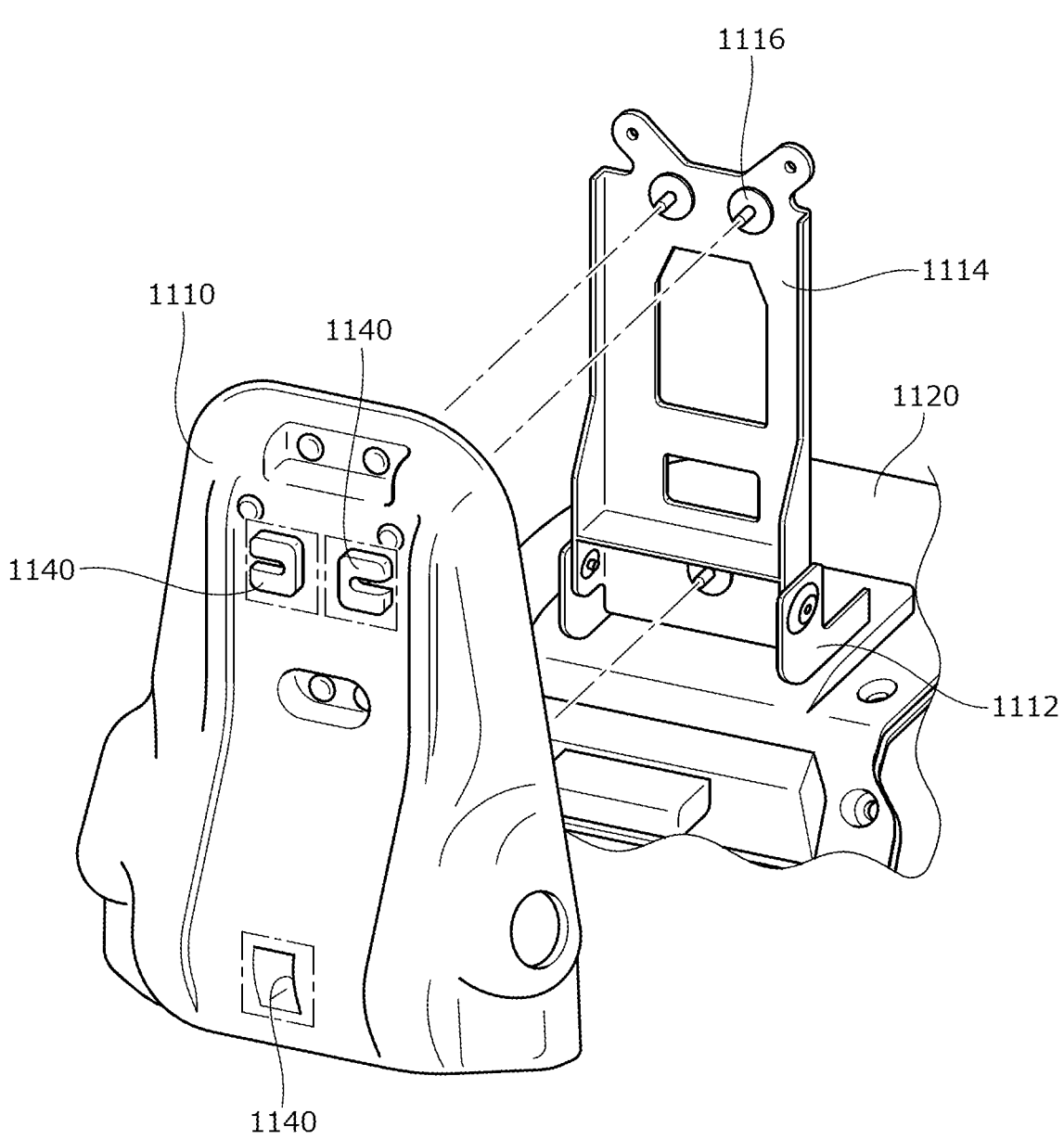
FIG. 31 is an explanatory diagram showing an example applied to a conveyance seat of a motorcycle.

FIG. 31 is an explanatory diagram showing an application example to a conveyance seat of a motorcycle provided with a seat having a movable backrest. As shown in FIG. 31, the conveyance seat of this example includes a bottom plate 1110 which constitutes a backrest supporting the back of the occupant, a hinge mechanism 1112 which is provided on a vehicle body 1120 and constitutes a movable mechanism for the backrest, and an auxiliary plate 1114 which is attached to the hinge mechanism 1112. Then, a fastening portion between the auxiliary plate 1114 and a bolt 1116 in the bottom plate 1110 is provided with the nut accommodation portion 1040 or a nut accommodation portion 1140 having the same configuration as that of the nut accommodation portion 1060. In this example, the nut accommodation portions 1140 are totally provided at three positions including two positions on the right and left sides of the upper portion of the bottom plate 1110 and one position at the center of the lower portion. The nut is inserted into the nut accommodation portion 1140, the nut is fastened to the bolt 1116, and the bottom plate 1110 is fixed to the auxiliary plate 1114. In this way, the nut accommodation portion 1140 can be used for a mechanism for fixing the bottom plate 1110 to the auxiliary plate 1114.

Figure 32:
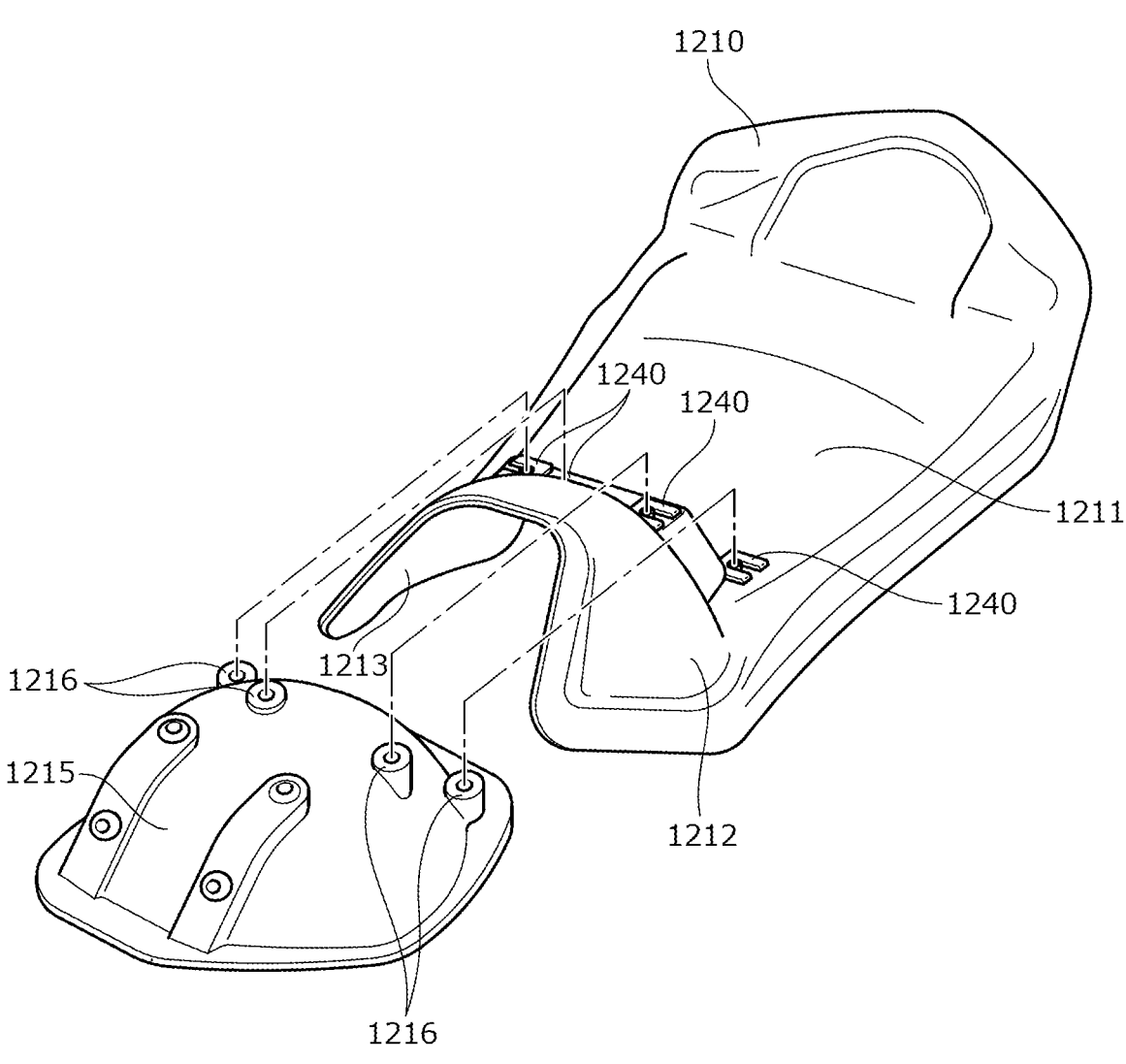
FIG. 32 is an explanatory diagram showing another example applied to a conveyance seat of a motorcycle.

FIG. 32 is an explanatory diagram showing an application example to a conveyance seat of a motorcycle having a luggage space. As shown in FIG. 32, a bottom plate 1210 which constitutes a seating portion of the conveyance seat of this example includes a support portion 1211 which has a substantially flat shape and supports the buttocks of the occupant and a bulging portion 1212 which bulges upward in a curved state as it goes from the support portion 1211 to the front side and has a substantially hemispherical shape. The bulging portion 1212 forms an accommodation space for luggage at the lower portion on the front side of the seating portion of the conveyance seat. An opening 1213 is formed in the front surface of the bulging portion 1212. A cover portion 1215 which is formed by a separate member and has a substantially hemispherical shape corresponding to the bulging portion 1212 is attached to the front side of the bottom plate 1210 to cover the bulging portion 1212 and the opening 1213.

Then, the nut accommodation portion 1040 or a nut accommodation portion 1240 having the same configuration as that of the nut accommodation portion 1060 is formed in a fastening portion fastened to the cover portion 1215 by a bolt (not shown) in the bottom plate 1210. In this example, the nut accommodation portion 1240 is provided at four positions behind the bulging portion 1212 of the bottom plate 1210. The nut is inserted into the nut accommodation portion 1240, the bolt is inserted from a hole 1216 formed in the cover portion 1215 to fasten the bolt and the nut, and the cover portion 1215 is fixed to the bottom plate 1210. In this way, the nut accommodation portion 1240 can be used for a mechanism for fixing the cover portion 1215 to the bulging portion 1212 of the bottom plate 1210 forming the luggage space.

Figure 33:
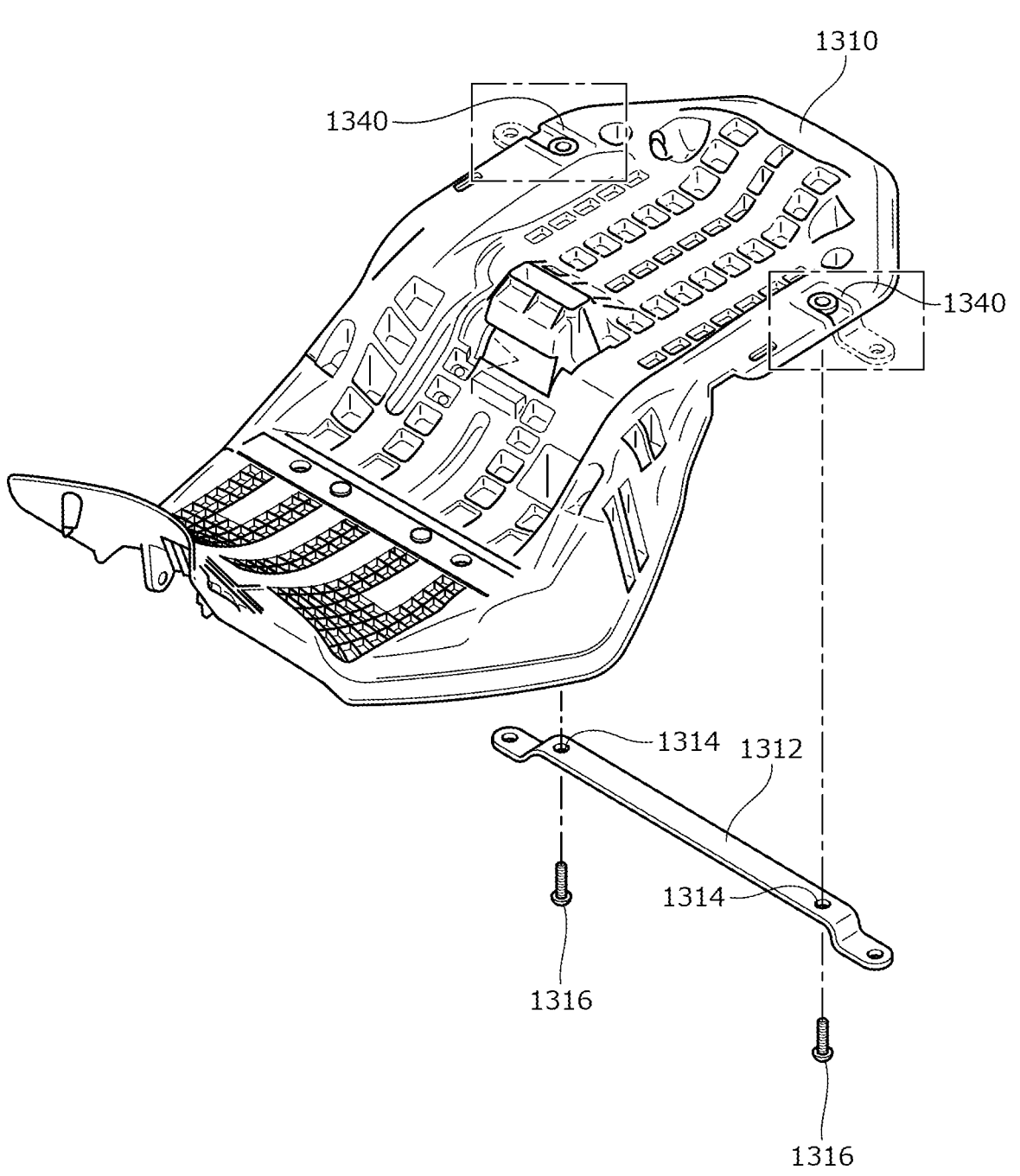
FIG. 33 is an explanatory diagram showing another example applied to a conveyance seat of a motorcycle.

FIG. 33 is an explanatory diagram showing another application example to a conveyance seat of a motorcycle. As shown in FIG. 33, a vehicle body fixing stay 1312 is attached to a rear end portion of a bottom plate 1310 which constitutes a seating portion of a conveyance seat of this example and the stay 1312 is fixed to the vehicle body so that the bottom plate 1310 is fixed to the vehicle body. The nut accommodation portion 1040 or a nut accommodation portion 1340 having the same configuration as that of the nut accommodation portion 1060 is formed at both right and left end portions of the rear end portion of the bottom plate 1310. The nut 1020 is inserted into the nut accommodation portion 1340 and the stay 1312 is attached to the rear end portion of the bottom plate 1310 from below. In this state, a bolt 1316 is inserted from below into a hole 1314 formed in the stay 1312 to fasten the bolt 1316 and the nut 1020 and the stay 1312 is fixed to the bottom plate 1310. In this way, the nut accommodation portion 1340 can be used for a mechanism for fixing the vehicle body fixing stay 1312 to the bottom plate 1310.

Figure 34:
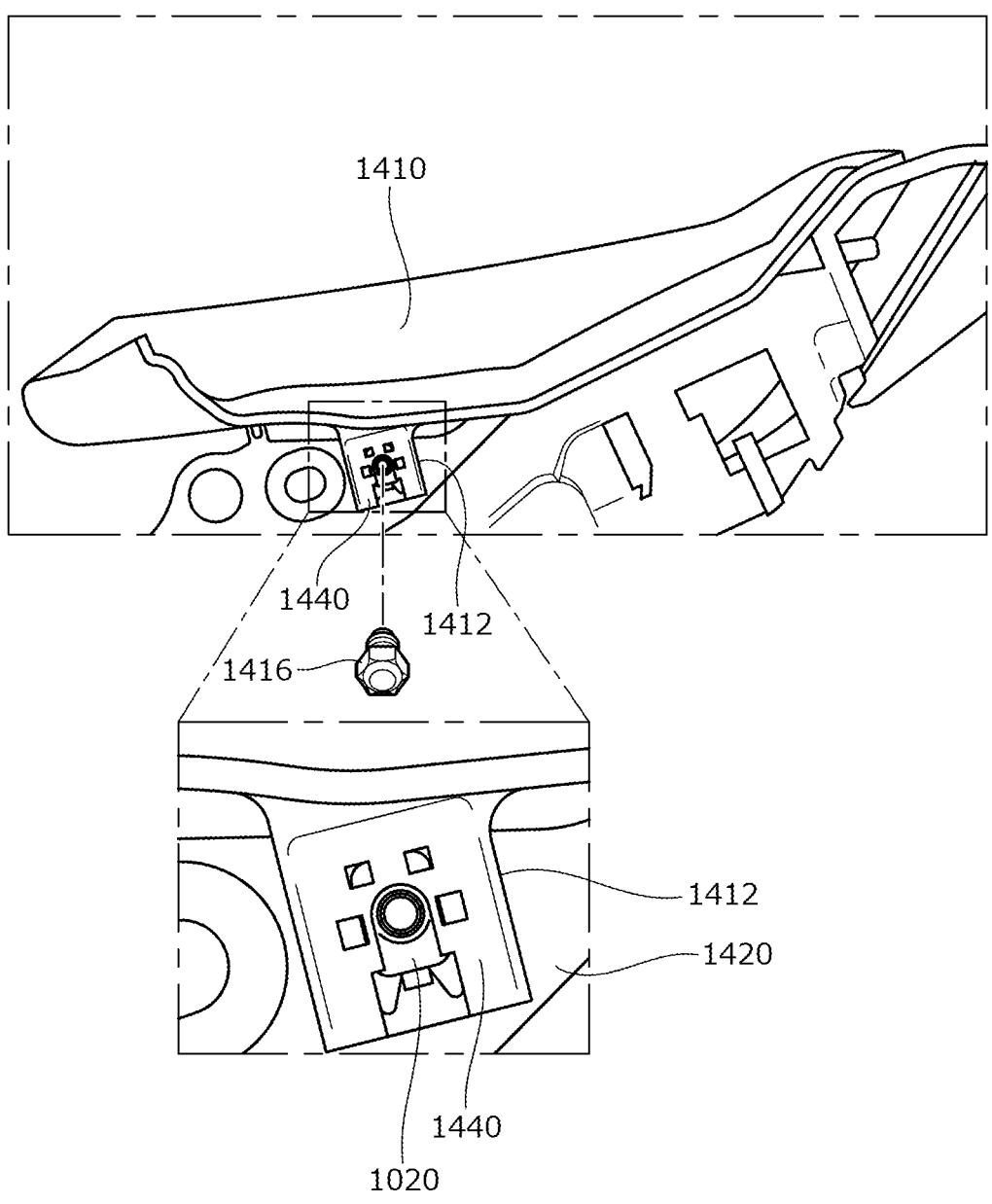
FIG. 34 is an explanatory diagram showing another example applied to a conveyance seat of a motorcycle.

FIG. 34 is an explanatory diagram showing still another application example of a conveyance seat of a motorcycle. As shown in FIG. 34, a fixing portion 1412 for fixing the vehicle body to the side portion is integrally formed on the bottom plate 1410 constituting the seating portion of the conveyance seat of this example. The fixing portion 1412 extends downward from the side portion of the bottom plate 1410 and comes into contact with an outer surface or an inner surface of a frame 1420 constituting the vehicle body when the bottom plate 1410 is placed on the vehicle body. Then, the fixing portion 1412 is provided with the nut accommodation portion 1040 or the nut accommodation portion 1440 having the same configuration as that of the nut accommodation portion 1060. The nut 1020 is inserted into the nut accommodation portion 1440, a bolt 1416 is inserted into the hole formed in the frame 1420 to fasten the bolt 1416 and the nut 1020, and the fixing portion 1412 is fixed to the frame 1420 so that the bottom plate 1410 is fixed to the vehicle body. In this way, the nut accommodation portion 1440 can be used for the mechanism for fixing the bottom plate 1410 to the vehicle body.

Further, the conveyance seat according to the present invention may be used for vehicles other than buggies and motorcycles. For example, the conveyance seat can be applied as seats mounted on ground vehicles with wheels such as tricycles, snowmobiles, personal watercraft, four-wheeled vehicles, railways, and construction equipment or seats mounted on aircraft, ships, and the like that move other than on the ground.

The above-described second embodiment will be supplementarily noted as follows.

Supplementary Note 1

A conveyance seat having an occupant support portion supporting an occupant, wherein the occupant support portion includes a bottom plate which serves as a base member constituting the occupant support portion, wherein the bottom plate is provided with an accommodation portion which accommodates a nut for fixing the bottom plate, wherein the accommodation portion is provided with an insertion opening for inserting the nut and a claw portion for fixing the nut, and wherein the insertion opening is provided at one end portion of the accommodation portion in a direction along a surface of the bottom plate.

Supplementary Note 2

The conveyance seat according to Supplementary Note 1, wherein the accommodation portion includes a front surface facing the occupant side and a back surface as a surface facing the side opposite to the front surface, wherein the insertion opening of the accommodation portion is provided at one side portion of the accommodation portion in a right to left direction of the seat, and wherein an opening of the insertion opening is formed by communicating from the side portion of the accommodation portion to a part of the back surface of the accommodation portion.

Supplementary Note 3

The conveyance seat according to Supplementary Note 1, wherein the claw portion extends from an end portion of the accommodation portion toward the inside of the accommodation portion, and wherein a base end portion of the claw portion is formed by a reinforcement portion having a larger width than a tip portion of the claw portion.

Supplementary Note 4

The conveyance seat according to Supplementary Note 1, wherein the accommodation portion is provided with a locking portion which locks an end portion of the nut.

Supplementary Note 5

The conveyance seat according to Supplementary Note 4, wherein when a direction parallel to a direction in which the nut is inserted into the accommodation portion is a first direction and a direction parallel to the surface of the bottom plate and perpendicular to the first direction is a second direction, the locking portion is provided at both end portions of the accommodation portion in the second direction and is provided at a position not overlapping the claw portion in the first direction and the second direction.

Supplementary Note 6

The conveyance seat according to Supplementary Note 4, wherein when a direction parallel to a direction in which the nut is inserted into the accommodation portion is a first direction and a direction parallel to the surface of the bottom plate and perpendicular to the first direction is a second direction, the claw portion is provided at a position overlapping a bolt through hole formed in the nut in the first direction in a state in which the nut is accommodated in the accommodation portion and the locking portion is provided at a position overlapping the bolt through hole in the second direction in a state in which the nut is accommodated in the accommodation portion.

Supplementary Note 7

The conveyance seat according to Supplementary Note 1, wherein the accommodation portion includes an accommodation space which accommodates the nut and an outer peripheral wall which has a predetermined thickness and surrounds the accommodation space, wherein the outer peripheral wall includes a first wall portion which is a portion provided with the claw portion and a second wall portion which is a portion other than the portion provided with the claw portion, and wherein when a direction perpendicular to the surface of the bottom plate is a third direction, the thickness of the second wall portion in the third direction is thicker than the thickness of the first wall portion in the third direction.

Supplementary Note 8

The conveyance seat according to Supplementary Note 3, wherein the reinforcement portion of the claw portion is provided with a barb, and wherein the barb has a larger width than a diameter of a bolt through hole formed in the nut.

Supplementary Note 9

The conveyance seat according to Supplementary Note 3, wherein the reinforcement portion of the claw portion is formed to be thinner than a connection portion between the reinforcement portion and the bottom plate.

Supplementary Note 10

The conveyance seat according to Supplementary Note 1, wherein the insertion opening spreads from the inside to the outside of the accommodation portion.

| REFERENCE SIGNS LIST | |
| --- | --- |
| <First embodiment> | |
| S, SA to SN: | vehicle seat (conveyance seat) |
| T: | cushion trim cover (cushion cover) |
| P: | pad |
| F, FA to FN: | seat frame |
| Sh: | seat body |
| 1: | seat back |
| 2: | seat cushion |
| 3: | headrest |
| 4: | slide mechanism |
| 7: | reclining mechanism |
| 8: | height adjustment mechanism |
| 10, 10A to 10M: | seat back frame |
| 11, 11K: | upper frame |
| 11a: | inclined portion |
| 12: | lower frame |
| 13: | back side frame (side frame) |
| 13a: | upper member |
| 13b: | lower member |
| 13c: | connecting portion |
| 14, 14M: | recessed portion |
| 15: | wire member |
| 16: | pressure receiving member |
| 17, 17K: | reinforcement member |
| 18: | wide portion |
| R1 to R4: | flat portion |
| 20, 20M: | seat cushion frame |
| 21: | cushion side frame (side frame) |
| 22: | front connecting frame |
| 23: | rear connecting frame |
| 24: | cushion pan frame |
| 25: | S spring (pressure receiving member) |
| 26: | enlarged seat surface frame |
| 27: | cover frame |
| 28: | recessed portion |
| 30: | headrest frame |
| 31: | headrest pillar |
| 32: | headrest side frame |

-continued

| REFERENCE SIGNS LIST | |
| --- | --- |
| 41: | lower rail |
| 42: | upper rail |
| 50: | reclining cover |
| 51: | actuator |
| 52: | actuator |
| 60, 60A to 60Nb: | resonance suppressing portion |
| 61: | uneven region (first uneven region) |
| 62: | second uneven region |
| 63, 63A to 63E: | uneven portion |
| 64: | through hole |
| <Second embodiment> | |
| S1000: | vehicle seat (conveyance seat) |
| 1001: | seat back (occupant support portion) |
| 1002: | seat cushion (occupant support portion) |
| 1001a, 1002a: | skin material |
| 1010, 1030, 1110, 1210, 1310, 1410, 1510: | bottom plate |
| 1010a: | rear surface (surface of bottom plate) |
| 1010b: | front surface (surface of bottom plate) |
| 1020, 1520: | nut |
| 1021: | pedestal portion |
| 1022: | tubular portion |
| 1023: | bolt through hole |
| 1030a: | lower surface (surface of bottom plate) |
| 1040, 1040', 1060, 1140, 1240, 1340, 1440, 1540: | nut accommodation portion (accommodation portion) |
| 1041: | accommodation space |
| 1042: | outer peripheral wall |
| 1042a: | rear wall (back surface of accommodation portion) |
| 1042b: | front wall (front surface of accommodation portion) |
| 1042c: | stepped portion |
| 1042d: | first wall portion |
| 1042e: | second wall portion |
| 1043, 1063: | side portion (one end portion side) |
| 1044, 1044', 1064: | insertion opening |
| 1044a, 1064a: | side portion opening |
| 1044b, 1064b: | rear surface opening |
| 1045, 1065, 10545: | claw portion |
| 1045a, 1065a: | base end portion, reinforcement portion |
| 1045b, 1065b: | tip portion |
| 1045c, 1065c: | barb |
| 1046: | receiving portion |
| 1047: | hole |
| 1048: | opening |
| 1049: | locking portion |
| 1050: | recess |
| 1064c: | inclined portion |
| 1065d: | notch |
| 1066: | connection portion |
| 1067: | recess |
| 10112: | hinge mechanism |
| 10114: | auxiliary plate |
| 10116, 1316, 1416: | bolt |
| 1120: | vehicle body |
| 1211: | support portion |
| 1212: | bulging portion |
| 1213: | opening |
| 1215: | cover portion |
| 1216, 1314: | hole |
| 1312: | stay |
| 1412: | fixing portion |
| 1420: | frame |
| 1510a, 1510b: | recess |

The invention claimed is:

1. A conveyance seat having a seat frame with an actuator, comprising:

a resonance suppressing portion which is formed in at least a part of the seat frame by a first uneven region formed by continuously forming a plurality of non-penetrating recesses and/or protrusions, wherein:

the seat frame includes a seat back frame, the seat back frame includes a pair of back side frames which are arranged on both sides in the seat width direction and an upper frame which connects upper ends of the pair of back side frames, the upper frame includes inclined portions at both right and left end portions, the resonance suppressing portion is disposed on the inclined portion, a through hole is formed on the inclined portion of the upper frame, and the resonance suppressing portion is disposed at a position not overlapping an edge of the through hole.

2. The conveyance seat according to claim 1, wherein a plurality of the resonance suppressing portions are provided in the seat frame, and wherein the plurality of resonance suppressing portions are arranged at a position symmetrical with respect to a center in a seat width direction.

3. The conveyance seat according to claim 1, wherein the resonance suppressing portion is disposed above the actuator.

4. The conveyance seat according to claim 1, wherein the resonance suppressing portion includes the first uneven region and a second uneven region which has a narrower range than the first uneven region and is formed by continuously forming the plurality of the non-penetrating recesses and/or protrusions.

5. The conveyance seat according to claim 4, wherein the seat frame is provided with a recessed portion which is recessed inward in the seat width direction and the first uneven region of the resonance suppressing portion is disposed at a position avoiding the recessed portion.

6. The conveyance seat according to claim 4, wherein the seat frame is provided with a recessed portion which is recessed inward in the seat width direction, and wherein the second uneven region of the resonance suppressing portion is disposed in the recessed portion.

7. The conveyance seat according to claim 1, wherein the seat back frame includes a wire member supported by the inclined portion, and wherein the resonance suppressing portion is disposed to avoid a portion in which the upper frame supports the wire member in the inclined portion.

8. A conveyance seat, having a seat frame with an actuator, comprising:

a resonance suppressing portion which is formed in at least a part of the seat frame by a first uneven region formed by continuously forming a plurality of non-penetrating recesses and/or protrusions, wherein:

the seat frame includes a seat back frame, the seat back frame includes a pair of back side frames which are arranged on both sides in the seat width direction and an upper frame which connects upper ends of the pair of back side frames, the upper frame includes inclined portions at both right and left end portions, the resonance suppressing portion is disposed on the inclined portion, the seat back frame includes a reinforcement member that connects both side portions of the upper frame, and the resonance suppressing portion is disposed on the reinforcement member.

9. A method for manufacturing a conveyance seat having a seat frame with an actuator, wherein the seat frame includes a seat back frame, the seat back frame includes a pair of back side frames arranged on both sides in a seat width direction and an upper frame connecting upper ends of the pair of back side frames, the method comprising:

preparing the upper frame that includes inclined portions at both right and left end portions of the upper frame;

preparing the pair of back side frames; and connecting upper ends of the pair of back side frames via the upper frame, wherein:

a resonance suppressing portion that includes a first uneven region formed by continuously forming a plurality of non-penetrating recesses and/or protrusions is disposed on each of the inclined portions of the upper frame, a through hole is formed on each of the inclined portions of the upper frame, and the resonance suppressing portion is disposed at a position that does not overlap an edge of the through hole.

* * * * *